United States Patent [19]
Dupree et al.

[11] Patent Number: 5,655,133
[45] Date of Patent: Aug. 5, 1997

[54] MASSIVELY MULTIPLEXED SUPERSCALAR HARVARD ARCHITECTURE COMPUTER

[75] Inventors: Wayne P. Dupree; Stephen G. Churchill; Jeffry R. Gallant; Larry A. Root, all of Midland; William J. Bressette, Saginaw; Robert A. Orr, III, Midland; Srikala Ramaswamy, Midland; Jeffrey A. Lucas, Midland; James A. Bleck, Midland, all of Mich.

[73] Assignee: The Dow Chemical Company, Midland, Mich.

[21] Appl. No.: 558,921

[22] Filed: Nov. 13, 1995

Related U.S. Application Data

[63] Continuation of Ser. No. 179,256, Jan. 10, 1994, abandoned.
[51] Int. Cl.[6] ................................................ G06F 9/30
[52] U.S. Cl. .............. 395/800.23; 395/381; 364/DIG. 1; 364/230; 364/247; 364/240
[58] Field of Search ........................... 395/800, 775, 395/375

[56] References Cited

U.S. PATENT DOCUMENTS

| | | | |
|---|---|---|---|
| 3,905,023 | 9/1975 | Perpiglia | 395/182.04 |
| 4,430,708 | 2/1984 | Isaman | 395/375 |
| 4,493,020 | 1/1985 | Kim et al. | 395/375 |
| 4,494,187 | 1/1985 | Simpson . | |
| 4,506,322 | 3/1985 | Leigh | 395/425 |
| 4,566,595 | 1/1986 | Fustier | 209/545 |
| 4,587,632 | 5/1986 | Ditzel | 395/421.03 |
| 4,608,634 | 8/1986 | Caudel et al. | 395/375 |
| 4,608,661 | 8/1986 | Sasaki | 364/131 |
| 4,747,039 | 5/1988 | Murray | 395/481 |
| 4,748,439 | 5/1988 | Robinson et al. | 395/51 |
| 4,751,675 | 6/1988 | Knauer | 365/78 |
| 4,787,062 | 11/1988 | Nei et al. | 395/500 |
| 4,791,550 | 12/1988 | Stevenson et al. | 395/650 |
| 4,891,787 | 1/1990 | Gifford | 395/375 |

(List continued on next page.)

FOREIGN PATENT DOCUMENTS

| | | |
|---|---|---|
| 0 479 390 A2 | 4/1992 | European Pat. Off. . |
| 0 496 407 A2 | 7/1992 | European Pat. Off. . |
| 0 605 927 A1 | 7/1994 | European Pat. Off. . |

OTHER PUBLICATIONS

Colwell, Robert P. et al., "A VLIW Architecture for a Trace Scheduling Compiler," Proceedings Second International Conference on Architecture Support for Programming languages and Operating Systems, Oct. 5–8, 1987, Palo ALto, California, pp. 180–192.

(List continued on next page.)

Primary Examiner—Mehmet B. Geckil
Attorney, Agent, or Firm—Harness, Dickey, & Pierce

[57] ABSTRACT

A massively multiplexed central processing unit ("CPU") which has a plurality of independent computational circuits, a separate internal result bus for transmitting the resultant output from each of these computational circuits, and a plurality of general purpose registers coupled to each of the computational circuits. Each of the general purpose registers have multiplexed input ports which are connected to each of the result buses. Each of the general purpose registers also have an output port which is connected to a multiplexed input port of at least one of the computational circuits. Each of the computational circuits are dedicated to at least one unique mathematical function, and at least one of the computational circuits include at least one logical function. At least one of the computational circuits includes a plurality of concurrently operable mathematical and logical processing circuits, and an output multiplexer for selecting one of the resultant outputs for transmission on its result bus. The CPU also features a very long instruction word which uses a series of assigned bit locations to represent the selections codes for each of the CPU components. These selection codes are directly transmitted to each of the CPU components by a program control circuit. A separate data control circuit is further provided in achieve a Harvard architecture design for the CPU.

21 Claims, 35 Drawing Sheets

U.S. PATENT DOCUMENTS

| | | | |
|---|---|---|---|
| 4,918,586 | 4/1990 | Niimura et al. | 395/429 |
| 4,964,046 | 10/1990 | Mehrgandt et al. | 395/250 |
| 4,992,934 | 2/1991 | Portanova et al. | 395/550 |
| 5,003,462 | 3/1991 | Blaner et al. | |
| 5,034,887 | 7/1991 | Yasui et al. | 395/800 |
| 5,051,940 | 9/1991 | Vassiliadis et al. | 364/736 |
| 5,081,573 | 1/1992 | Hall et al. | 395/800 |
| 5,084,836 | 1/1992 | Yamaguchi | 395/800 |
| 5,218,564 | 6/1993 | Covey | 364/750.5 |
| 5,301,340 | 4/1994 | Cook | 395/800 |
| 5,305,446 | 4/1994 | Leach et al. | 395/425 |
| 5,313,551 | 5/1994 | Labrousse et al. | 395/425 |
| 5,319,789 | 6/1994 | Ehlig et al. | 395/800 |
| 5,329,631 | 7/1994 | Ishibashi et al. | 395/402 |
| 5,442,760 | 8/1995 | Rustad et al. | 395/375 |
| 5,513,363 | 4/1996 | Kumar et al. | 395/800 |

OTHER PUBLICATIONS

Jouppi, Norman P. "Available Instruction–Level Parllelism for Superscalar and Superpipelined Machines" Architectural Support for Programming Languages and Operating Systems Proceedings, Apr. 3–6, 1989, 272–282.

Smith, Michael D. et al., "Limits on Multiple Instruction Issue," Architectural Support for Programming Languages and Operating Systems, Boston, Massachusetts, Apr. 3–6, 1989, pp. 290–302.

"Proceedings: Advanced Computer Technology, Reliable Systems and Applications," 5th Annual European Computer Conference, May 13–16, 1991, IEEE Computer Society Press Order No. 2141, Library of Congress No. 91–070547, IEEE Catalog No. 91CH30001-5, pp. 368–372.

Nakajima et al., "OHMEGA: A VLSI Superscalar Processor Architecture for Numerical Applications," 8345 *Computer Architecture News*, 18th Annual Int. On Computer Architecture, 19(1991) May, No. 3, New York, pp. 160–168.

Edward McLelland, "The Alpha AXP Architecture and 21064 Processor," *IEEE Micro*, Jun. 1993, No. 3, Los Alamitos, CA, pp. 36–40.

Mini/Micro computer design—Kraft & Toy—Prentice Hall publications.

Microprogrammable Computer Architectures—Alan B. Salisbury—1976.

i860 Microprocessor Architecture—Neal Margulis—1990.

James W. Hess, "Alternative computer architecture reduce bottlenecks." EDN, Nov. 12, 1987 pp. 271–278.

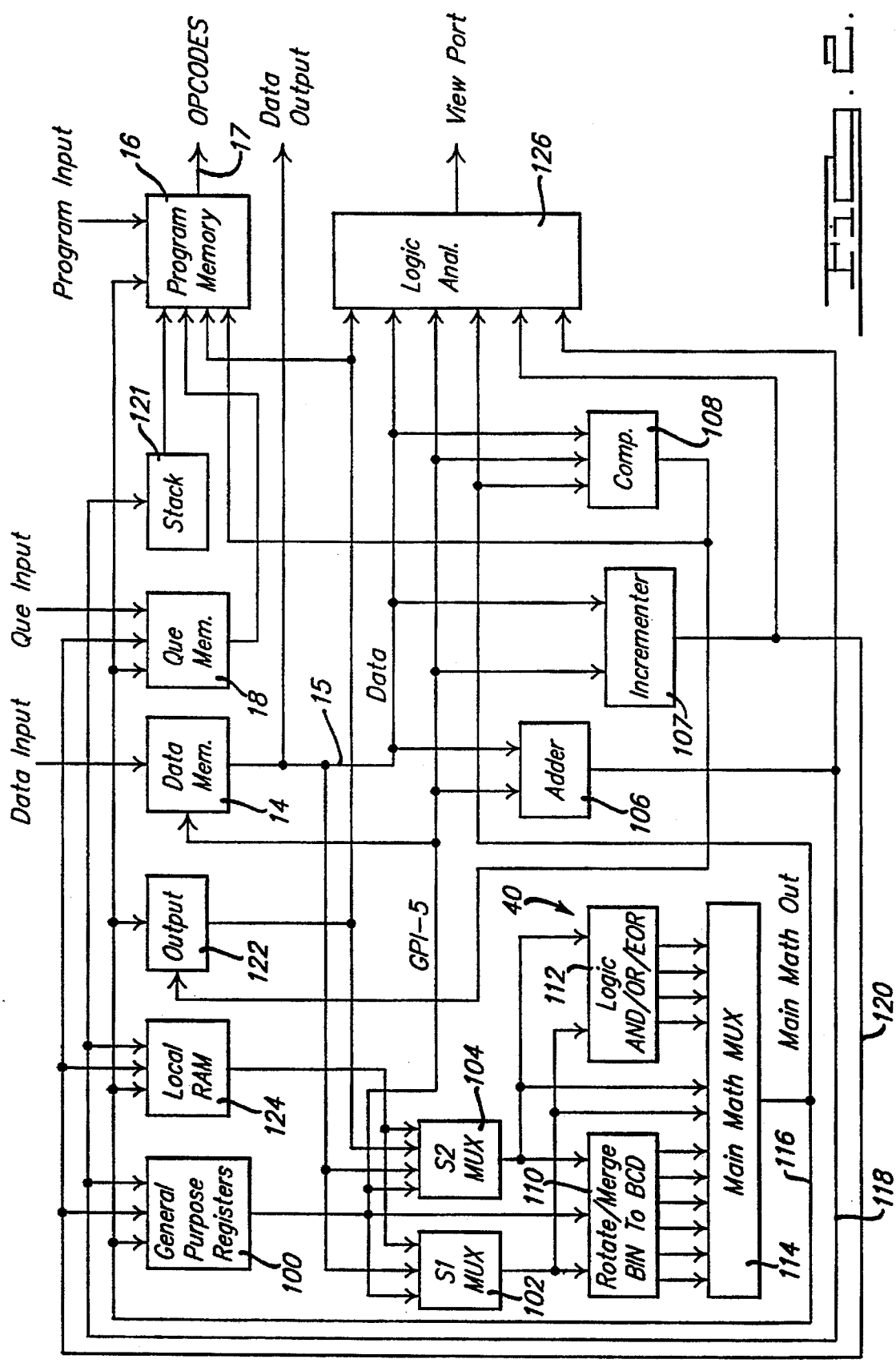

| Bit 39 | Bit 38  Bit 15 | Bit 14  Bit 0 |
|---|---|---|
| Sign | Integer | Fraction |

FIG. 4A.

| Bit 39  34 | 33 | 32  25 | 24  0 |
|---|---|---|---|
| y Exponent | 1 One | x1 | x2 |
|  |  | Mantissa | |

FIG. 4B.

| Bit 39 | 38  34 | 33  0 |
|---|---|---|
| Sign | Integer Portion | Fractional Portion |

FIG. 4C.

| Bit 39  34 | 33  25 | 24  0 |
|---|---|---|
| y Characteristic | x1 | x2 |
|  | Mantissa | |

FIG. 4D.

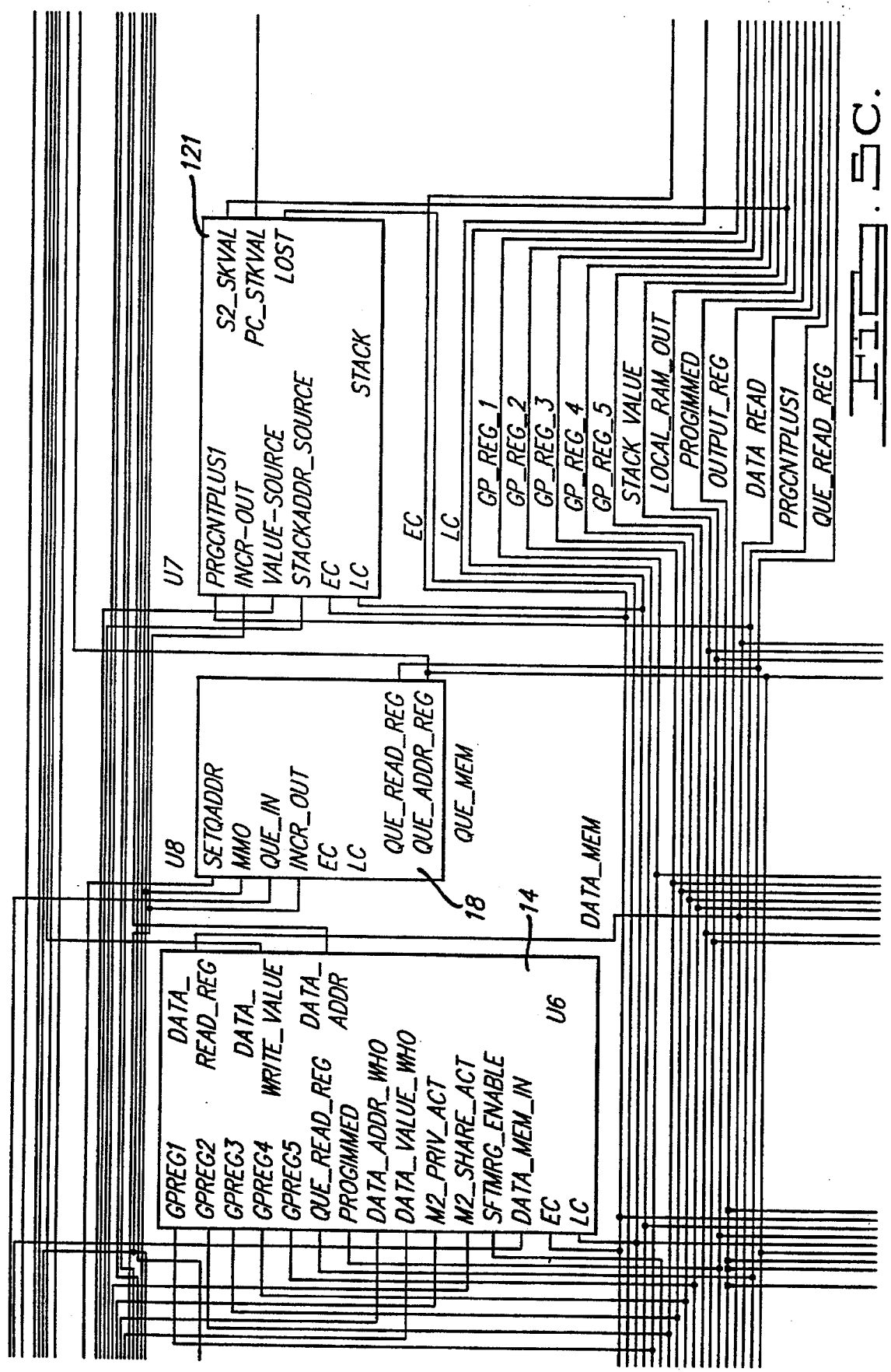

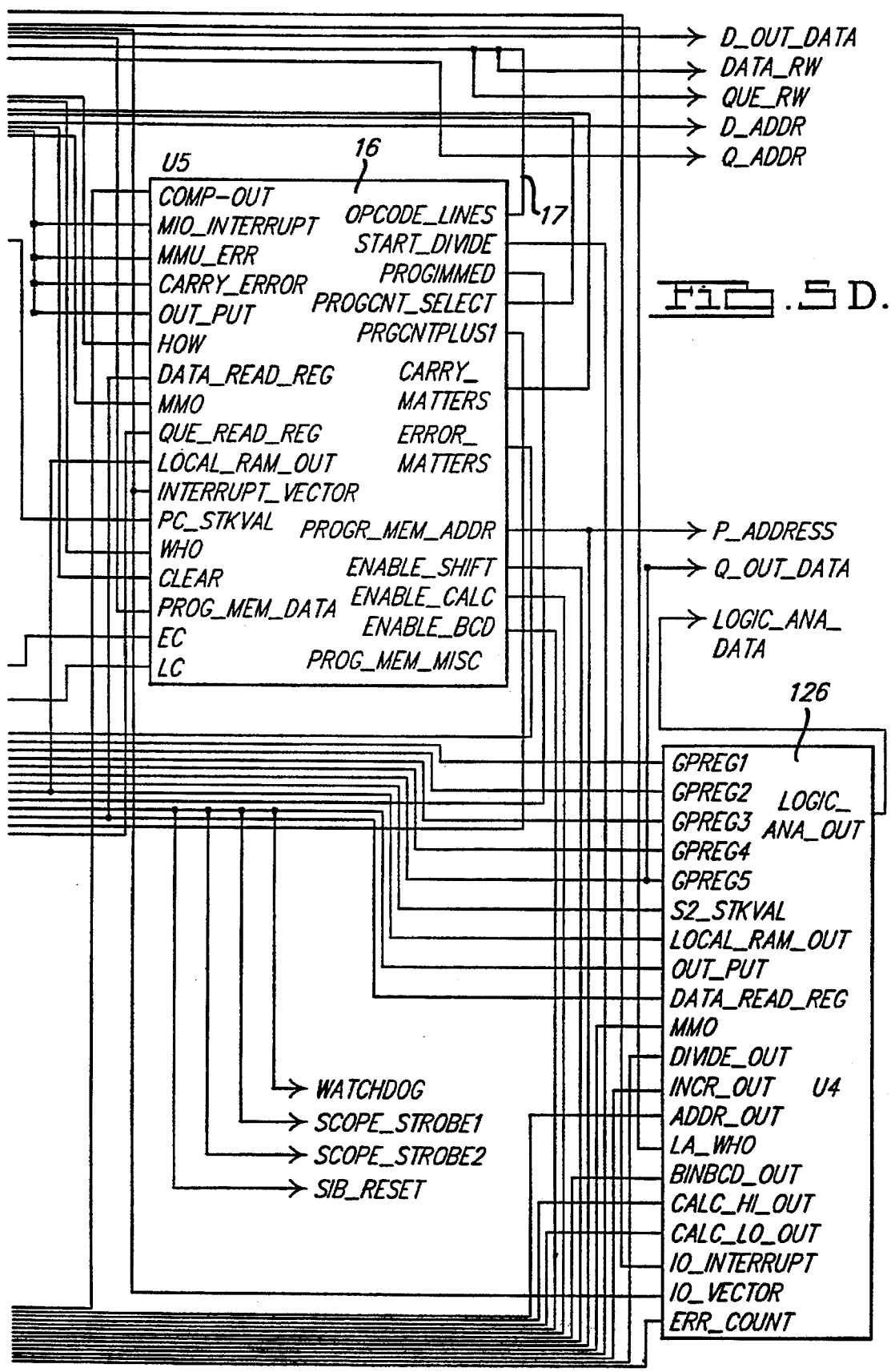

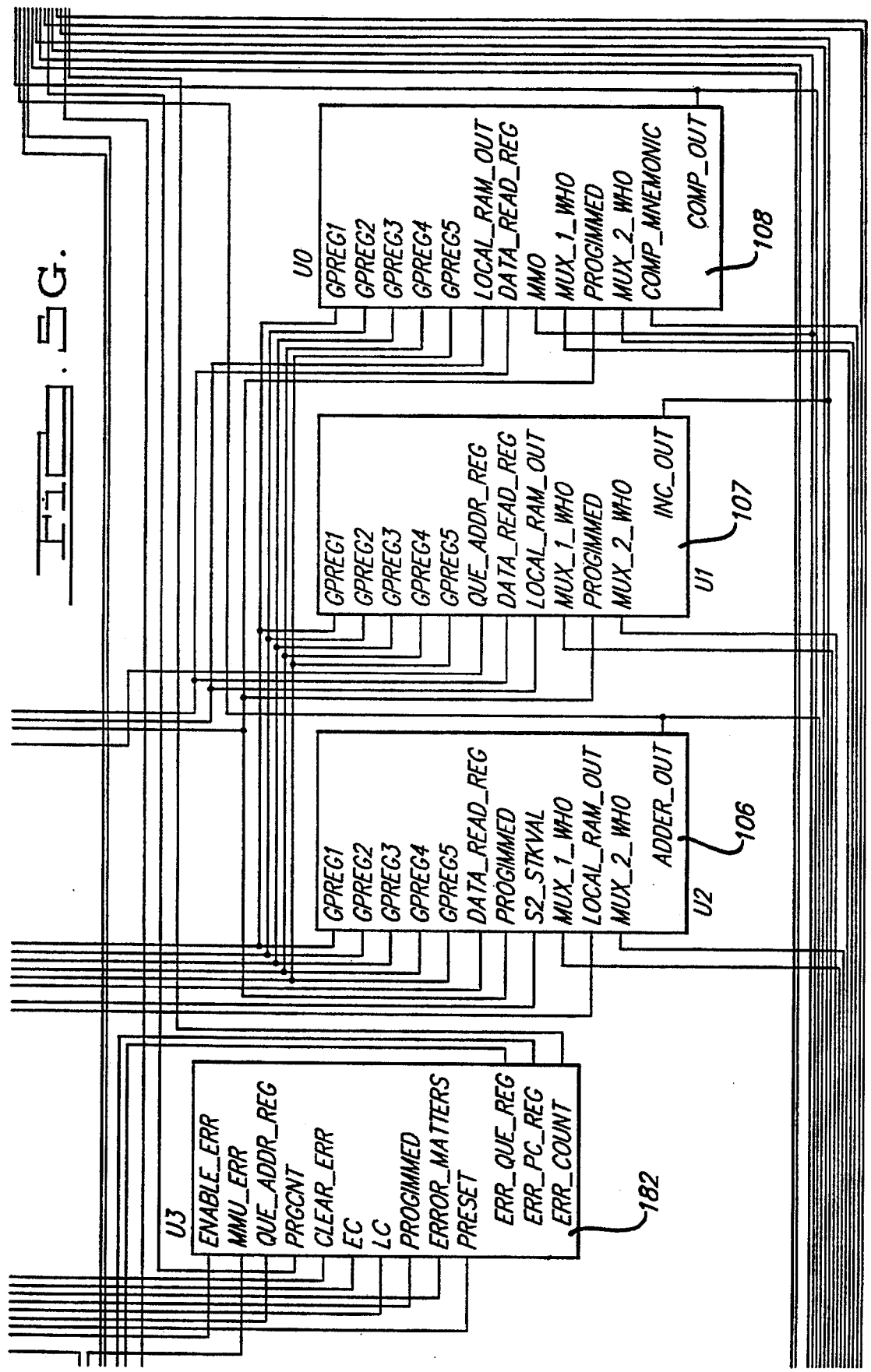

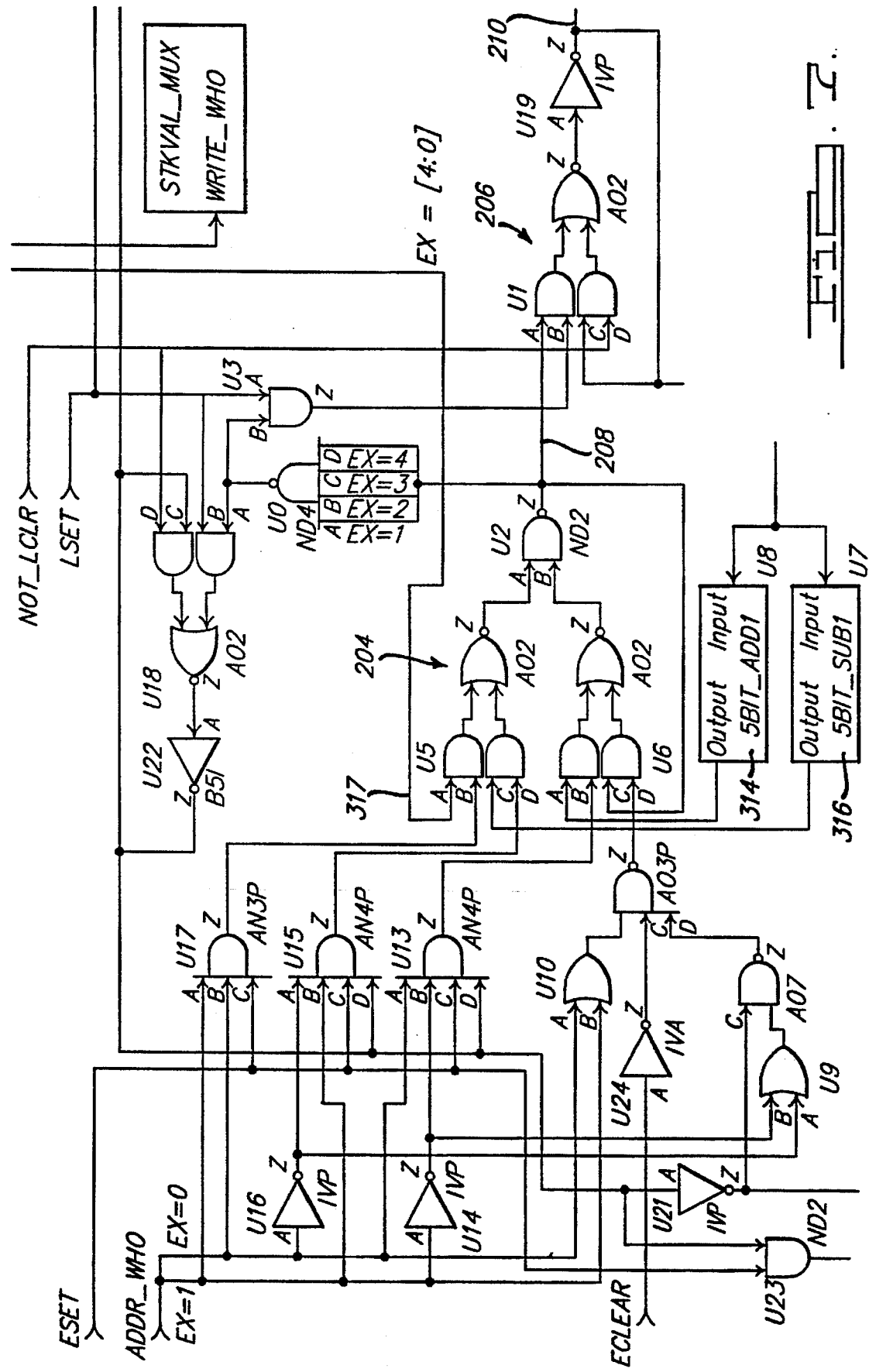

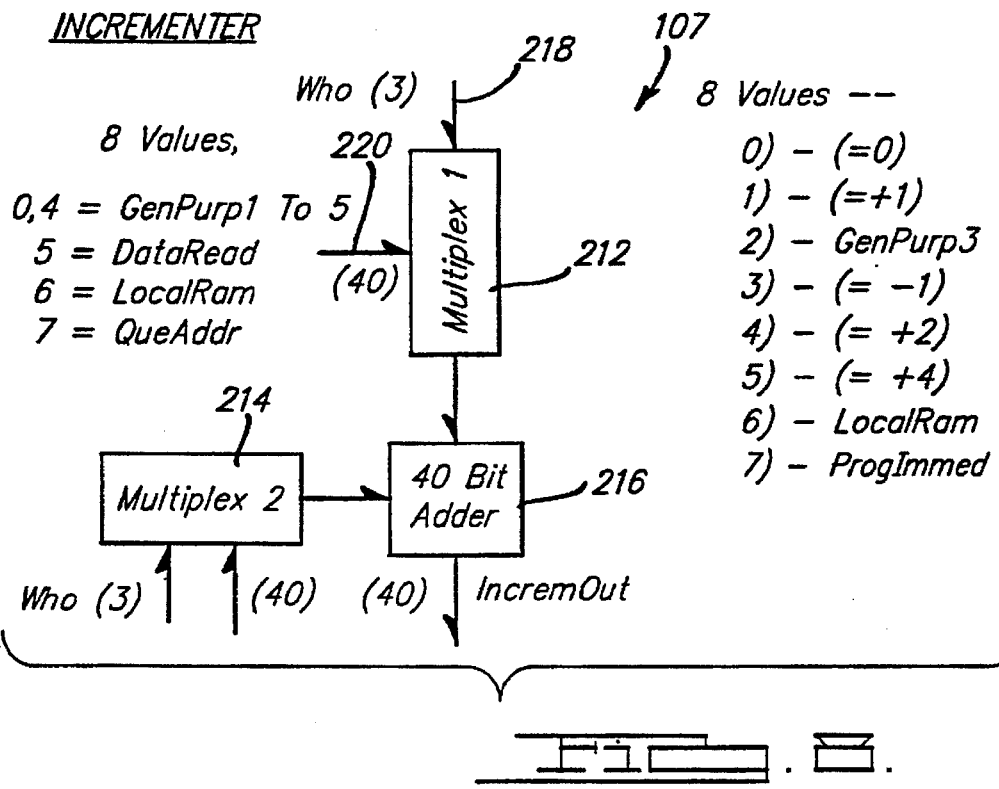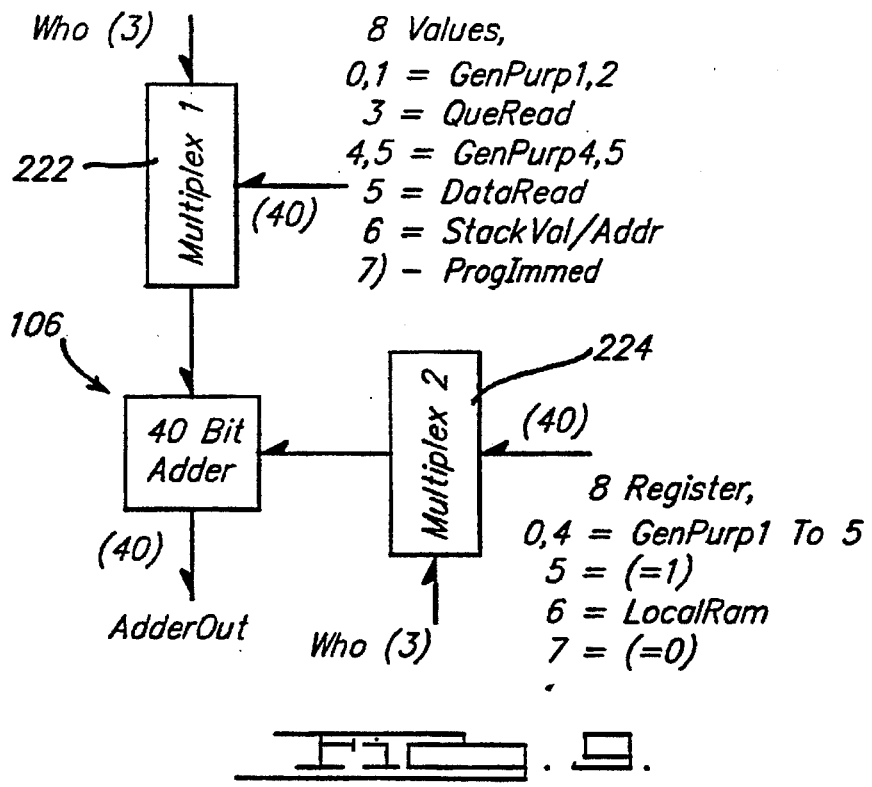

ProgMemory And ProgCounter Diagrams

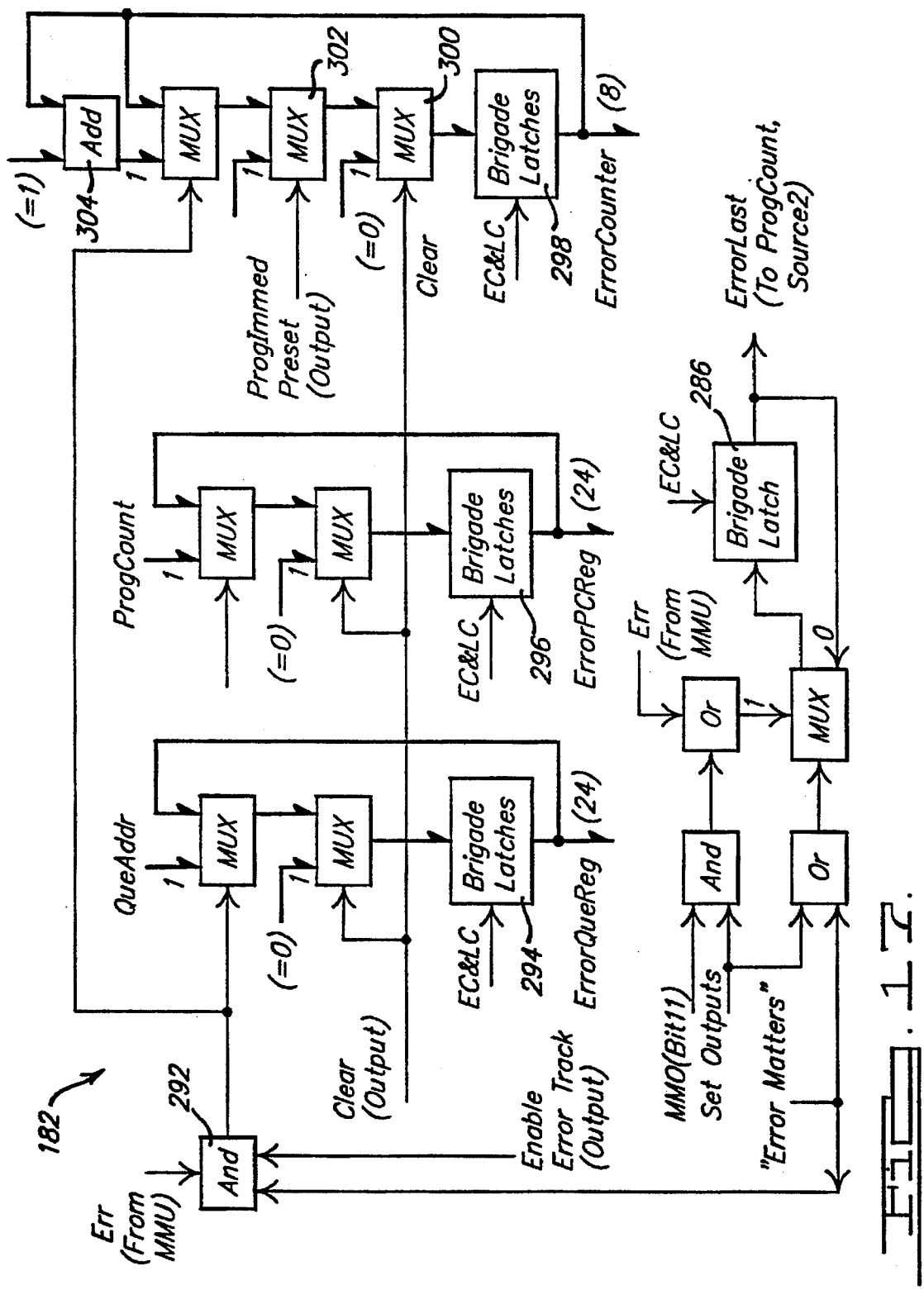

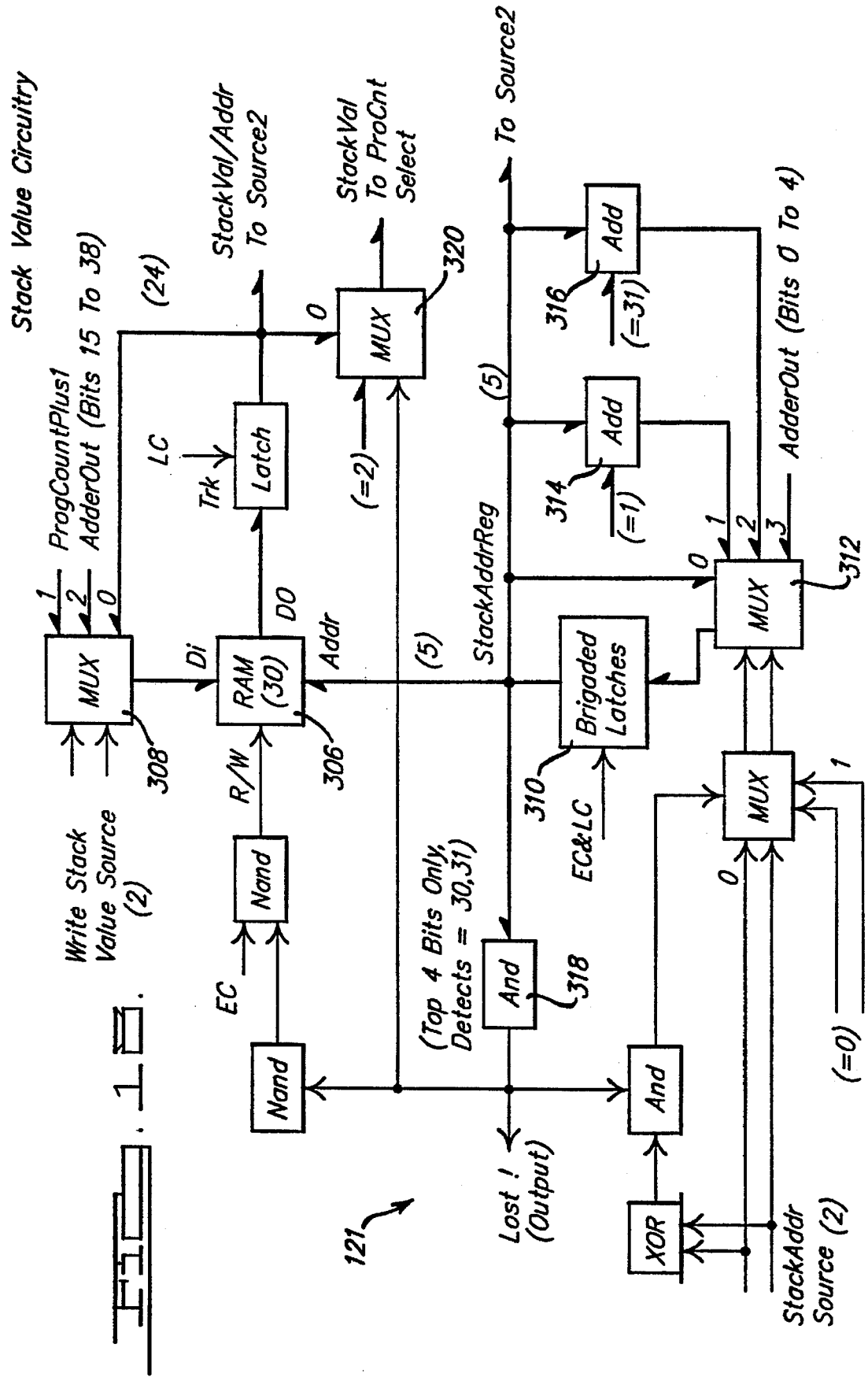

*Rotate/Merge Details*

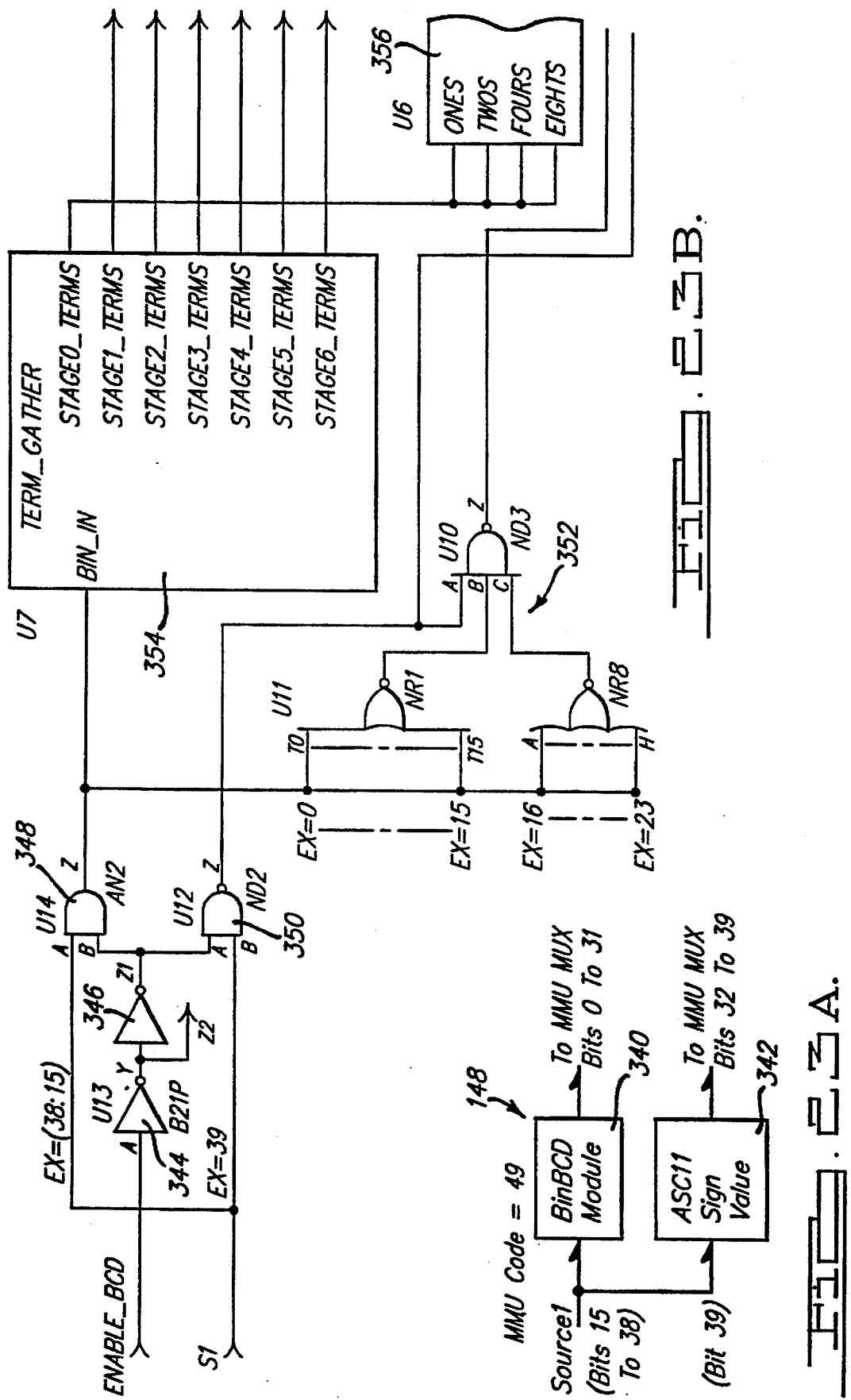

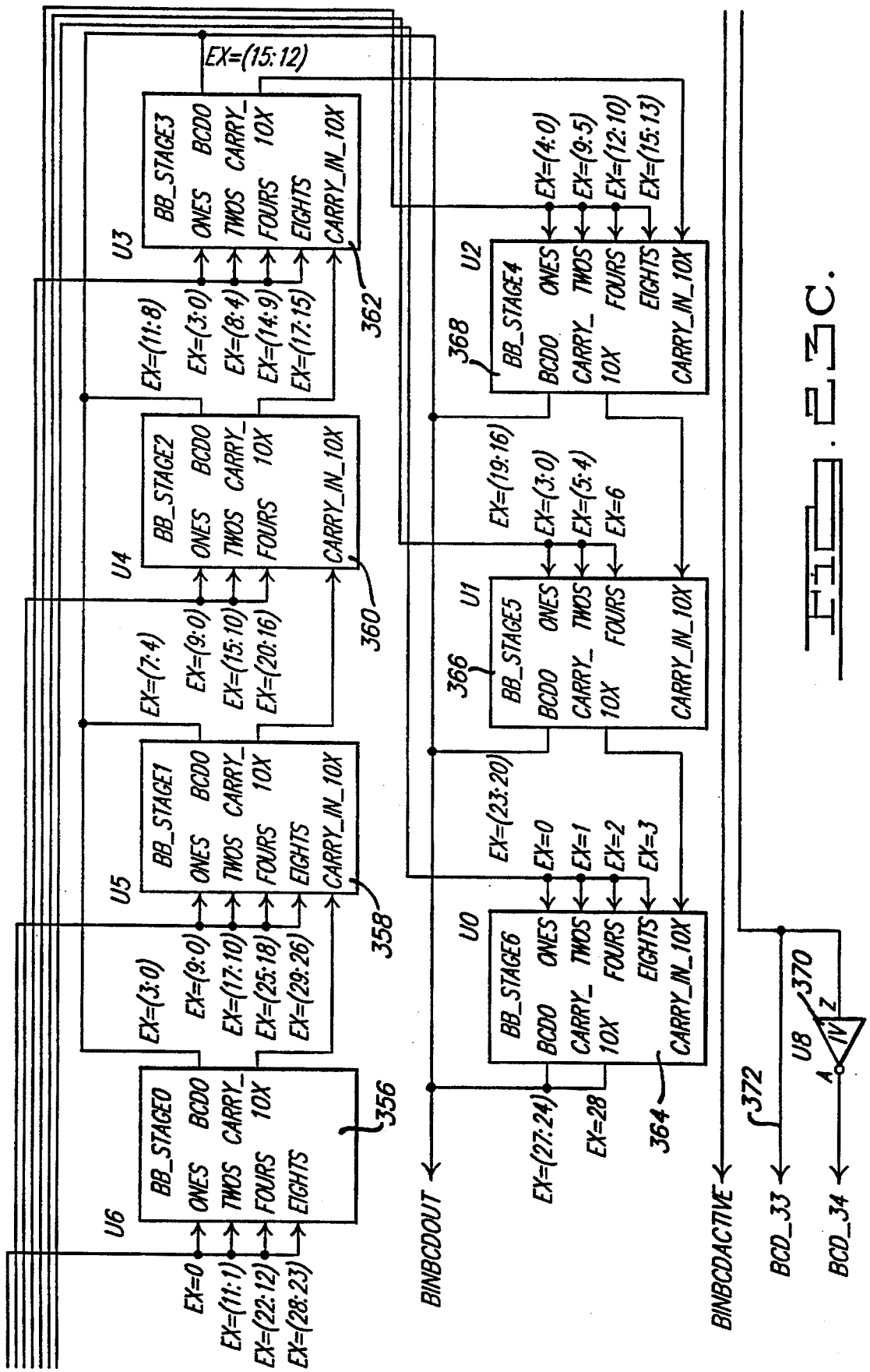

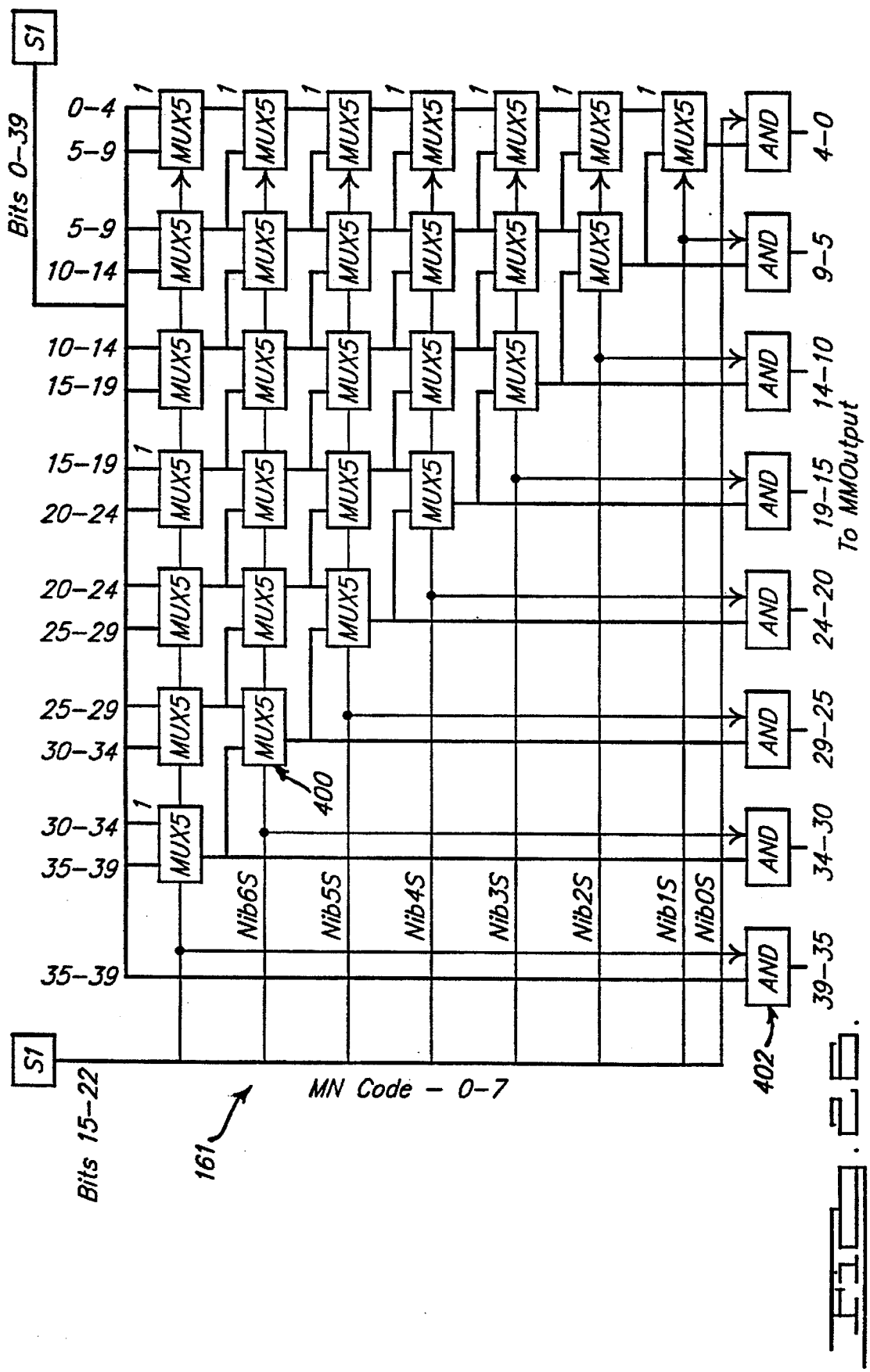

FIG. 27A.

MASSIVELY MULTIPLEXED SUPERSCALAR HARVARD ARCHITECTURE COMPUTER

This is a continuation of U.S. patent application Ser. No. 08/179,256, filed Jan. 10, 1994, now abandoned.

BACKGROUND OF THE INVENTION

The present invention generally relates to computer architectures, and particularly to a compound superscalar Harvard architecture microprocessor which uses extensive multiplexing and a very wide instruction word format.

A computer which includes the following two characteristics is generally referred to as having a "Harvard" architecture. Namely, the computer will be designed with separate instruction and data stores, and independent buses will be provided to enable the central processing unit ("CPU") of the computer to communicate separately with each of these stores. This is in contrast to a "von Neumann" or "Princeton" based computer architecture, which generally employs the same physical store for both instructions and data, and a single bus structure for communication with the CPU. Various approaches have been taken to designing a microcomputer or microprocessor with a Harvard architecture, as represented by the following patents: Yasui et al. U.S. Pat. No. 5,034,887, issued on Jul. 23, 1991, entitled "Microprocessor With Harvard Architecture"; Portanova et al. U.S. Pat. No. 4,992,934, issued on Feb. 12, 1991, entitled "Reduced Instruction Set Computing Apparatus And Methods"; Mehrgardt et al. U.S. Pat. No. 4,964,046, issued on Oct. 16, 1990, entitled "Harvard Architecture Microprocessor With Arithmetic Operations And Control Tasks For Data Transfer Handled Simultaneously"; and Simpson U.S. Pat. No. 4,494,187, issued on Jan. 15, 1985, entitled "Microcomputer With High Speed Program Memory". Additionally, it should be noted that the Intel i860 64-bit microcomputer has been described as having an on-board Harvard architecture, due to the provision of separate instruction and data cache paths. In this regard, a description of the Intel i860 chip design may be found in *i860 Microprocessor Architecture*, by Neal Margulis, Osborne McGraw-Hill, 1990.

The use of separate instruction and data communication paths in a Harvard architecture machine effectively increases the overall speed of the computer by enabling an instruction to be accessed at the same time that data for this or another instruction is accessed. In the context of programmed operations, the instruction is usually referred to as the "opcode" (the operation code), and the data is referred to as the "operand". While the benefit in speed of using the Harvard architecture is significant, the full potential of a machine based upon the Harvard architecture, has yet to be realized. However, a significant advance in the design of a Harvard architecture computer features the use of an address store for containing an ordered sequence of program memory addresses. The address store (referred to as "queue memory") determines the sequence of operations to be implemented through its stack of program memory addresses. In this regard, each of these program memory addresses identify the location of the first instruction of a particular subroutine which is contained in the program memory. The address store may also contain the address of one or more subroutine arguments which is, in turn, contained in either a value store or in a data memory. Thus, the address store may be utilized as a location server for both the program memory and the data memory of a computer which is based upon the Harvard architecture.

The present invention not only builds upon the advance offered by queue memory, but it also represents a significant departure from prior Harvard architecture computer designs. It this regard, it is a principal objective of the present invention to provide a Harvard architecture based microprocessor which achieves a substantial degree of both design and programming flexibility.

It is another objective of the present invention to provide a Harvard architecture based microprocessor which is capable of performing several operations in a single instruction, including small subroutines.

It is also an objective of the present invention to provide a Harvard architecture based microprocessor which enables a single instruction to make multiple uses of the same computer components in a single clock cycle.

It is a further objective of the present invention to provide a Harvard architecture based microprocessor which employs a very wide instruction word format which completely eliminates the need for microcode decoding or even an instruction register.

It is an additional objective of the present invention to provide a Harvard architecture based microprocessor which employs parallel processing to achieve compound superscalar operations.

It is still another objective of the present invention to provide a Harvard architecture based microprocessor which eliminates inefficiencies that could arise when a branch or jump operation is encountered in pipelined instructions.

It is still a further objective of the present invention to provide a Harvard architecture based microprocessor which avoids a metastable condition in which data changes at the same time as the clock.

It is yet another objective of the present invention to provide a Harvard architecture based microprocessor which is capable of inexpensive implementation in an application specific integrated circuit ("ASIC").

SUMMARY OF THE INVENTION

To achieve the foregoing objectives, the present invention provides a massively multiplexed central processing unit ("CPU") which has a plurality of independent computational circuits, a separate internal result bus for transmitting the resultant output from each of these computational circuits, and a plurality of general purpose registers coupled to each of the computational circuits. Each of the general purpose registers have multiplexed input ports which are connected to each of the result buses. Each of the general purpose registers also have an output port which is connected to a multiplexed input port of at least one of the computational circuits. Each of the computational circuits are dedicated to at least one unique mathematical function, and at least one of the computational circuits include at least one logical function. At least one of the computational circuits includes a plurality of concurrently operable mathematical and logical processing circuits, and an output multiplexer for selecting one of the resultant outputs for transmission on its result bus.

The CPU also features a very long instruction word which uses a series of assigned bit locations to represent the selection and operation codes for each of the CPU components. These selection codes are directly transmitted to each of the CPU components by a program control circuit. A separate data control circuit and data bus is further provided in order to achieve a Harvard architecture design for the CPU.

The CPU according to the present invention not only provides true superscalar operation, but some of its operations are sufficiently fast such that multiple uses may be made of the same components in a single clock cycle. For example, the contents of a general purpose register may be added to one in an incrementer computational processor, and then this value may be stored back in the same general purpose register during the same clock cycle.

In one form of the present invention, the CPU also includes a plurality of source multiplexer circuits which are interposed between the general purpose registers and the computational units for maximizing the potential selectivity available in terms of the range of inputs for the computational processors. Additionally, the CPU includes a selectively addressable stack circuit which does not necessarily require a push/pop operation. Furthermore, an on-chip local random access memory ("RAM") circuit is provided to supplement or compliment the capabilities of the general purpose registers. As with most of the components in the CPU, the local RAM is multiplexed, so that it may write values from a variety of sources. The CPU also features a logic analyzer port which provides a window into the internal operations of the CPU.

Additional features and advantages of the present invention will become more fully apparent from a reading of the detailed description of the preferred embodiment and the accompanying drawings in which:

BRIEF DESCRIPTION OF THE DRAWINGS

FIG. 2 is a simplified block diagram of the CPU shown in FIG. 1.

FIGS. 4A-4D illustrate various word formats employed by the CPU.

FIGS. 5A-5H vide a general schematic diagram of the CPU shown in FIGS. 1, 2 and 3A-3B.

FIG. 7 is a detailed block diagram of a brigaded latch circuit of the type employed in several component of the CPU.

FIG. 8 is a detailed block diagram of the incrementer computational processor shown in FIG. 2.

FIG. 9 is a detailed block diagram of the adder computational processor shown in FIG. 2.

FIG. 16 is a detailed block diagram of the interrupt circuit shown in FIG. 3B.

FIG. 17 is a detailed block diagram of the error tracking circuit shown in FIG. 3B.

FIG. 18 is a detailed block diagram of the stack circuit shown in FIG. 2.

FIGS. 23A-23C provide a detailed block diagram of the binary to BCD converter shown in FIG. 3D.

FIG. 26 is a detailed block diagram of the inflation circuit shown in FIG. 3D.

FIGS. 27A-27B are diagrams of exemplary single instructions for the CPU of FIG. 1.

DETAILED DESCRIPTION OF THE PREFERRED EMBODIMENTS

Figure 1:
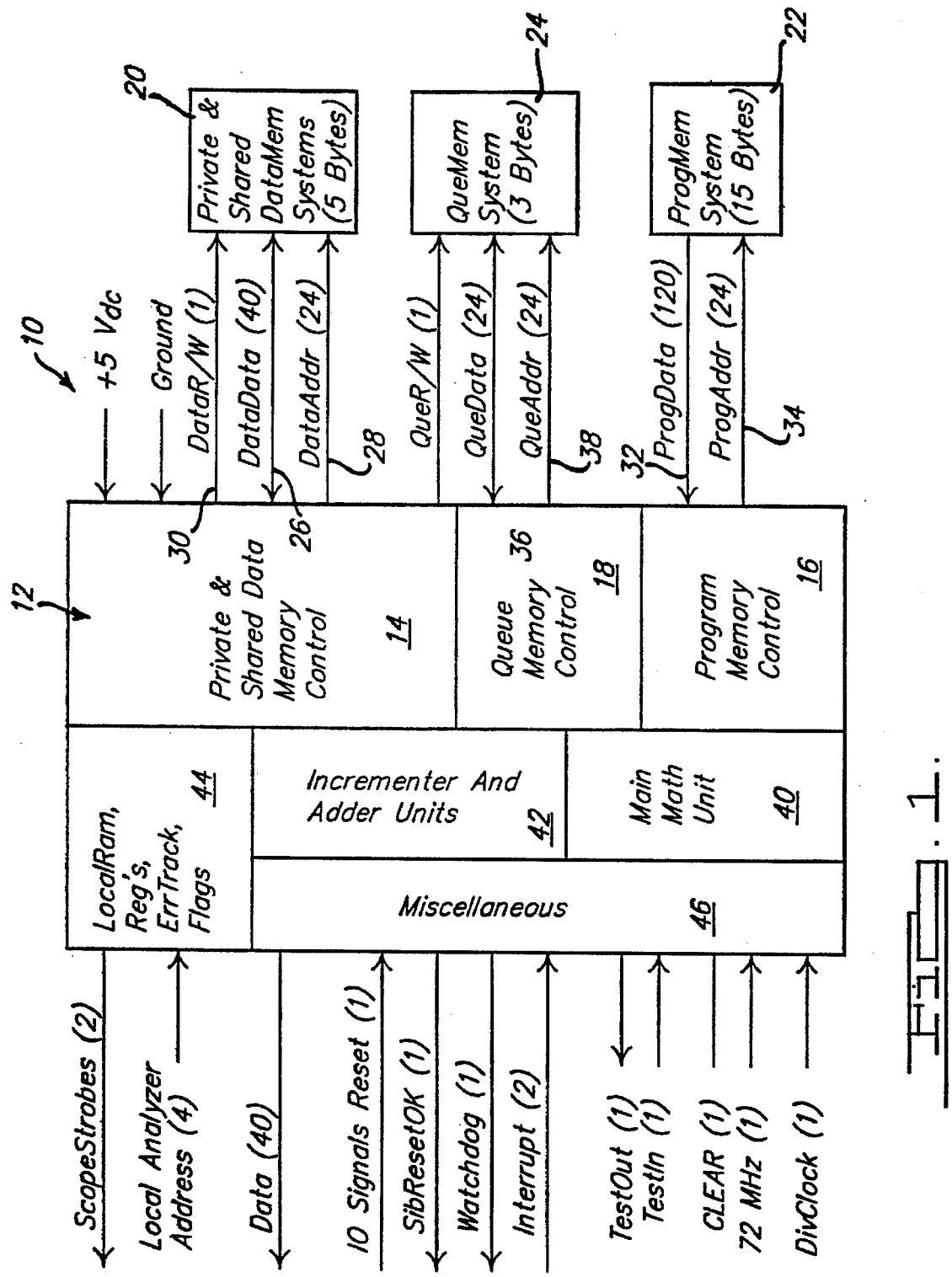
FIG. 1 is a block diagram of a basic computer circuit which includes the CPU according to the present invention.

Referring to FIG. 1, a block diagram of a basic computer circuit 10 is shown which includes the CPU 12 according to the present invention. The CPU 12 may be referred to herein as a microprocessor, in that CPU 12 is preferably embodied in a single integrated circuit. Similarly, the computer circuit 10 may be referred to as a microcomputer, as it employs a single "chip" CPU. However, it should be appreciated that the available nomenclature is less important than the capabilities of the invention itself, which are substantial. In this regard, the CPU 12 is the unit of the present invention which executes programmed instructions, and as will be apparent from the description below, it is quite capable of rapidly performing a multiplicity of intensive and complex computational tasks.

In one embodiment according to the present invention, the CPU 12 may be constructed through the use of a large scale Application Specific Integrated Circuit ("ASIC"). An ASIC is a type of integrated circuit which includes a significant number of logic gates that may be connected together to perform specific circuit functions. For example, the CPU 12 may be embodied in the 391 pin LCA 100K ASIC device by LSI Logic, Corp., Milpitas, Calif. This particular ASIC device contains approximately 247,000 AND gates that may be combined together to form a variety of different circuits. An ASIC implementation has the advantages of being relatively small, fast, and inexpensive. However, it should be appreciated that other suitable integrated circuit technologies may be employed to construct CPU 12 in the appropriate application, including a fully custom integration.

As illustrated in FIG. 1, the CPU 12 includes a data memory control circuit 14, a program memory control circuit 16 and a queue memory control circuit 18. Each of these three memory control circuits operate separately and concurrently, so that data, program instructions, and program pointers may all be accessed internally in the same fundamental clock cycle for the CPU 12. In this regard, the computer circuit 10 may utilize an external data memory system 20, an external program memory system 22 and an external queue memory system 24. However, it should be appreciated that these external memory systems could also be integrated with the CPU 12 in the appropriate application. It should also be noted that the data memory system 20 may include both a memory which is private to the CPU 12 and a memory which may be shared between the CPU 12 and other computer devices. For example, a shared memory may be provided to facilitate the transfer of signals to and from the CPU 12 with a computer device which is dedicated to handling communications with other computer entities.

As further shown in FIG. 1, the CPU 12 provides a 40-bit data bus 26 and a 24-bit data memory address bus 28, which are both externally accessible for interfacing with the data memory system 20. Accordingly, it should be appreciated that the CPU 12 has the capability to address up to 16,777,216 40-bit data words. A read/write line 30 is also provided to direct the flow of data into and out of the CPU 12. In contrast to the above, the CPU 12 provides a 120-bit program data bus 32 and a 24-bit program memory address bus 34 for interfacing with the program memory system 22. As will be discussed more fully below, 80-bits of the very wide 120-bit program data word are used to direct the operation of specific components in the CPU 12. The remaining 40-bits of the 120-bit program data word mirror the format of the 40-bit data word. In this regard, this additional 40-bit capability may be used to incorporate programmed data or address values into an instruction. The CPU 12 also features a 24-bit queue data bus 36 and a 24-bit queue memory address bus 38 for interfacing with the queue memory system 24. The 24-bit wide path provided for the queue data bus 36 is a reflection of its use in transmitting address pointers to the program memory system 22. However, it should be understood that each of the bus widths provided above may be increased or decreased to accommodate a particular implementation. Nevertheless, it should be appreciated that the width of the program data bus 32 should be sufficiently large to specify each of the opcodes that determine the tasks that could be executed by the CPU 12.

As illustrated in FIG. 1, the CPU 12 includes a plurality of separate and simultaneously operable computational processors. More specifically, FIG. 1 shows the provision of a main math unit 40, an adder unit and an incrementer unit. For purposes of illustration, the adder and incrementer units are combined under reference numeral 42, even though these units represent independent computational processors. While the adder and incrementer units 42 are dedicated to the functions explicit in their names, the main math unit 40 includes a number of simultaneously operable mathematical and logical circuits. For example, the main math unit 40 includes circuits for subtracting, dividing, multiplying, converting binary values to a binary-coded-decimal ("BCD") format, logical ANDing, logical ORing and logical ExORing. However, the main math unit includes an output multiplexer circuit which selects one of the resultant outputs for transmission to other circuits in the CPU 12.

The CPU 12 further features a plurality of general purpose registers, a local RAM circuit, and an error tracking circuit. For illustration purposes, these particular components are generally identified by reference numeral 44. Similarly, for sake of illustration at this point, several other circuit components are generally represented by miscellaneous circuits 46. These circuits include a 40-bit wide logic analyzer multiplexer, a comparator circuit, an interrupt circuit, and data compression/expansion circuits. It should also be noted that the CPU 12 receives one 72 MHz clock signal, which provides the fundamental clock frequency for the CPU 12. However, as will be described in connection with FIG. 6, the miscellaneous circuits 46 generate several different clock signals from this fundamental clock frequency.

Turning now to FIG. 2, a simplified block diagram of the CPU 12 is shown in order to provide an overview of internal multiplexing and bus structures according to the present invention. As briefly mentioned above, the CPU 12 includes a plurality of general purpose registers 100. Each of these general purpose registers are capable of receiving, storing and transmitting a 40-bit wide data word. In the embodiment described herein, a total of five general purpose registers are provided. This number of general purpose registers is related to the number of tasks for which it would be desirable to facilitate simultaneous execution. For example, it will be shown below that the CPU 12 has three major computational buses. Accordingly, there should be at least three general purpose registers to enable the CPU 12 to store the resultants transmitted on each of these computational buses. However, it should be appreciated that the number of general purpose registers may be modified in the appropriate application. With respect to this particular embodiment, FIG. 2 shows that each of the general purpose registers 100 are connected to an S1 multiplexer 102, an S2 multiplexer 104, an adder circuit 106, an incrementer circuit 107, a comparator circuit 108 and the data memory control circuit 14. Certain ones of the general purpose registers 100 are also connected to other components in the CPU 12 as well. However, these connections have not been illustrated in the simplified block diagram of FIG. 2.

The S1 multiplexer 102 and the S2 multiplexer 104 enable the 40-bit data words from each of the general purpose registers 100 to be selectively directed to the circuits contained in the main math unit 40. For purposes of illustration, the main math unit 40 is shown in FIG. 2 to comprise a math block 110, a logic block 112 and an output multiplexer 114. As will be discussed below, the math block 110 includes a plurality of mathematical processing circuits, and the logic block 112 includes a plurality of logic processing circuits. In this regard, it should be noted that the 40-bit wide output bus from the S1 multiplexer 102 is connected to each of the processing circuits contained in the main math unit 40. Likewise, the 40-bit wide output bus from the S2 multiplexer 104 is connected to each of the processing circuits contained in the main math unit 40, except for those components as shown in FIG. 3D. Accordingly, it should be understood that the CPU 12 provides substantial multiplexing flexibility in terms of directing the contents of the general purpose registers 100 to particular processing circuits in the main math unit 40. Additionally, and importantly, it should be noted that each of the processing circuits in the main math unit 40 will execute their assigned tasks at the same time, and the main math multiplexer 114 may then be employed to select which resultant answer is desired. For example, the main math unit 40 will add the S1 and S2 data words, as well as logically AND these two data words, at the same time without further direction or selection. The main math multiplexer 114 is instructed to select which of these resultants will be utilized by other components in the CPU 12. It should also be noted that the main math multiplexer 114 may simply select the S1 multiplexer data word or the S2 multiplexer data word as its output in lieu of one of the mathematical and logical resultants provided to it.

The 40-bit data word output from the main math unit bus 116 provides one of three major computational data buses which are contained within the CPU 12. The other two computational data buses 118–120 are derived from the adder circuit 106 and the incrementer circuit 107 respectively. The adder circuit 106 and the incrementer circuit 107 are both 40-bit full adders with sign. Each of these three computational data buses are connected to each of the general purpose registers 100. An input multiplexer is provided in each of the circuits which comprise the general purpose registers 100 in order to enable a selection to be made between the data words present on the computational data buses, as well as to select its own output. Thus, for example, the first general purpose register may be used to receive and store the resultant from a binary to BCD conversion performed by the main math unit 40, while the second general purpose register may be used to store the resultant from the adder circuit 106, and the third general purpose register may be used to store the resultant from the incrementer circuit 107. As will be discussed in more detail below, each of these computational tasks and the subsequent storage of the resultants in the general purpose registers 100 may be performed in a single clock cycle through the use of a single instruction.

FIG. 2 also shows a connection between the incrementer circuit 107 and the queue memory control circuit 18. In this way, the incrementer circuit 107 may be used to set the address of the queue memory system 24, and thereby determine when the next program address pointer will be supplied to the CPU 12. Similarly, the adder circuit 106 is connected to the stack circuit 121. In this way, the adder 106 circuit may be used to set the address employed by the stack circuit 121 to store data words such as the return address of a subroutine. The incrementer circuit 107 and the adder circuit 106 will be discussed more fully in connection with FIGS. 8 and 9 respectively.

In addition to the three major computational buses, 116, 118, 120, the data memory control circuit 14 provides an internal 40-bit data bus 15. The internal data bus 15 is connected to the main math unit 40 (through the S1 and S2 multiplexers), the adder circuit 106, the incrementer circuit 107 and the comparator 108. In other words, the internal data bus 15 is capable of directing an input data word to each of the computational processing circuits contained in the CPU 12. The internal data bus 15 is also connected to several other circuits, as will be discussed more fully below.

The comparator 108 may be used to establish the value of any bit(s) in any of the general purpose registers 100. In this regard, the resultant from the comparator will be transmitted to the output circuit 122 and the program memory control circuit 16. The output circuit 122 is the module where a collection of signals are "put" together in order to form a single word for ease of use. The comparator 108 may also be used to create a logic signal for changing the program flow. In this case, the resultant from the comparator 108 will be utilized by the program memory control circuit 16. The comparator 108 is capable of performing the following operations: equal to, not equal, greater than, less than, greater than or equal, less than or equal, S1 multiplexer 102 and S2 multiplexer 104 not equal to zero, and Boolean bit true (for S1 multiplexer 102, bit 15).

The program memory control circuit 16 is used to receive and latch (that is store) the 120-bit program instruction from the program memory system 22, as well as address the program memory system. The output signals from the program memory control circuit 16 include each of the "opcode" control lines which direct the operation of the other circuit components in the CPU 12. These opcode control lines generally comprise an 80-bit wide opcode or select bus 17. The program memory control circuit 16 also includes a program counter which could be employed by the stack circuit 121. FIG. 2 also shows that the CPU 12 includes a local RAM circuit 124. The local RAM circuit 124 provides the capacity to store up to 256 40-bit data words. As in the case of the general purpose registers 100, the local RAM circuit 124 includes an input multiplexer for selecting between the three computation buses 116, 118, 120, as well as its own output. The address for the local RAM circuit 124 is generated by one of two sources, namely from the general purpose register GP4 or directly from the program memory data bus.

FIG. 2 further shows the provision of a logic analyzer multiplexer 126. The logic analyzer multiplexer 126 is used as a view port in order to determine the state of the internal operations of the CPU 12. In this regard, FIG. 2 shows that the logic analyzer multiplexer 126 receives a number of input signals that can be alternatively selected for external analysis. For example, the logic analyzer multiplexer 126 is connected to each of the three computational buses 116, 118, 120, as well as the output circuit 122 and each of the general purpose registers 100. As illustrated in FIG. 1, the logic analyzer multiplexer 126 is externally addressed, as opposed to being internally addressed through the opcodes on select bus 17. This ensures that the operation of the logic analyzer multiplexer 126 does not depend upon the proper operation of other on-chip circuits, such as the program memory control circuit 16.

Figure 3A:
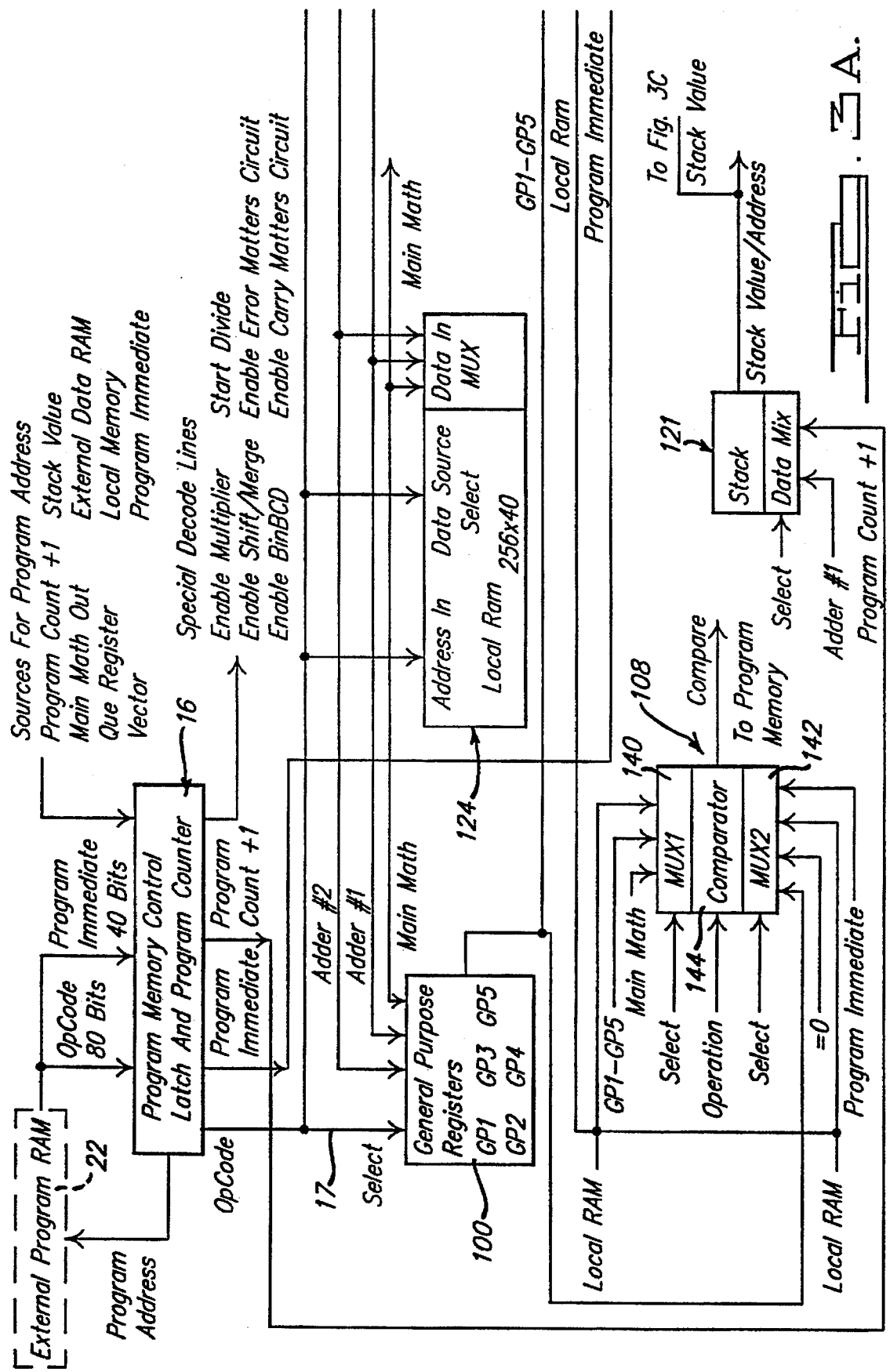
FIGS. 3A-3D provide a more detailed block diagram of the CPU shown in FIGS. 1 and 2.
Figure 3B:
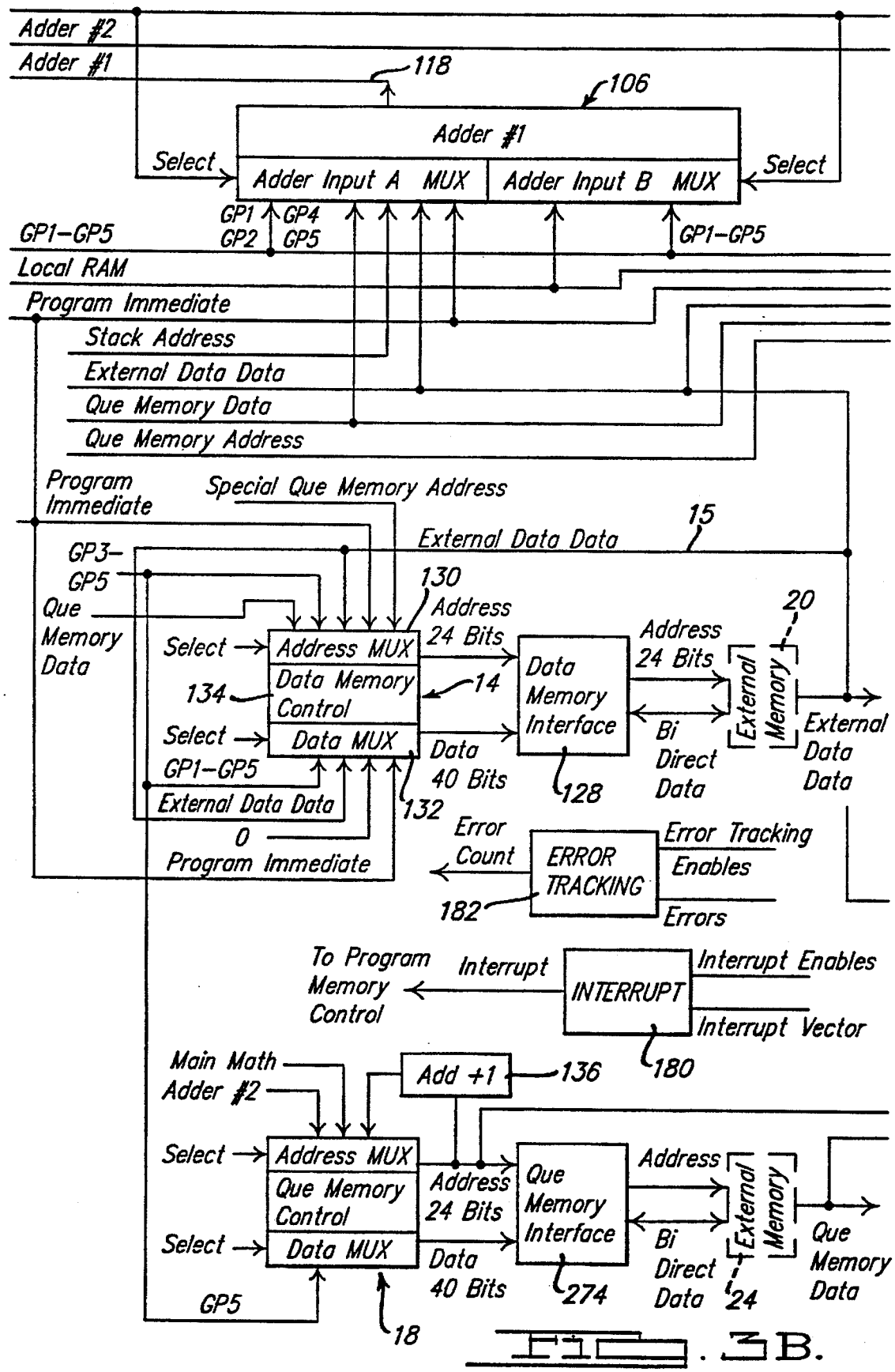
Figure 3C:
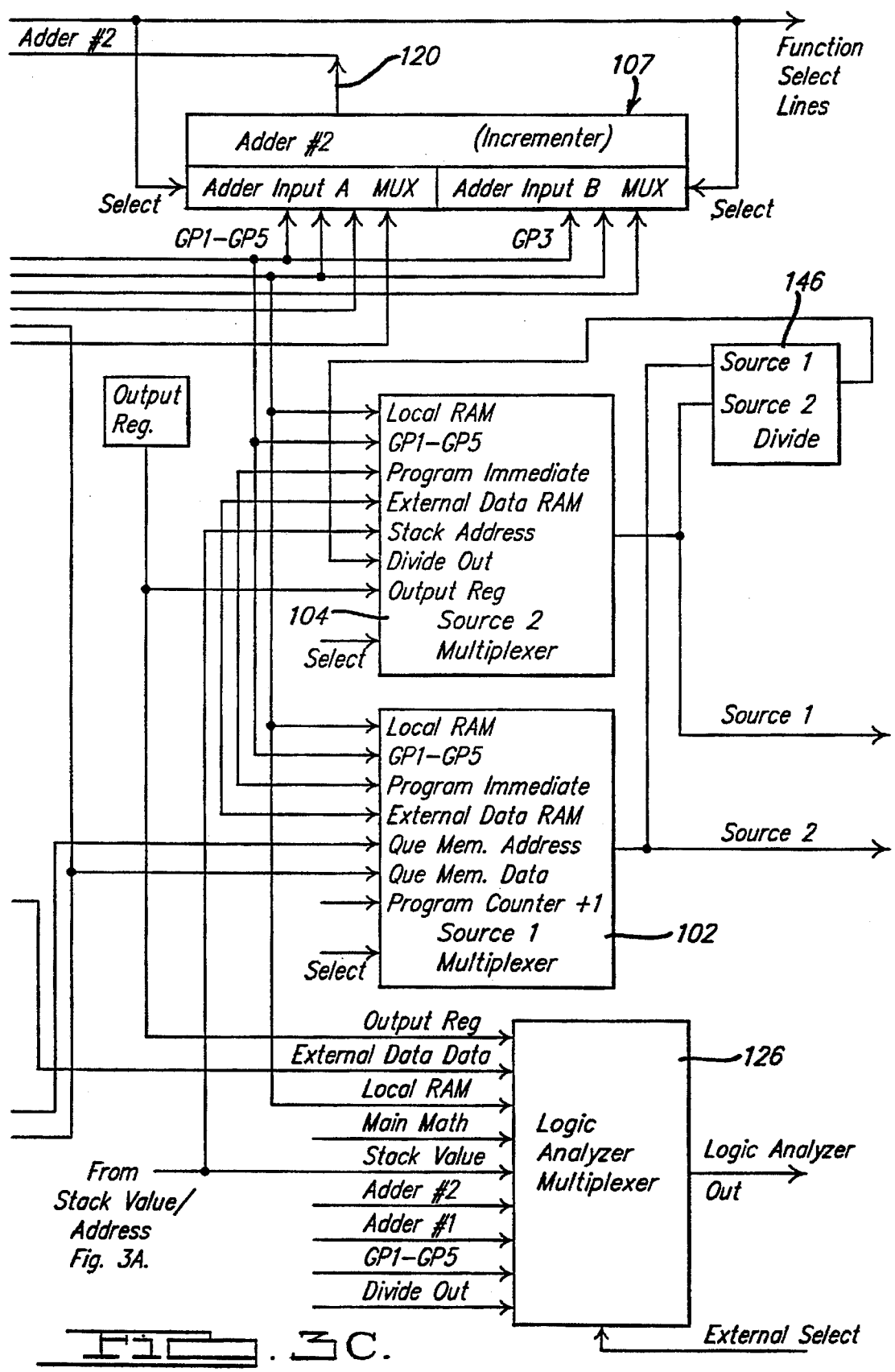
Figure 3D:
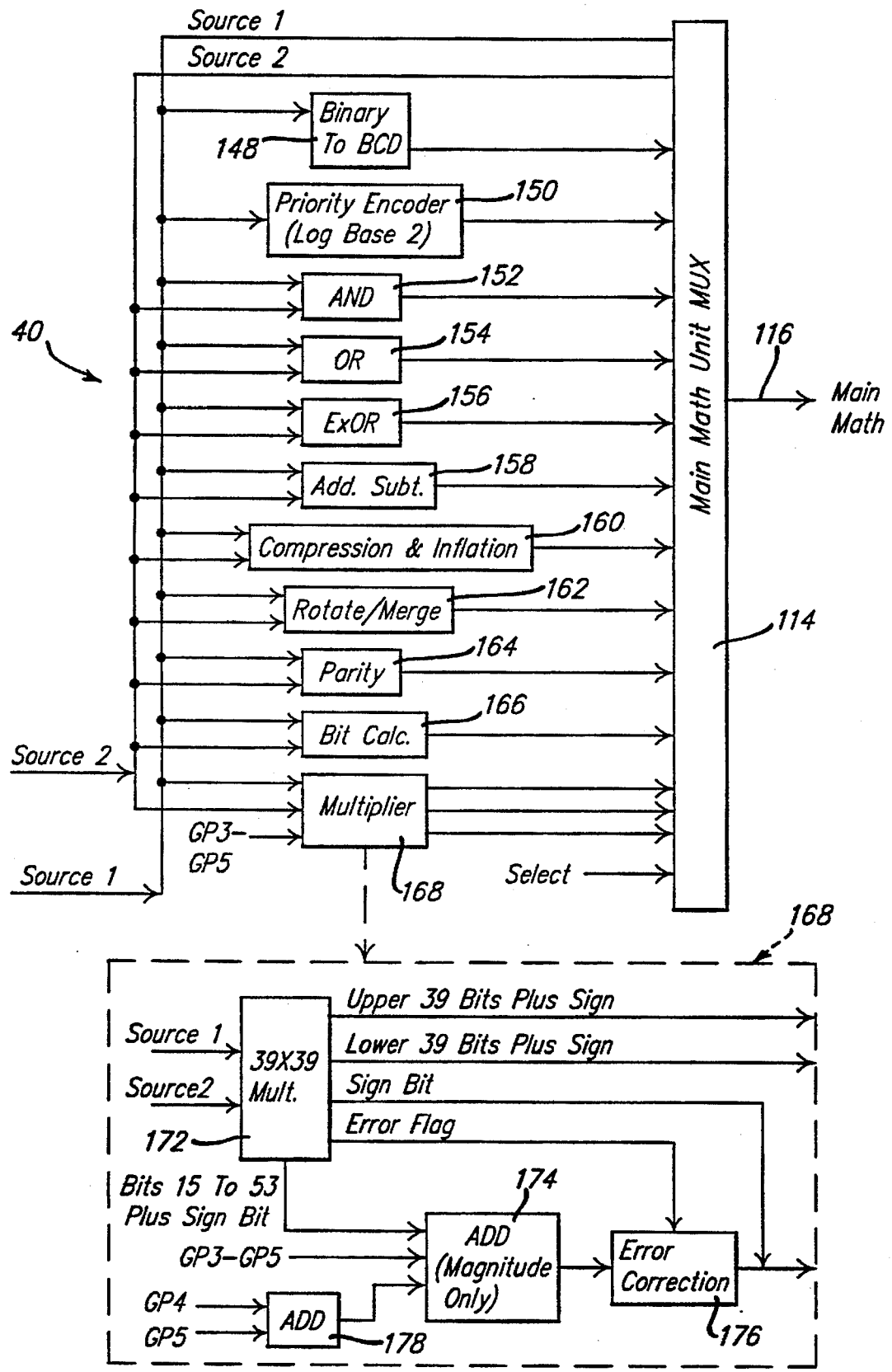

Referring to FIGS. 3A-3D, a more detailed block diagram of CPU 12 is shown. In FIG. 3B, the data memory control circuit 14 is shown to include a data memory interface circuit 128 which is connected to the private and shared data memory system 20. The data memory control circuit 14 also includes a data address multiplexer 130, a data word multiplexer 132 and a latch circuit 134. While this data memory control circuitry will be discussed more fully in connection with FIG. 13, it should be appreciated that the address for requesting data from the external data memory system 20 may be derived from a variety of sources. Similarly, the 40-bit wide data word itself may be derived from a variety of sources, including the external data memory system 20.

FIG. 3B also shows that the queue memory control circuit 18 utilizes a similar circuit arrangement to that of the data memory control circuit 14. However, the queue memory control circuit 18 includes an add circuit 136 which may be selected to automatically increment the queue memory address by one. Additionally, it should be noted that the queue memory address value may be derived from the general purpose register GP5. While general purpose register GP5 has been selected from this function, it should be understood that one or more of the other general purpose registers could be used as well to supply the queue memory address value.

FIG. 3A shows each of the input and output signal line connections for the program memory control circuit 16. In this regard, FIG. 3A illustrates that the program address may be selected from eight different sources, including the queue memory data bus 138. As indicated above, the select bus 17 represents a set of individual conduits which are routed to their assigned components. Accordingly, it should be appreciated that the input connection of the select bus 17 to a particular component may represent one or more of the eighty conduits which comprise the select bus 17 in this embodiment. In order that these connections may be more fully understood, Table 1 below sets forth each of the assigned bit locations in the select bus 17.

TABLE 1

PROGRAM MEMORY BIT ASSIGNMENTS

| BIT LOCATION | NO. OF BITS | FIELD MEANING |
|---|---|---|
| 0 to 5 | 6 | Main math function selection |
| 6 to 7 | 2 | Main math Shift/Merge Mask selection |
| 8 to 11 | 4 | Source1 Channel selection |
| 12 to 15 | 4 | Source2 Channel selection |
| 16 to 18 | 3 | Incrementer Mux1 selection |
| 19 to 21 | 3 | Incrementer Mux2 selection |
| 22 to 24 | 3 | Adder Mux1 selection |
| 25 to 27 | 3 | Adder Mux2 selection |
| 28 to 30 | 3 | Comparator Mux1 selection |
| 31 to 33 | 3 | Comparator Mux 2 selection |
| 34 to 36 | 3 | Comparator Mnemonic selection |
| 37 | 1 | Set the OutputReg equal to MainMathOut |
| 38 to 39 | 2 | GenPurp1 Input selection |
| 40 to 41 | 2 | GenPurp2 Input selection |
| 42 to 43 | 2 | GenPurp3 Input selection |
| 44 to 45 | 2 | GenPurp4 Input selection |
| 46 to 47 | 2 | GenPurp5 Input selection |
| 48 to 49 | 2 | QueueAddressReg Input selection |
| 50 | 1 | QueMem Read/Write signal |
| 51 to 52 | 2 | LocalRam Input selection |
| 53 to 60 | 8 | LocalRam Address value |
| 61 to 62 | 2 | StackRam Input selection |
| 63 to 64 | 2 | StackAddressReg Input selection |
| 65 to 67 | 3 | Jump condition selection |
| 68 to 70 | 3 | Jump ProgCount source selection |
| 71 | 1 | Shared DataMem Active |
| 72 | 1 | Private DataMem Active |
| 73 | 1 | DataMemory Read/Write signal |
| 74 to 76 | 3 | DataMemory Address source selection |
| 77 to 79 | 3 | DataMemory Write value source selection |
| 80 to 119 | 40 | Program Immediate value |

Taking the input selection for general purpose register GP1 as an example, it will be seen from Table 1 that two bit fields (that is, two conductors) are provided for controlling the selection to be made by the input multiplexer to this general purpose register, namely bit locations "38" and "39". In this regard, it should be remembered that each of the general purpose registers 100 may select between four different inputs, namely the main math unit computational bus 116, the adder computational bus 118, the incrementer computational bus 120, and its own output (shown in FIG. 11). With the need to select between four input signals in this embodiment, it should be appreciated that only two select lines are required to create a possibility of four different binary combinations. These select lines are sometimes referred to herein as "who" lines, as the binary states on these lines determine which input signal will be selected. For example, in the case of the general purpose registers 100, the data previously written to the register in question will be re-written to it when its select bits are "00". Similarly, when the select bits are "01" (that is, an address of one), the contents on the main math computational bus 116 will be written to the general purpose register. In the case of general purpose register GP1, this means that select line "38" will be a digital "1", while select line "39" will be a digital "0". Likewise, when the select bits are "10" (an address of two), the contents on the adder computational bus 118 will be written to the general purpose register. Lastly, when the select bits are "11" (an address of three), the contents on the incrementer computational bus 120 will be written to the general purpose register. At this point, it should be noted that in CPU 12 the least significant bit position will contain the least significant value of any binary data field.

While each of the general purpose registers 100 requires only two select lines for their operation, several of the other components require the use of considerably more select lines. For example, as shown in Table 1, the comparator 108 uses a total of nine select lines. Specifically bit locations "28–30" are used to control input (MUX1) multiplexer 140, bit locations "31–33" are used to control input (MUX2) multiplexer 142, and bit locations "34–36" are used to control the type of operation to be performed by the comparator circuit itself. In this regard, the comparator 108 is capable of performing eight different functions on two groups of eight different input signals. The comparator functions are shown below in Table 2, while the multiplexer assignments are shown in Table 3.

TABLE 2

COMPARATOR FUNCTIONS

| ADDRESS | OPERATION |
|---|---|
| 0 | Equal |
| 1 | Not Equal |
| 2 | Greater than |
| 3 | Less than |
| 4 | Greater than or equal |
| 5 | Less than or equal |
| 6 | Boolean bit (If Mux1 bit 15 is true) |
| 7 | Mux1 and Mux2 not equal to zero |

TABLE 3

MULTIPLEXER ASSIGNMENTS FOR THE COMPARATOR

| MUX 1 inputs | MUX 2 inputs |
|---|---|
| 0 GenPurp1 | 0 GenPurp1 |
| 1 GenPurp2 | 1 GenPurp2 |
| 2 GenPurp3 | 2 GenPurp3 |
| 3 GenPurp4 | 3 GenPurp4 |
| 4 GenPurp5 | 4 GenPurp5 |
| 5 DataRead | 5 Value 0 |
| 6 LocalRam | 6 LocalRam |
| 7 MainMathOut | 7 ProgImmed |

From the above, it should be appreciated that the comparator 108 may be used to compare any of the MUX1 input signals with any of the MUX2 input signals in a variety of different ways. Thus, for example, a determination may be made to see if the contents of general purpose register GP2 are greater than or equal to the contents of local RAM 124. If the result is true (that is, a precise match is found), then the output of the comparator 108 will become true. In this regard, a binary "1" (000004.0000) represents a true condition, and a binary "0" represents a false condition. The result of the comparison may be accessed from the output register 122 at bit position "17". The result of the comparison may also be used in the program memory control circuit 16 to determine jump conditions.

The main math unit 40 is different from most of the other components contained in the CPU 12 in that it does not have an input multiplexer. Rather, the multiplexing function is performed on the output side of the main math unit 40, through the main math multiplexer 114. The main math unit 40 is shown in more detail in FIG. 3D. Specifically, FIG. 3D includes a circuit block to illustrate each of the mathematical and logic tasks that the main math unit 40 is capable of executing. Each of these mathematical and logic circuit blocks direct their output signals to the main math multiplexer, except for the divider circuit 146 (shown in FIG. 3C). Rather, the 40-bit output signal from the divider circuit 146 is directed to the S2 multiplexer 104 as one of its input sources. This is because the divider circuit 146 employs the conventional "shift and subtract if possible" algorithm which requires several iterations to complete (that is 21 clock cycles). Thus, it should be appreciated that division is performed as a background process in the CPU 12.

As shown in FIG. 3D, the main math unit 40 also includes a binary to BCD converter 148, a priority encoder 150, a logical AND circuit 152, a logical OR circuit 154, an Exclusive OR circuit 156, an adder/subtractor circuit 158, compression and inflation circuits 160, a rotate/merge circuit 162, a parity checker 166, a bit calculator 164 and a multiplier circuit 168. The binary to BCD converter 148 is provided to convert a 6-digit Hexadecimal number to a 8-digit binary coded decimal number. The value to be converted is supplied through the S1 multiplexer 102. The binary to BCD conversion is the only task in the CPU 12 which takes two clock cycles. Except for this task and the divide task, all of the other tasks can be executed within one clock cycle. Accordingly, it should be appreciated that the data input via the S1 multiplexer 102 must remain stable and selected for two consecutive instructions before the results can be accurately read from the output of the main math multiplexer 114.

The priority encoder 150 is used to assist a log operation (to the base 2) and an anti-log operation (to the base 2). In this regard, the priority encoder 150 will detect the largest valued non-zero bit, ignoring the sign bit, from the S1 multiplexer 102. In order to more completely understand this operation, a preliminary discussion of the numbering system employed by the CPU 12 may be helpful. In this regard, FIG. 4A shows a diagram of the general 40-bit data word format used by the CPU 12. Virtually all numbers are represented in a "sign+magnitude" manner, as opposed to two's compliment. Integer numbers will occupy bits "15" through "39", with the sign bit occupying bit position "39". Real numbers will occupy all bit positions. This particular format eliminates the need for scaled arithmetic, and it also enhances the effectiveness of data compression techniques. It should also be noted that the integer portion of the general data word may be used to represent addresses, with the address bit "0" occupying bit "15" of the data word.

Translation to a Hexadecimal format is as follows. If the sign bit is a binary "1", then the number is negative. Otherwise, the number will be positive. The integer portion is a straight-forward conversion of the 24-bits into 6-Hex digits. Fractional parts are taken 4-bits at a time from left to right. The Least Significant Bit ("LSB") of the last byte is always assumed to be a binary "0". This gives a range of 0.0000 to 0.FFFE, there being no representation for numbers where the LSB is "1" (that is, 0001, 0003, 0005, FEC7, and so forth). The CPU 12 allows both representations of zero. For example, the comparator 108 will recognize positive zero as being greater that negative zero. To prevent errors in calculations, the main math unit 40 will only return a positive zero for its calculations. However, the adder circuit 106 and the incrementer circuit 107 may return a negative zero. It should also be noted that "−1" is provided as a selectable choice at one of the two input multiplexers to the incrementer circuit 107, and that this is actually a twos compliment number, as opposed to a "sign+magnitude" number.

With this numbering system at hand, an example of the operation for the priority encoder 150 may now be given. Thus, if the S1 multiplexer 102 provides a Hex value of 1.FFFE, then the result achieved from the priority encoder 150 would be +F.0000. This would indicate that the highest valued non-zero bit is in position "15". Similarly, if the S1 multiplexer 102 provides a Hex value of 5E.4A3.25CBA, then the output from the priority encoder 150 would be +21.0000. Using the hardware assistance provided by the priority encoder 150, the "characteristic" value for scientific notation (that is, floating point notation) may then be obtained through software manipulation. In this regard, the input word may be visualized in accordance with the diagram of FIG. 4B, where y can go from +/−32. If z=[(1+x1+x2)*2 to the y], then a close approximation to the log of z can be determined from a series expansion as approximately:

$$\log(2) \text{ of } z = y + \text{Log2}(1+x1) + \left[ \left[ x \frac{2}{513/512 + x1} \right] * \log 2 \right]$$

$$= Y + k1 + (x2 * k2)$$

where $$k1 = \text{Log2}(1 + x1) \text{ and}$$

$$k2 + \log 1(E) * \left[ \frac{1}{513/512 + x1} \right]$$

A table look-up (based upon the value of x1) will yield the values of k1 and k2 (there will be 256 segments). The combined answer is then:

$$\log 2(z) = y + k1 + (x2 * k2)$$

with the answer in the format shown in FIG. 4C.

Summarizing the process then:

1) Submit z to the Log assist hardware, which will put the bit position into a register (subtract 15 to get the value of y).
2) Shift z to get the MSbit into bit 33, in order to determine x1 and x2.
3) Using x1 as the index, do the Table look-up to get k1 and k2.
4) Compute log2(z) (Note, if y is negative, a slightly different algorithm would apply).

Note that the number of x1 segments and the final format yields a 1 part per million accurate value for the log. Also, this value can be converted to the normal data word format by multiplying it by (2 to the −19th).

The anti-log conversion to the base 2 will now be described. Given a number in the above described Log format, it can be parsed as shown in FIG. 4D. For positive values, then, z=2 to the power (y+x1+x2). Note that x1 is 512 segments long. So, because x2 is small, and using another series expansion, $$z=[2 \text{ (to the } y)]*[2 \text{ (to the } x1)]*[1+x2*Ln2]$$

Summarizing the process, then:

1) Parse the input word into 3 segments, y, x1, and x2.
2) By Table look-up, determine the value of 2 (to the x1).
3) Compute equation [2 (to the x1)]*[1+x2*Ln2].
4) Shift the above value by y places.

An example will now be given using the alogrithms described above for Log and anti-Log conversions. In this example, the problem will be to take the square root of 20,000. This example will take the Log of the number, divide it by 2, and then take the anti-log to get an answer.

Step 1—The Log assist hardware (and some shift/merging) yields an intermediate value of 1.2207031×(2 to the 14)

(14 is derived from the bit position being 29, and subtracting 15 (decimal point position), and shifting the original word to the left to conform to the intermediate format.)

This leads to the values of x1=56/256, and x2=1/512.

Applying the equations, $$\log_2(z) = 14 + \log_2(1 + 56/256) +$$
$$[Log_2(E) * (1/512)/(513/512 + 112/512)]$$
$$= 14 + .285,402,2 + .002,308,3 = 14.287,710,5$$

Step 2—Divide the Log value by 2—=7.143,885,25

Step 3—Taken the anti-Log 2 of 7.143,885,25. Parsing the number, y=7, x1=73/512, and x2=0.001,277,1 (=0.653/512)

$$\text{Answer} = [2 \text{ to the } 7] * [2 \text{ to the } 73/512] * [1 + x2 * Ln2]$$
$$= \text{left shift 7 times } [1.103,876,003] * [1.000,885,218]$$
$$= [2 \text{ to the } 7] * [1.104,853,174]$$
$$= 141.421,206$$

When a scientific calculator is used to solve the same problem (that is, a TI-60), the answer will be given as 141.421,356. Accordingly, it should be appreciated that the answer provided from the algorithms set forth above is still correct to 1 part per million.

Figure 20:
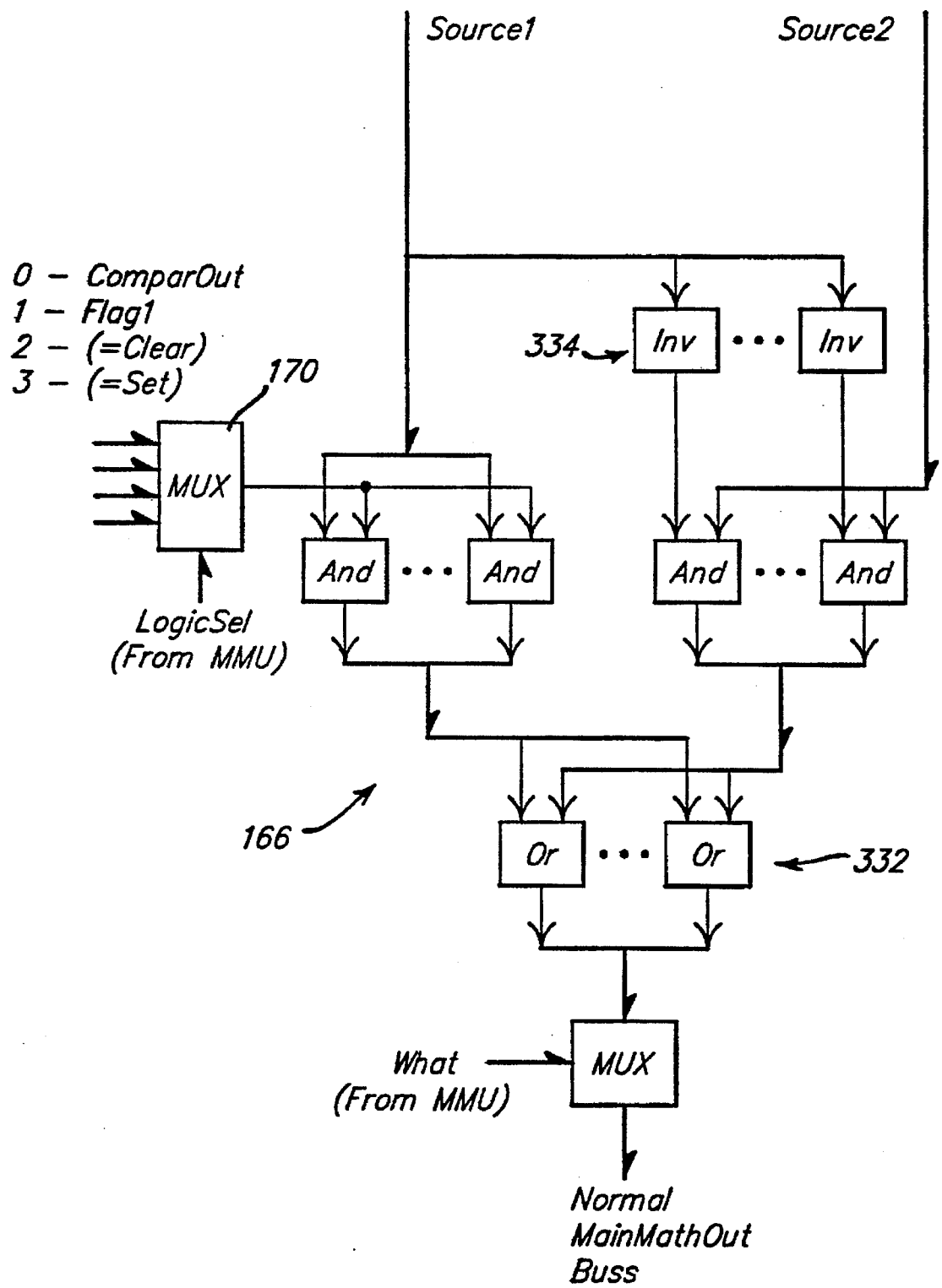
FIG. 20 is a detailed block diagram of the boolean calculator shown in FIG. 3D.

The AND circuit 152, the OR circuit 154 and the ExOR circuit 156 may be implemented through simple bit-by-bit boolean circuits. In this regard, the bit calculator circuit 166 employs such bit-by-bit boolean circuitry. The bit calculator circuit 166 is shown in FIG. 20. The bit calculator circuit 166 has two main functions, namely to mask (that is, AND) and to merge (that is, OR). Since both masking and merging can be performed in the same instruction, this operation may be preferred over selecting the AND circuit 152 and the OR circuit 154 in consecutive instructions. The bit calculator 166 may also be used to isolate certain bits. The bit calculator circuit 166 includes a multiplexer 170 to select which of the three logic functions should be executed. The selection code for the multiplexer 170 is derived from the main math unit function selection codes which are set forth below in Table 4. These codes are provided from bit locations "0" through "5" of the select bus 17, as shown in Table 1. In light of the fact that 6-bits are employed for the main math function selection, a total of sixty-four code combinations are available.

TABLE 4

MAIN MATH UNIT FUNCTION CODES

| Cont. Code | Functional Selection |
|---|---|
| 0 to | Rotate/merge, the code |
| 39 | ='s num. of right rotates |
| 40 | multiply (msb 40) |
| 41 | multiply (lsb 40) |
| 42 | * multiply (middle 40-bits out) |
| 43 | * mult + GP(5) |
| 44 | * mult + GP(3) |
| 45 | * mult + GP(4) |
| 46 | * mult + GP(4) + GP(5) |
| 47 | divide (single prec) |
| 48 | log (base 2) |
| 49 | Binary to BCD (integer) |
| 50 | Parity |
| 51 | # add and genCarry |
| 52 | bit calculator |

TABLE 4-continued

MAIN MATH UNIT FUNCTION CODES

| Cont. Code | Functional Selection |
|---|---|
| 53 | and |
| 54 | inor |
| 55 | exor |
| 56 | * add |
| 57 | # add + Carry and genCarry |
| 58 | * subtract |
| 59 | Source1 |
| 60 | Source2 |
| 61 | CompressCode |
| 62 | CompressData |
| 63 | Inflate |

The functional selections that have been identified with the asterix symbol "*", indicate that an error flag will also be logically selected and brought out through an error tracking circuit (shown in FIG. 17). In this regard, plus and minus full scale values will be automatically selected when one of the overflow or error conditions is detected. The arithmetic functions will also automatically correct -zero to be equal to +zero. The functional selections that have been identified with the pound sign symbol "#" indicate that the error bit will be converted to a Carry Flag, and that the answers will be transmitted as computed.

The compression and inflation circuits are generally designated by reference numeral 160. Together these circuits provide a compression code function, a compress data function, and an inflation function. The compression function is used to return a four field code for the number provided by the S1 multiplexer 102. The compress data function evaluates the 40-bit data word as eight 5-bit nibbles. The inflate function is used to restore a compressed value which is presented on the S1 multiplexer 102. The compression and inflation circuits will be discussed more fully in connection with FIGS. 25–26.

The rotate/merge circuit 162 has three main functions, namely a 40-bit rotate, a mask and a merge. In this regard, Table 4 shows that the first forty function codes may be used to determined how many bit positions should be rotated. The rotate/merge circuit 162 will be discussed in connection with FIG. 19.

The parity circuit 164 is used to pass bits "15" through "21" to the main math output bus 114. If the number of set bits in bit positions "15" through "23" (9-bits) is odd, then the main math output bit "22" will be set. This builds a 7-bit data word with odd parity from an input word of up to 9-bits. Accordingly, input bits "22" and "23" are not available as output bits.

FIG. 3D shows the multiplier 168 both as a single block, and as a more detailed circuit within the phantom line outline. As indicated by the main math unit functional selection codes of Table 4, the multiplier 168 is capable of several different operations involving multiplication. In the first place, the multiplier 168 includes a 39×39 multiplier circuit 172 for producing a multiplication product from the input words received from the S1 mulitplexer 102 and the S2 multiplexer 104. In this regard, the upper or lower 39-bits of the product may be selected from the main math output multiplexer 114. The multiplier 168 also includes an Add circuit 174 which will add the product from the 39×39 multiplier circuit 172 to the contents of either general purpose register GP3, GP4 or GP5. An error correction circuit 176 is also provided for negative zero correction. The multiplier 168 further includes a second Add circuit 178 to achieve a further compounded arithmetic operation. In this case, the contents of general purpose registers GP4 and GP5 are added together, and then this product is added to the product from the 39×39 multiplier circuit 172.

FIG. 3B also shows that the CPU 12 includes an interrupt circuit 180 and an error tracking circuit 182. The interrupt circuit 180 is used to detect and latch an externally generated interrupt signal. The interrupt signal is then transmitted to the program memory control circuit 16 for responsive action. The interrupt circuit 180 will be more fully described in connection with FIG. 16. The error tracking circuit 182 is designed to count errors and trap the address (that is, the program counter value or the que address) of the last error encountered. The error tracking circuit 182 may be enabled or disabled through bit position "2" of the output register 122. The error tracking circuit 182 will be more fully described in connection with FIG. 17.

Figure 5A:
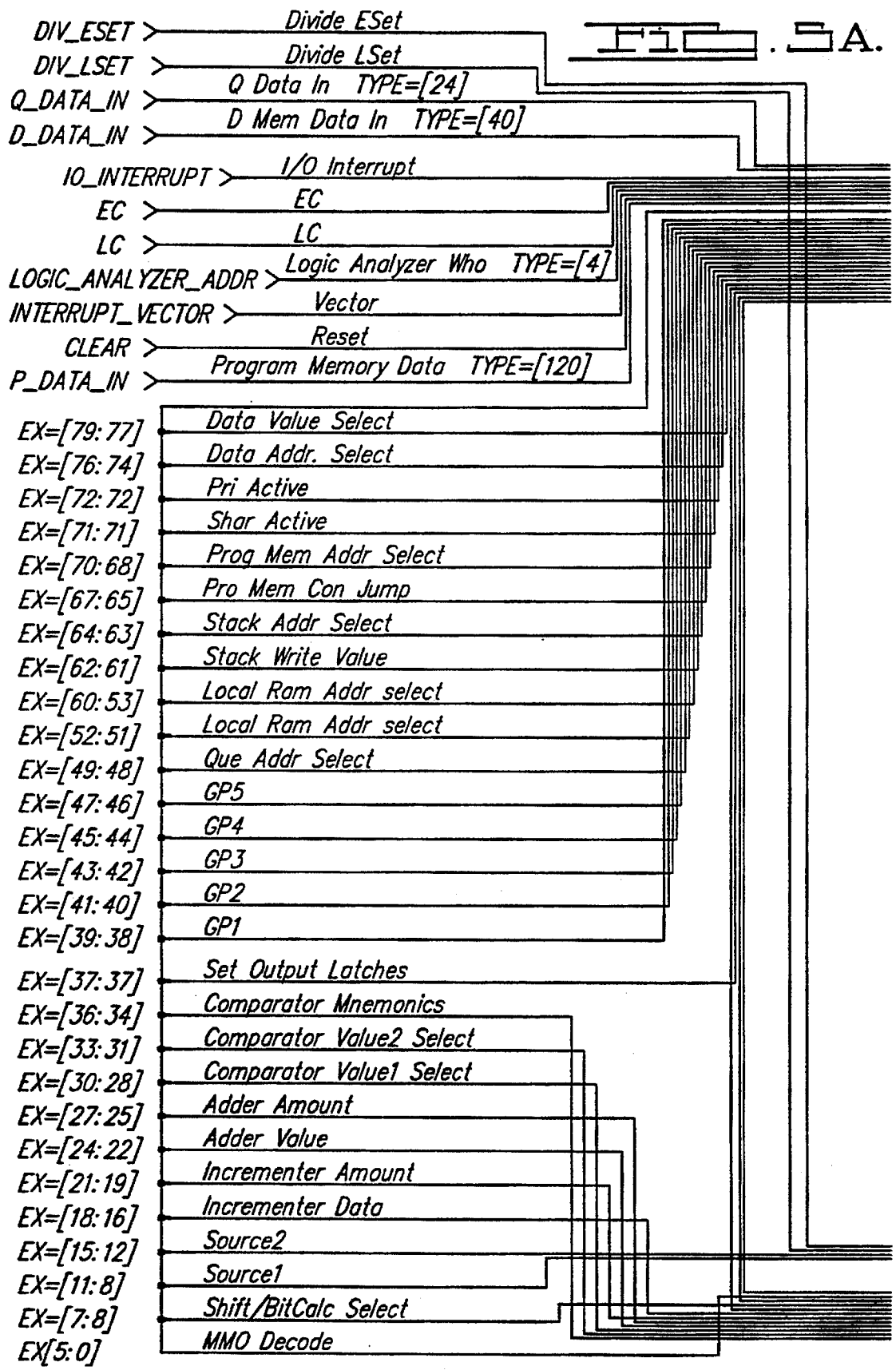

Turning now to FIGS. 5A–5H, a general schematic diagram of the CPU 12 is shown. More specifically, FIG. 5A illustrates each of the input signals received by the CPU 12. FIG. 5A also provides a break out of the signal lines which comprise the opcode or select bus 17. In each case, the number of lines employed is enclosed within brackets. Thus, for example, the data bus line labeled "D_Data_In" is of the type "40", meaning that it comprises "40" individual conductors. Similarly, the bus line labeled "MMO Decode" is comprised of "6" individual conductors, namely bit locations "0" through "5" of the select bus 17. In addition to these bus-type signals, FIG. 5A also shows individual signal lines, such as a reset signal line labeled "H2_Clear" for resetting the CPU 12. Similarly, FIG. 5A shows the two primary clock signals sets "EC" and "LC", as well as the two related clock signals used by the divide circuit 146 (labeled "Div_ESet" and "Div_LSet"). Each of these clock signals will be discussed in connection with FIG. 6 below. Furthermore, FIG. 5A shows the provision of two interrupt signals, namely "IO_Interrupt" and "Interrupt_Vector". The IO_Interrupt signal provides a conventional request for attention signal (that is one masked interrupt signal), which will cause a transfer of control to one of only two interrupt handling routines pointed to by the interrupt vector signal.

Figure 5B:
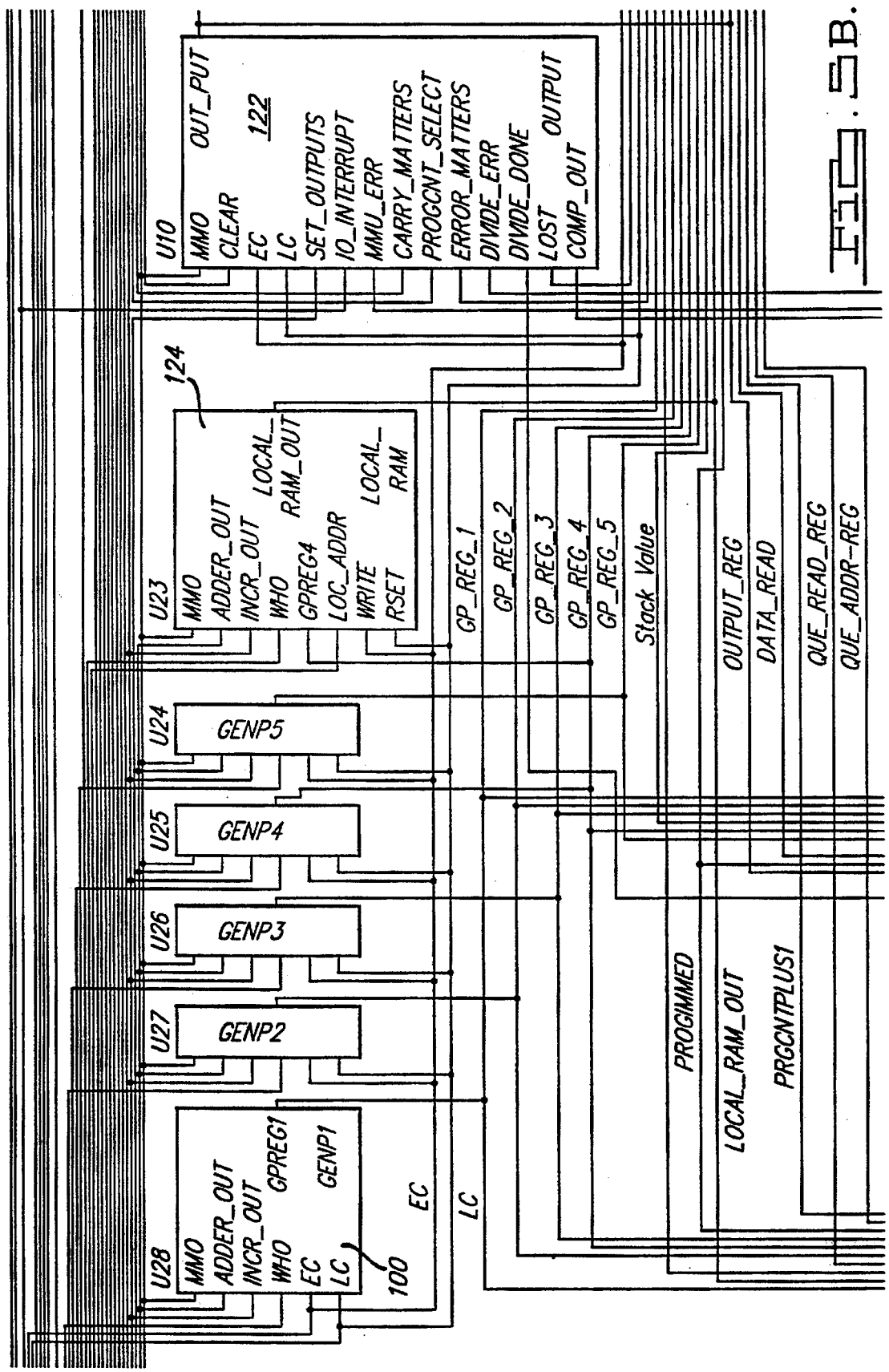

FIG. 5B shows each of the five general purpose registers 100, with more detail being shown for GPREG1 (or GP1) than for the other general purpose registers. Specifically, three selectable input signals are shown, namely "MMO" for the main math out bus 116, "Adder_Out" for the adder bus 118 and "Incr_Out" for the incrementer bus 120. While not shown in this figure, the fourth selectable input is taken from the output of the general purpose register itself. The signal labeled "Who" represents the appropriate lines from the select bus 17. Thus, in the case of general purpose register GP1, the Who signal comprises lines "38" and "39" of the select bus 17. As with most of the CPU components, each of the general purpose registers 100 receives both the EC ("ESet" and "EReset") and LC ("LSet" and "LReset") clock signal sets. FIG. 5B also shows each of the input signals received by the local RAM circuit 124 and the output circuit 122. The local RAM circuit 124 may be operated to provide additional general purpose registers, if desired. A constant address in the range of "0" to "FE(hex)" may be provided in an instruction. Alternately, an address of "FF(hex)" will cause the CPU 12 to obtain the local RAM address from GP4. In any event, it should be noted that it is possible to read a number from the local RAM circuit 124, add another number to it, and write it back to the local RAM circuit in a single instruction (providing that the same RAM address is used).

FIG. 5C shows the data memory control circuit 14 without including the interface circuit 128 at this juncture. A portion of the interface circuit 128 is shown in FIG. 5H, as this portion is repeated for each of the forty lines which comprise the data bus 26. In this regard, the interface circuit 128 is connected to the external data bus 26, and this interface circuit produces the 40-bit Data_Mem_In signal which is received by the data memory control circuit 14 (U6). The interface circuit 128, in turn, receives the 40-bit Data_Write_Value signal output from the data memory control circuit 14 (U6) for writing to the data memory system 20. The interface circuit 128 includes a pair of tri-state bus drivers 184–186, with driver 186 having an enable LOW control port. The operation of the bus drivers 184–186 are controlled through the read/write "R/W" line 30. When the read/write line 30 is LOW, the interface circuit 128 will transmit a data word from the data memory control circuit 14 to the external memory system 20 via bus driver 186. Conversely, when the read/write line 30 is HIGH, the interface circuit 128 will transmit a data word from the external memory system 20 to the data memory control circuit 14 via bus driver 184. As indicated above, the queue memory control circuit 18 includes a similar interface circuit to that provided for the data memory control circuit 14.

FIG. 5D shows each of the output signals that are made available by the CPU 12. In this regard, it should be noted that the Data_Write_Value signal of FIG. 5C is labeled D_Out_Data in FIG. 5D. Additionally, it should be noted that the logic analyzer 126 provides a 40-bit Logic_Ana_Data signal for selectively transmitting various internal signals to the logic analyzer port of the CPU 12. The logic analyzer 126 is a 16-input by 40-bit wide multiplexer. It has a 4-bit address that is separate from the program data bus 32, as illustrated in FIG. 1. This 4-bit address capability is preferably asynchronous from all other inputs to the CPU 12. It is preferred that the data to be read by the logic analyzer 126 be latched twice within a given instruction cycle (such as a 112 nsec. cycle). This is because it is possible to make dual use of certain components in the CPU 12 within a single clock cycle. Accordingly, the procedure of latching the data twice in a given clock cycle gives the user an opportunity to catch both events. While not specifically shown, the logic analyzer 126 receives clock signal pulses at 56 ns and 112 ns in this embodiment.

Figure 5E:
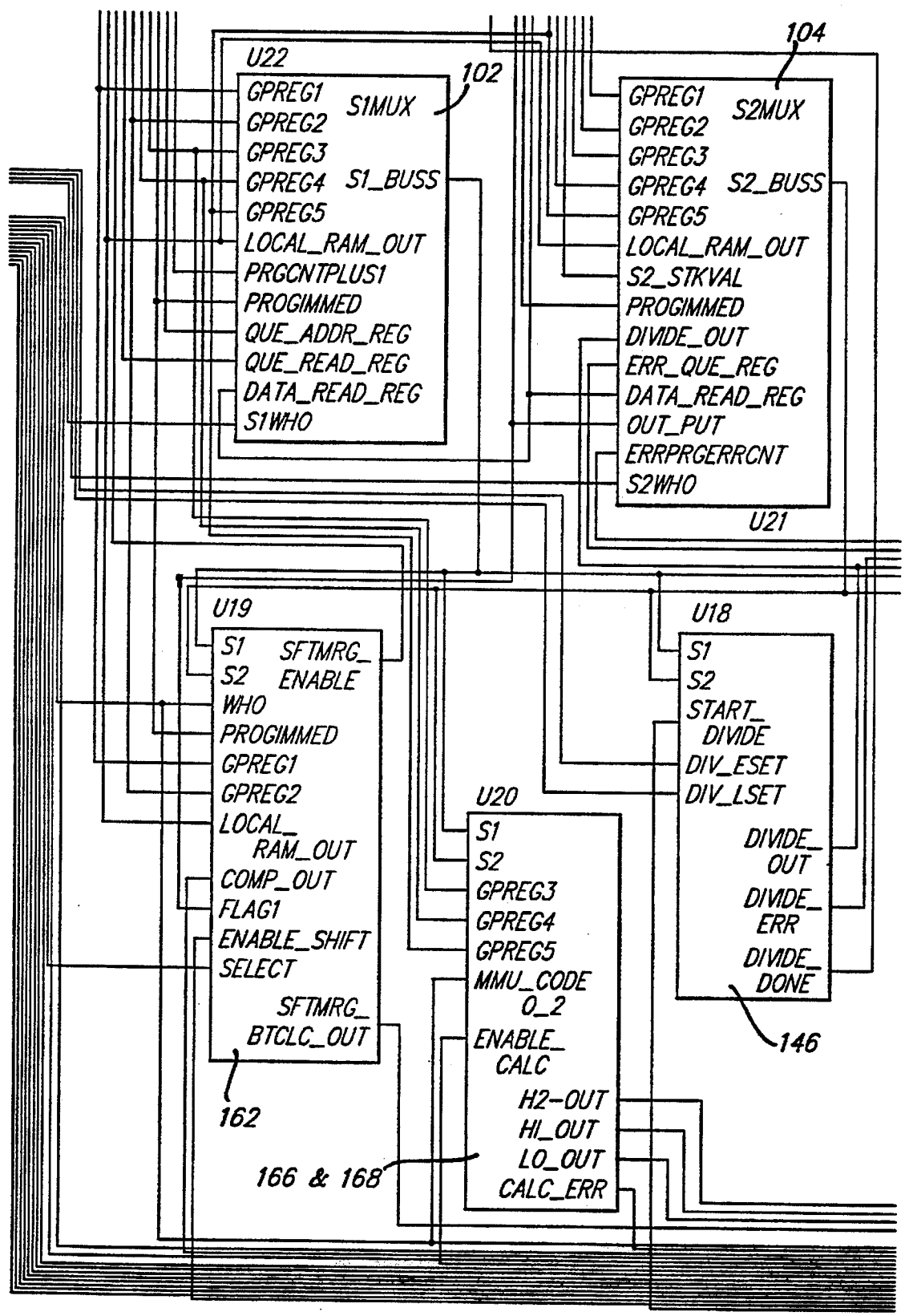
Figure 5F:
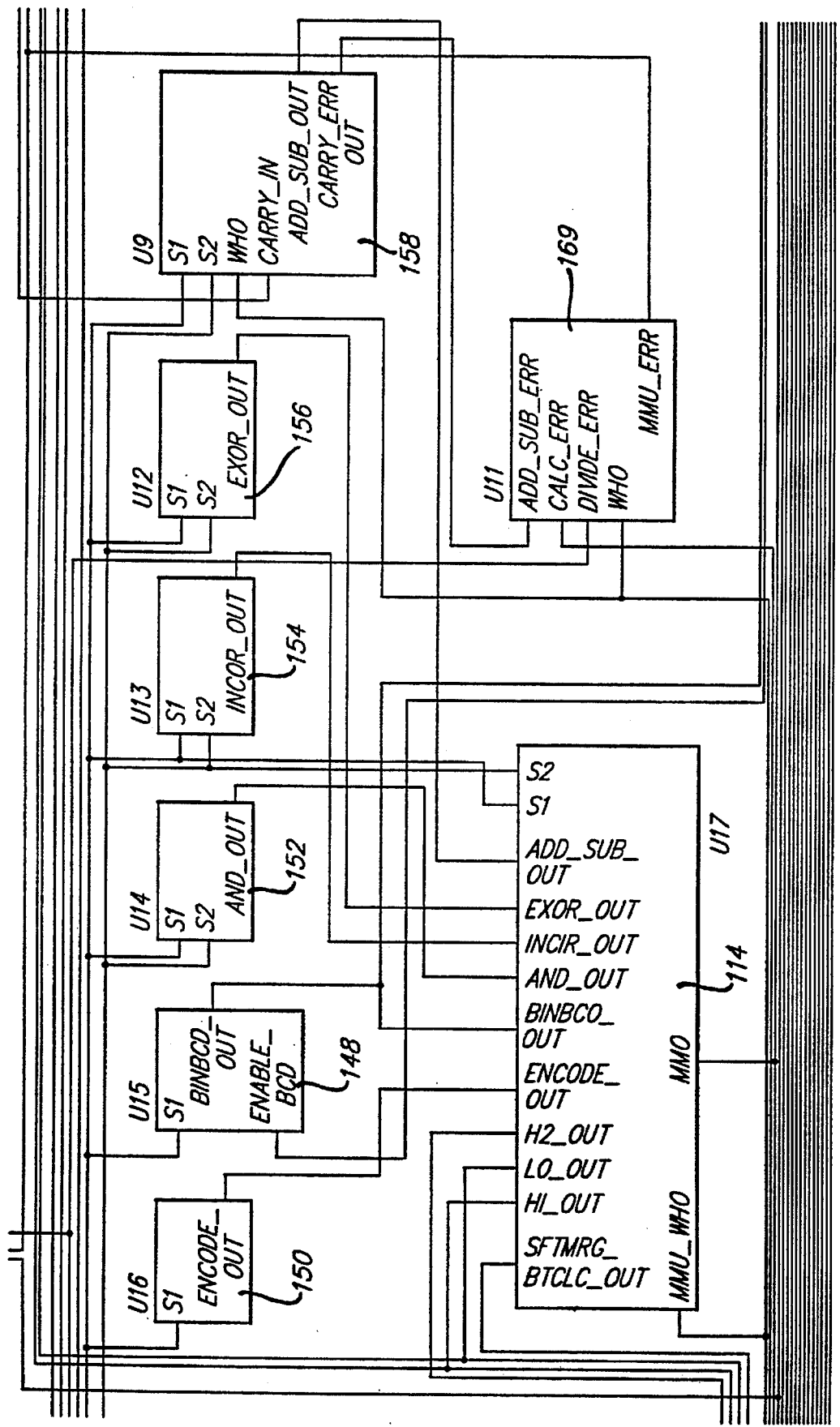
Figure 5H:
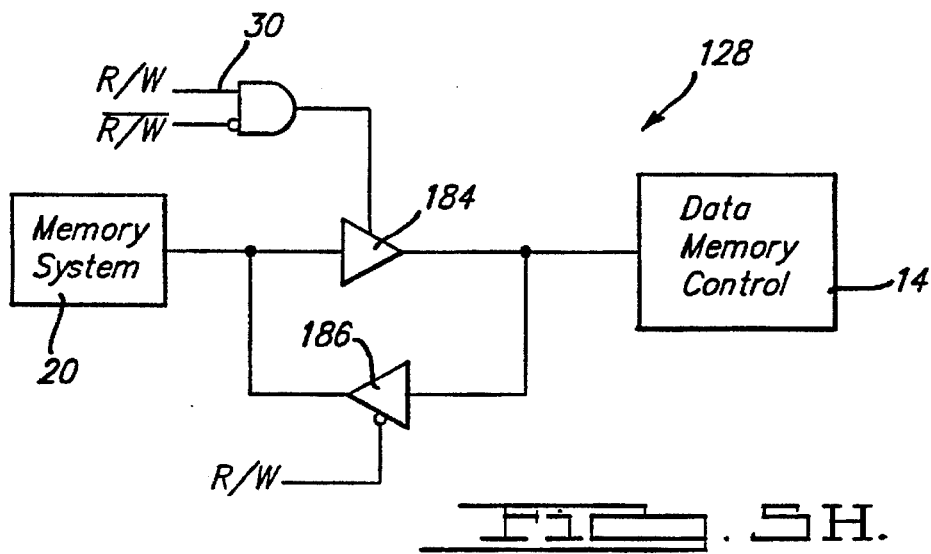

FIG. 5E shows the S1 multiplexer 102, the S2 multiplexer 104, and several components to the main math unit 40. The remaining components to the main math unit 40 are shown in FIGS. 5F, except for the compression/inflation circuits 160. With respect to FIG. 5E, it should be noted the component U20 includes both the multiplier 168 and the bit calculator 166. With respect to FIG. 5F, it should be noted that the main math multiplexer 40 is shown to include an error circuit 169 which traps an error bit that may be generated from either the Add circuit 158, multiplier 168 or the divide circuit 146. The presence of such an error is then transmitted as the MMU_ERR signal to the error tracking circuit 182, which is shown on FIG. 5G. FIG. 5G also shows the adder computational processor 106, the incrementer computational processor 107 and the comparator 108.

Figure 6:
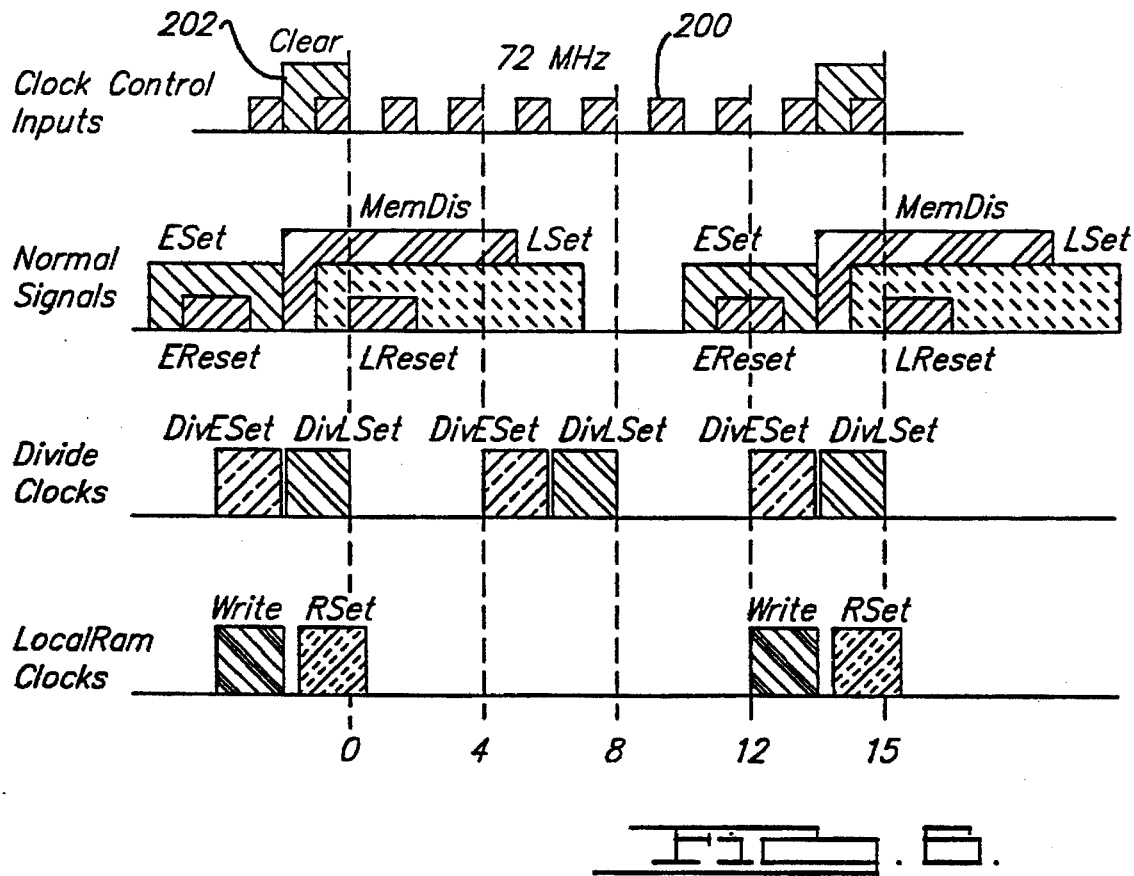
FIG. 6 is a timing diagram which illustrates the clock signals employed by the CPU.

Turning now to FIG. 6, a timing diagram of the clock signals employed by the CPU 12 is shown. The topmost diagram illustrates the 72 MHz clock signal 200, which provides the fundamental clock frequency for the CPU 12 as mentioned above. The topmost diagram also illustrates the Clear clock signal 202 which occurs every 112 ns. This 112 ns time period represents one complete clock cycle for the CPU 12. Each of the dotted line time divisions shown at the bottom of FIG. 6 represent 28 ns. Thus, time division corresponds to 28 ns from the HIGH to LOW transition of the Clear clock signal 202.

The normal clock signals for the CPU 12 are shown to be comprised of "ESet", "EReset", "LSet", "LReset" and "MemDis". The combination of the ESet and EReset signals is sometimes referred to herein as the "EC" clock signal set. Similarly, the combination of the LSet and LReset signals is sometimes referred to herein as the "LC" clock signal set. These two sets of clock signals are phased to assure that a meta-stable condition cannot exist within the CPU 12. A meta-stable condition is one which could occur when data changes at the same time as a clock signal transition. The EC and LC clock signals are used in brigade latches throughout the CPU 12 to capture and hold input data or address information. The EC and LC clock signals will be described more fully in connection with FIG. 7 below. The MemDis clock signal is used to stop memory activity in certain memory circuits, such as by removing the chip enable signals for these memory circuits. A memory cycle is begun by having the MemDis clock signal go LOW, which will occur after enough time has passed for the address, the address decode and the R/W lines to settle at the memory pins.

FIG. 6 also shows the divide clock signals "DivESet" and "DivLSet", which are used in the divide circuit to be described in connection with FIG. 22. FIG. 6 further shows the provision of two Local RAM clock signals, namely "Write" and "Rset". As the names of these clock signals imply, the Write signal enables data to be written into the Local RAM circuit 124, while the Rset signal enables data to be read from the Local RAM circuit.

Referring to FIG. 7, a portion of the stack circuit 121 is shown to illustrate the construction of the brigade latch circuits used in the CPU 12. Specifically, FIG. 7 shows a pair of D-type flip flop or latch circuits 204 and 206. The first latch circuit 204 receives the ESet and EReset clock signals, while the second latch circuit 206 receives the LSet and LReset clock signals. The Eset clock signal enables the first latch circuit 204 to read its input signal. The ERest clock signal (labeded "ECLEAR") is then used to capture and hold the input signal which has been read. In other words, output signal from the latch circuit 204 (on line 208) will correspond to the digital value of the input signal. In practical terms, the ESet and ERest transitions are used to capture the resultant data from the last instruction without changing any of the values involved in the current instruction. Subsequently, the LSet clock signal is used to read the output signal on line 208, which also represents the input signal to the second latch circuit 206. The LReset clock signal (labeled "NOT_LCLR") is then used to capture the digital value on line 208, so that the output signal from the latch circuit 206 (on line 210) will correspond to this digital value. In other words, the LSet and LReset clock signals are used to begin the next instruction and capture the results of the current instruction.

One of the important features of the present invention is the ability to make more than one use of a particular circuit component in a single clock cycle (that is, in 112 ns for this embodiment). For example, it is possible to add the contents of register GP1 with register GP3 in the adder 106, and then store the result in the register GP1, all within a single program instruction which is accomplished in a single clock cycle. In this particular example, dual use of register GP1 is employed by reading from it and then storing a value in it within the same clock cycle. This feature is achieved by enabling the computational components as well as several related components to continue reading their inputs until the end of the current clock cycle. Thus, in the example provided above, the adder 106 will continue to read its input signals throughout the current clock cycle. Once the LReset signal goes through its HIGH to LOW transition, data output from the general purpose registers will quickly become stable. Then, it is up to the speed of the computational components and signal routing connections to determine how many tasks can be performed from the general purpose registers before the end of the current clock cycle.

As another example, the contents of registers GP1 and GP2 could be multiplied by multiplier circuit 168 (for single precision), then compared by comparator 108 with another value. Again, all of these tasks may be accomplished in a single clock cycle through a single program instruction. Since the multiplier circuit 168 will begin its multiplying function as soon as it is enabled by the appropriate opcode, its input signals will fluctuate until the output signals from registers GP1 and GP2 become stable. Similarly, the input signals to the comparator circuit 108 may also fluctuate until the output signal from the multiplier circuit 168 stabilizes (via main math unit multiplexer 114). Accordingly, it should be appreciated that the input signals ripple through the CPU 12 until all of the computations are completed for the current clock cycle.

Turning now to FIG. 8, a detailed block diagram of the incrementer circuit 107 is shown. Specifically, incrementer circuit 107 is comprised of a pair of multiplexers 212, 214 and a full 40-bit adder 216. The multiplexer 212 is used to determine which of several possible input signals will be incremented, while multiplexer 214 is used to determined which method of incrementing will be employed. Input signal selection by multiplexer 212 is controlled by three opcode or "who" lines, as generically represented by line 218. While the use of three who lines could enable up to nine different input signals to be selected, the multiplexer 212 is designed to select between eight different input signals. While a standard 8:1 multiplexer cell could be used for either multiplexer 212 or 214, throughput may be enhanced by building these multiplexers from a set of 2:1 multiplexer cells, even though there is a trade off with the number of gates that will be consumed in this process.

As indicated in FIG. 8, the input signals to multiplexer 212 are the five general purpose registers 100, the data bus 15, the output from the local RAM circuit 124, and the output from the que memory control circuit 18. In light of the fact that all of these possible input signals are 40-bits wide, except for the que address signal, line 220 indicates by the "(40)" label that multiplexer 212 is an 8×40 multiplexer. In contrast, the input signals for the multiplexer 214 are shown on the right side of FIG. 8 to represent various incrementing alternatives. For example, input signal "1" indicates that the input signal selected by multiplexer 212 will be incremented by one, while input signal "4" indicates that the input signal selected by multiplexer 212 will be incremented by two. In light of the fact that the incrementer 107 includes a full 40-bit adder 216, other 40-bit input signals could be selected by multiplexer 214, such as the output from register GP3. The 40-bit adder 216 may be built up from standard single bit full adder cells.

FIG. 9 illustrates a detailed block diagram of the adder circuit 106. In this regard, it should be appreciated that the design of the adder circuit 106 is quite similar to the design of the incrementer circuit 107. However, some of the input signals to the multiplexers 222–224 are different. For example, the contents of register GP1 could be added with the contents of register GP5, or even with itself if desired. It should be noted that both the adder circuit 106 and the incrementer circuit 107 provide parallel incrementing and decrementing of address registers. Additionally, these two circuits also provide alternative ways to increment/decrement counters, as well as alternative ways to move data. All of the input words in these two circuits are preferably treated as 39-bit positive integers.

Figure 10:
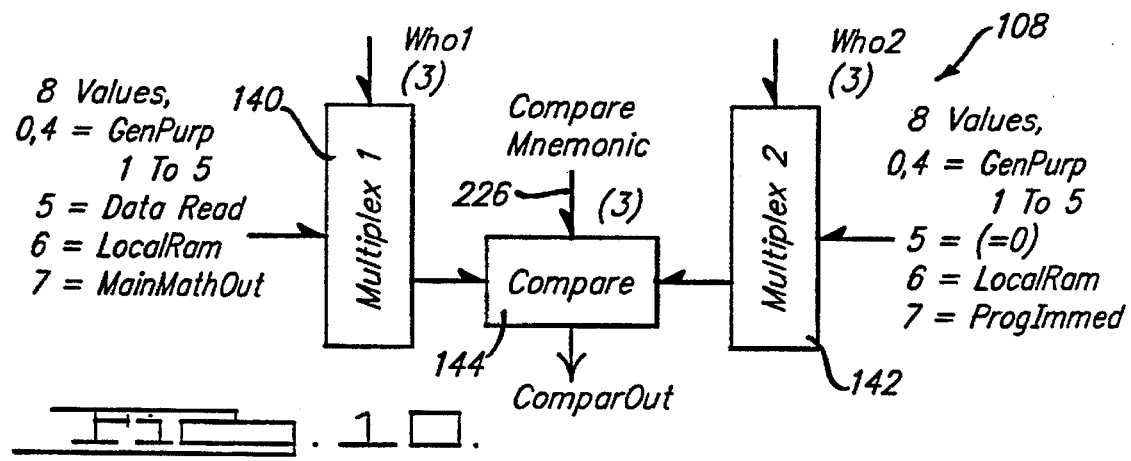
FIG. 10 is a detailed block diagram of the comparator shown in FIG. 2.

Referring to FIG. 10, a detailed block diagram of the comparator circuit 108 is shown. This figure closely follows the diagram of the comparator circuit 108 previously shown in FIG. 3A. The compare mnemonic line 226 generally represents the three opcode lines which determine the function to be executed by the comparator circuit 108. In one embodiment herein, the compare circuit includes a 8:1 output multiplexer, like multiplexer 212 of the incrementer circuit 107, and the three opcode lines determine which logic resultant value will be transmitted. In other words, the compare circuit 144 includes one set of logic gates for determining whether the two input signals are equal (bit by bit), and another set of logic gates for determining whether the two input signals are not equal and so forth. Thus, it should be appreciated that each of the comparator functions are executed with each clock cycle, and that only one of these resultants are selected by the output multiplexer. In this way, the compare circuit 144 operates analogously to the main math unit 40.

Figure 11:
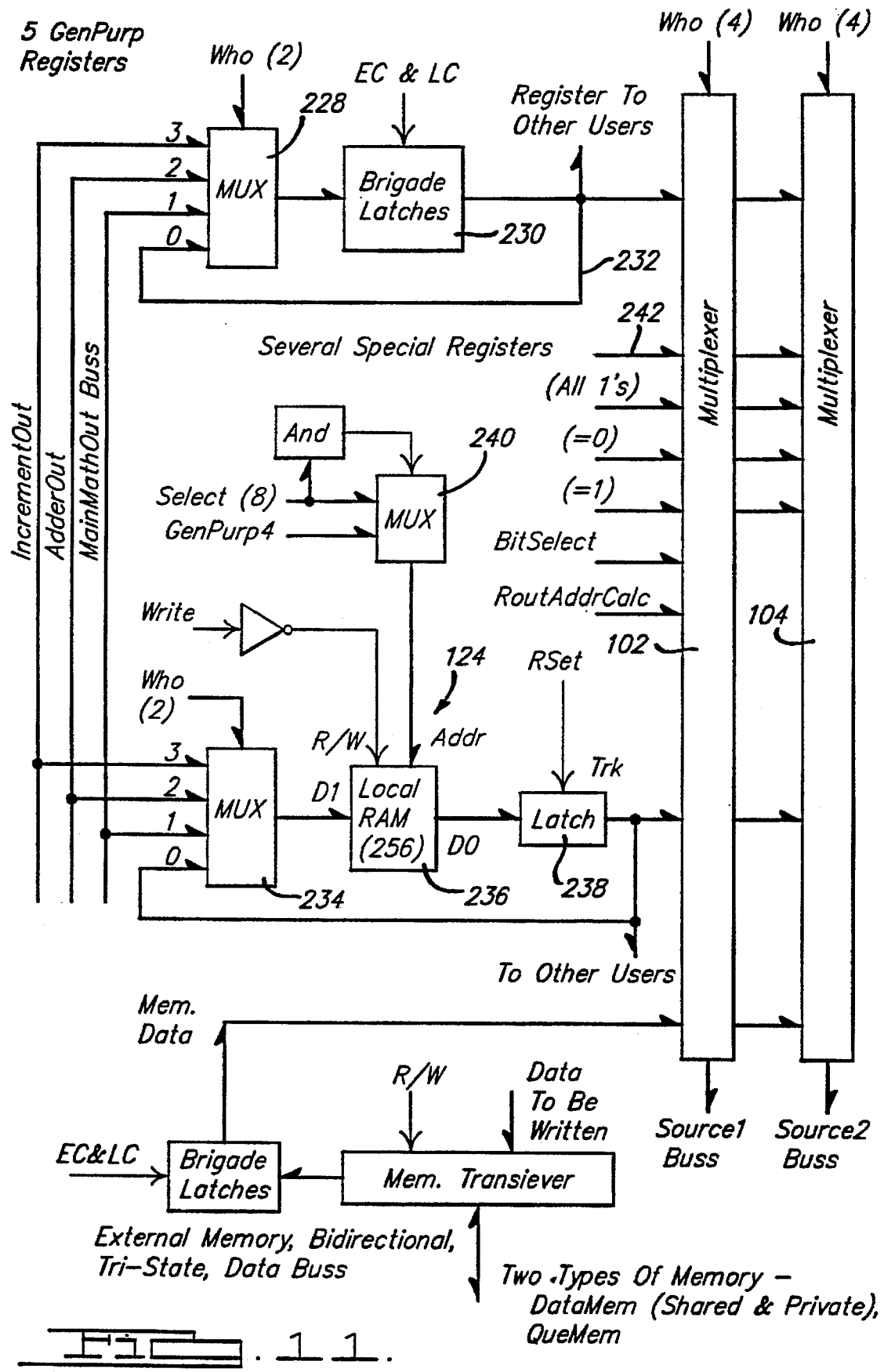
FIG. 11 is a detailed block diagram of the general purpose registers shown in FIG. 2.

Referring to FIG. 11, a more detailed block diagram of a portion of CPU 12 is shown. Specifically, FIG. 11 shows that each of the general purpose registers 100 are comprised of an input multiplexer 228 and a brigade latch circuit 230. In this regard, the brigade latch circuit 230 is similar to that shown in FIG. 7 above. Additionally, FIG. 11 shows that each of the registers 100 include a 40-bit wide feedback connection to enable the multiplexer 228 to select the output of the register as its next input. The value loaded from the input multiplexer 228 may be used in the following instruction, as it is latched or captured at the end of the current instruction cycle. Accordingly, it should be appreciated that the value currently stored in a general purpose register 100 is from the last load instruction executed.

FIG. 11 further shows that the local RAM circuit 124 is comprised of an input multiplexer 234, a memory circuit 236, an output latch 238 and an address multiplexer 240. The input multiplexer 234 is used to select the data to be stored, while the address multiplexer 240 is used to select the address for writing this data into memory circuit 236 or for reading data from the memory circuit 236. FIG. 11 also shows a portion of the data memory control circuit 14, which will be discussed more fully in connection with FIG. 13.

It should also be noted that FIG. 11 shows an input line 242 which is labeled "Several Special Registers". These special registers comprise the registers identified for channels "7" through "A" in Table 5 below. In this regard, Table 5 identifies each of the sixteen possible input signals for the S1 and S2 multiplexers and the logic analyzer multiplexer 126. The Routine Add input to the S1 multiplexer 102 represents bits "35" to "38" of register GP5 which map into bits "17" to "20" on the S1 multiplexer (with all other bits being equal to zero). This particular input signal is useful for subroutine where it is desirable to directly compute compressed addresses. Additionally, the Bit Select input to the S1 multiplexer 102 allows a particular bit to be selected, placed into the bit-15 position and further operated upon.

TABLE 5

| Chan | Source1 | Source2 | Logic Analyzer |
|---|---|---|---|
| 0 | GenPurp1 | GenPrup1 | GenPurp1 |
| 1 | GenPurp2 | GenPurp2 | GenPurp2 |
| 2 | GenPurp3 | GenPurp3 | GenPurp3 |
| 3 | GenPurp4 | GenPurp4 | GenPurp4 |
| 4 | GenPurp5 | GenPurp5 | GenPurp5 |
| 5 | DataRead | DataRead | DataRead |
| 6 | LocalRam | LocalRam | LocalRam |
| 7 | ProgImmed | ProgImmed | MainMathOut |
| 8 | ProgCnt+1 | ErrQueReg | AdderOut |
| 9 | QueAddr | ErrProgCnt | Incremout |
| A | QueReadReg | DivideOut | DivideOut |
| B | BitSelect | OutputReg | OutputReg |
| C | RoutineAdd | StkVal/Addr | StkVal/Addr |
| D | (= all 1's) | (= all 1's) | (=0), Spare |
| E | (= 0) | (= 0) | (=0), Spare |
| F | (= +1) | (= +1) | (=0), Spare |

Figure 12:
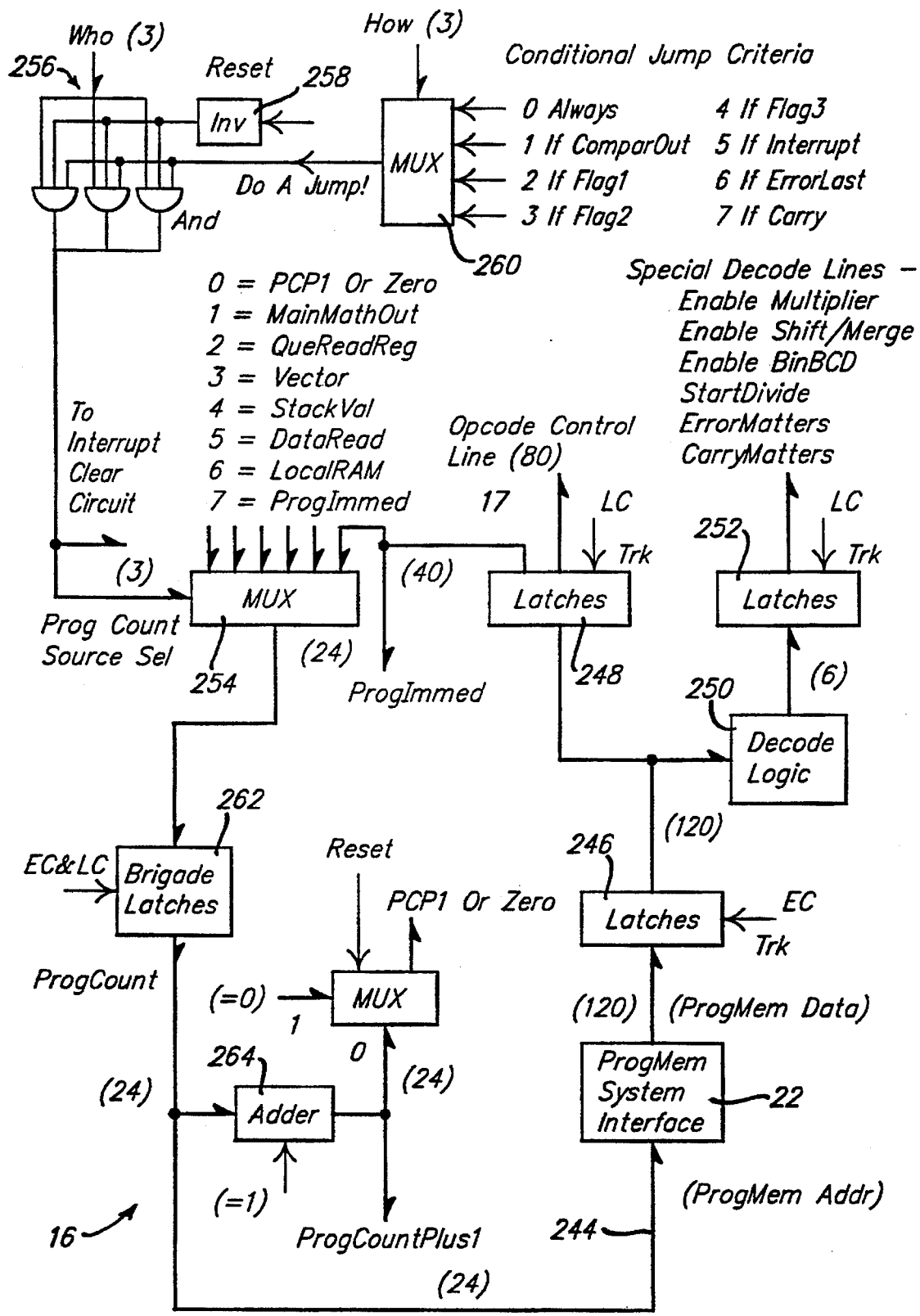
FIG. 12 is a detailed block diagram of the program memory control circuit shown in FIG. 2.

Referring to FIG. 12, a detailed block diagram of the program memory control circuit 16 is shown. In this regard, the program memory control circuit 16 receives a 120-bit instruction word from the external program memory system 22. The program memory control circuit 16 is also capable of addressing the program memory system 22, as illustrated by representative 24-bit line 244. The program memory control circuit 16 includes a pair of latch circuits 246, 248, which together form a 120-bit wide brigade latch. However, in this particular case, a signal connection is provided between these two latch circuits to a decode logic circuit 250. The decode logic circuit 250 is used to activate or enable certain power consuming circuits on the CPU 12, such as the multiplier circuit 168 and the Binary to BCD converter 148. In other words, the decode logic circuit 250 simply checks the value of certain bits in the 120-bit instruction word and captures these values in latch circuit 252. If, for example, the appropriate function code for the main math unit 40 indicates that the instruction just received will execute a BCD conversion function, then an "Enable BinBCD" signal will be transmitted from the latch circuit 252 to the Binary to BCD converter 148. In light of the fact that the latch circuit 252 is responsive to the LC clock signals, it should be appreciated that the latch circuits 246 and 252 also combine to form a brigade-type latch as well.

Of the 120-bits received from the external program memory system 22, 80-bits are individually routed from latch circuit 248 directly to the components of CPU 12 to direct their operations. Due to the very wide format used for the instruction words of the CPU 12, it should be appreciated that there is no need for micro-code decoding. The provision of decode logic circuit 250 is used only in connection with a relatively few of the 80-bit opcode lines, and then only to reduce the power comsumption of a couple of circuit components in the CPU 12. The other 40-bits in the 120-bit instruction word comprise the Program Immediate word, which may be used for either a data or address value if desired.

The program memory control circuit 16 also includes a multiplexer 254 which is used to select a source signal for the program counter value. In this regard, FIG. 12 shows each of the eight possible signal sources, with the Program Immediate word being one of these signal sources. The resultant output from the main math unit 40 is another possible source of the program counter value. This provision enables any program counter address to be calculated based upon an event. The output value from the queue memory control circuit 18 is also provided in reflection of the fact that the purpose of the queue memory approach is to store a list of program memory addresses (as well as subroutine arguments). Thus, for example, when the queue list is advanced to the next program memory address, the multiplexer 254 will be instructed to select the "QueReadReg" source value. An interrupt vector signal provides another possible source of the program counter address value. The use of an interrupt vector signal at this juncture enables at least two different interrupt routines to be addressed in response to an externally generated interrupt.

The source for the program counter address signal is normally selected from three of the opcode lines. However, a set of three logic gates are provided to respond to an external reset signal or a jump condition. While the reset signal is received by inverting buffer 258, a multiplexer 260 is used to select between one of eight possible jump criteria in this particular embodiment. The multiplexer 260 is controlled by three opcode lines (that is, bit locations 68 to 70), which are identified by the "How" label in FIG. 12. Thus, for example, a program instruction can be designed to check the output value of the comparator 108, and then jump to another program address when the compare output is false, such as that provided by the "PCP1 Or Zero" signal. Table 6 below provides an example of how program jumps are preferably handled by the CPU 12. While an instruction is executing, the current value of the program counter is the next instruction to be executed. Accordingly, if the ProCountPlus1 value is saved on the stack, the address of the currently executing instruction plus two is actually being saved. In any event, it should be appreciated that a one instruction pipeline is provided. In Table 6, the example is given for a jump to a single-line subroutine at address "X":

TABLE 6

| ADDRESS OF CURRENT INSTRUCTION | CURRENT INSTRUCTION | CURRENT PC |
|---|---|---|
| ? | ??????????????????????? | A |
| A | Jump to X, Save PC+1(C) | B |
| B | Jump to StackVal(C) | X |
| X | [execute 1 line subroutine here] | C |
| C | [execute instruction at C] | D |
| D | [execute instruction at D] | E |

The program counter itself is comprised of the 24-bit brigade latch 262. An adder circuit 264 is provided to increment the program counter value by one to create the "ProgramCountPlus1" signal. The ProgramCountPlus1 signal may be used, for example, as an address value to be stored by the stack circuit 121. A multiplexer 266 also receives the ProgCountPlus1 signal, as well as a Zero signal in which all 24-bits are set to zero. The multiplexer 266 is controlled by an external reset signal. When the Reset signal is LOW, the output "PCP1 Or Zero" will have the value of the ProgCountPlus1 signal. However, if the Reset signal goes HIGH, then the "PCP1 Or Zero" signal will be zero. This zero address value will then be selected by multiplexer 254, and ultimately transmitted to the program memory system 22 in order to start an inialization routine for the CPU 12.

Figure 13:
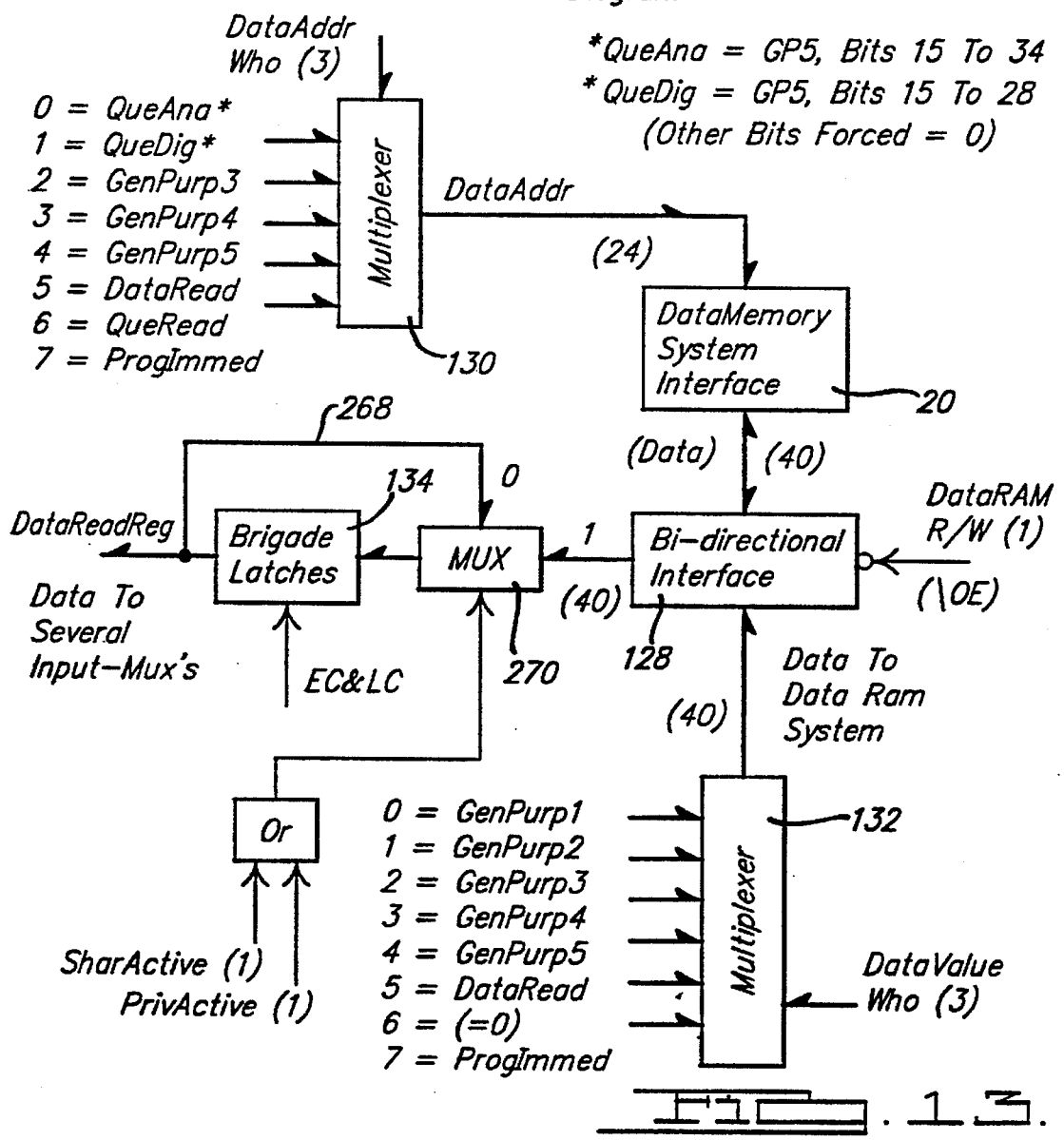
FIG. 13 is a detailed block diagram of the data memory control circuit shown in FIG. 2.

Referring now to FIG. 13, a detailed block diagram of the data memory control circuit 14 is shown. As indicated above, the address for requesting data from the external data memory system 20 may be derived from a variety of sources. Accordingly, the data memory control circuit 14 includes the data address multiplexer 130 to select from one of eight possible address sources in this particular embodiment. The multiplexer 130 includes two input sources that do need some explanation, namely the signals labeled "QueAna" and "QueDig". These two signals are derived from selected bits of the general purpose register GP5 as shown. In this regard, the QueAna signal represents the address of an analog signal processing routine, while the QueDig signal represents the address of a digital signal processing routine. These routines will be identified in connection with the description of FIGS. 14A–14C below.

It should also be noted that the brigade latch 134 includes a recirculating connection via 40-bit feedback line 268 and the multiplexer 270. The multiplexer 270 causes the brigade latch 134 to recirculate the last data word if either the "SharActive" or the "PrivActive" signals go HIGH. The SharActive signal is an externally generated signal which indicates that another computer entity is accessing the data memory system 20, but the CPU 12 may still write to the data memory system. In contrast, the PrivActive signal informs the CPU 12 that an external computer entity is privately accessing the data memory system 20, and that the CPU 12 cannot write to the data memory system. It should also be noted that the "DataReadReg" output from the data memory control circuit 14 will be updated with the value on the data bus 15 during either a Read or a Write to the data memory system 20 by the CPU 12.

Figure 14A:
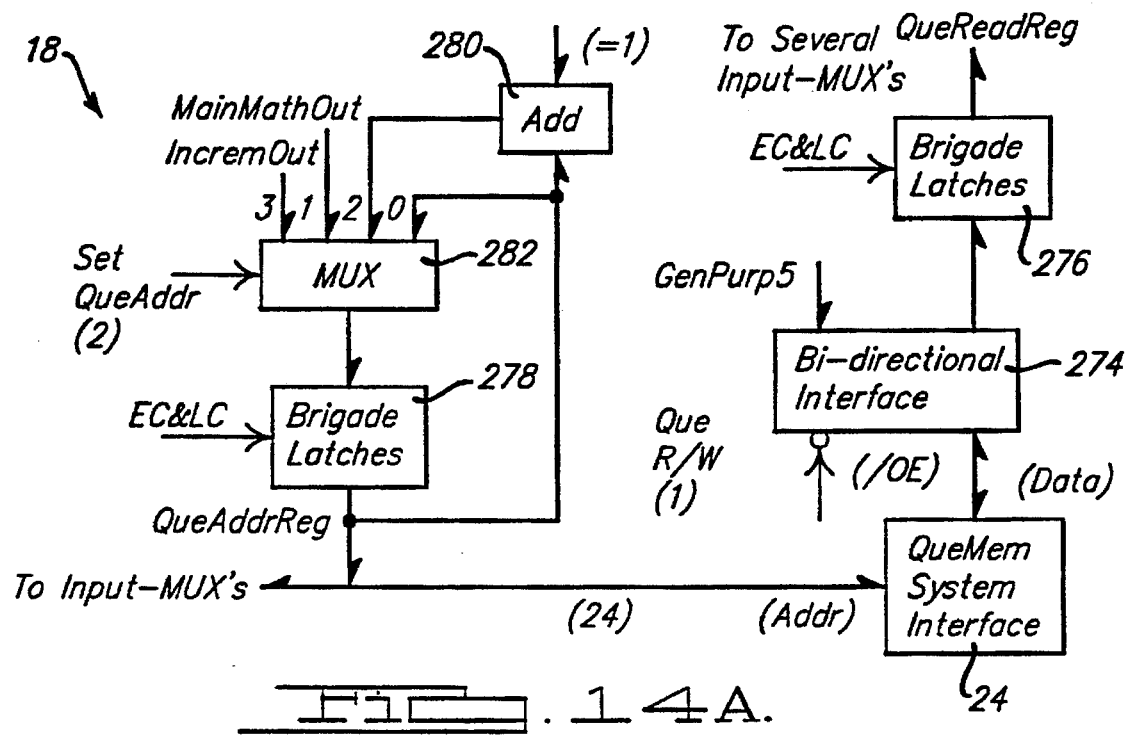
FIG. 14A is a detailed block diagram of the queue memory control circuit shown in FIG. 2.

Referring to, FIG. 14A, a detailed block diagram of the queue memory control circuit 18 is shown. The queue memory control circuit 18 includes a bi-directional interface circuit 274 which will permit both writing and reading operations with the external queue memory system 24. In this regard, data to be written to the queue memory system 24 is derived only from the general purpose register GP5. However, it should be appreciated that queue memory data could be derived from other suitable sources in the appropriate application, such as the local RAM circuit 124. The queue memory control circuit 18 includes two brigade latches 276, 278. The brigade latch 276 is used to capture and hold the current queue data value, which generally represents a program memory address or a data memory address. The brigade latch 278 is used to capture and hold the next queue memory address. In light of the primary use of the queue memory system to store an ordered list of addresses, the queue memory system normally needs to be incremented to simply obtain the next address value for transmission on the queue memory data bus labeled "QueReadReg". Accordingly, the queue memory control circuit 18 includes an adder circuit 280 which increments the current queue memory address by one. However, for those times in which a calculated address value is needed, a multiplexer 282 is used to enable other address signal sources to be selected. Indeed, one of these address signal sources may be a repeat of the current queue memory address itself.

Figure 14B:
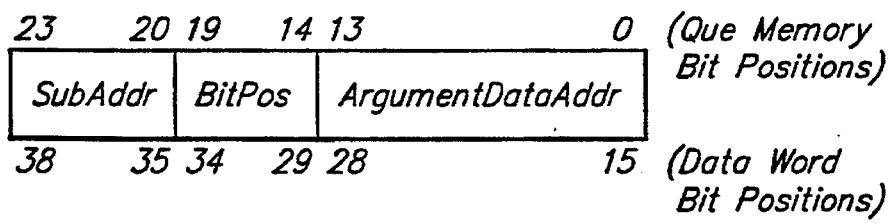
FIGS. 14B-14C provide diagrams of the word formats employed by the queue memory control circuit.
Figure 14C:
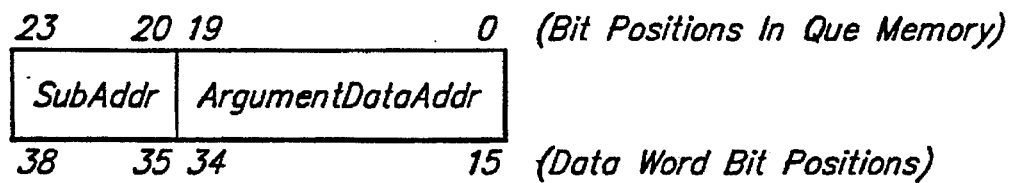

Two of the instances where the current queue memory address needs to be repeated are represented by FIGS. 14B and 14C. FIG. 14B illustrates the queue memory word format for certain digital signal processing routines, while FIG. 14C illustrates the queue memory word format for certain analog signal processing routines. These digital and analog signal processing routines are identified in Table 7 below.

TABLE 7

| Digital SubroutineAddr - | | Analog SubroutineAddr - | |
|---|---|---|---|
| 0 - "Indirect" | 8 - OR [ | 0 - "Indirect" | 8 - / |
| 1 - Init | 9 - XOR | 1 - Init - | 9 - /[ |
| 2 - Init# | A - XOR# | 2 - + | A - Spare |
| 3 - AND | B - XOR [ | 3 - +[ | B - Spare |
| 4 - AND # | C - Store [ ] | 4 - − | C - Spare |
| 5 - AND [ | D - Store#[ ] | 5 - −[ | D - Init |

TABLE 7-continued

| Digital SubroutineAddr - | | Analog SubroutineAddr - | |
|---|---|---|---|
| 6 - OR | E - StoreAns | 6 - X | E - Store [ ] |
| 7 - OR# | F - Spare | 7 - X[ | F - StoreAns |

More specifically, it is important to note that both of the queue word formats shown in FIGS. 14B–14C enable the CPU 12 to process a single queue word which includes both a subroutine address and the data argument(s). This is in contrast to a que list procedure in which the subroutine address is stored at one queue memory location and the data arguments are stored in sequentially indexed locations in the queue memory system 24. As a consequence of this structure, many of the digital and analog signal processing routines occupy only one queue memory location, and take two instructions to execute.

Figure 15A:
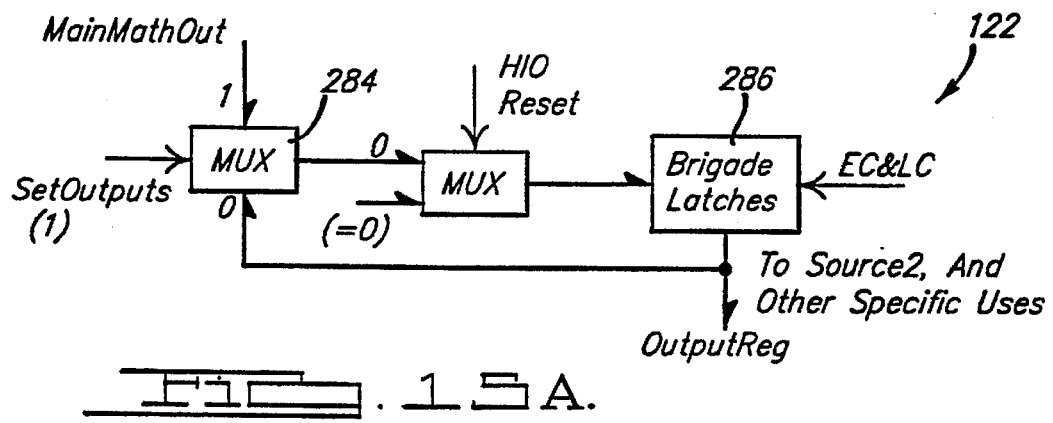
FIGS. 15A-15B provide detailed block diagrams of the output circuit shown in FIG. 2.
Figure 15B:
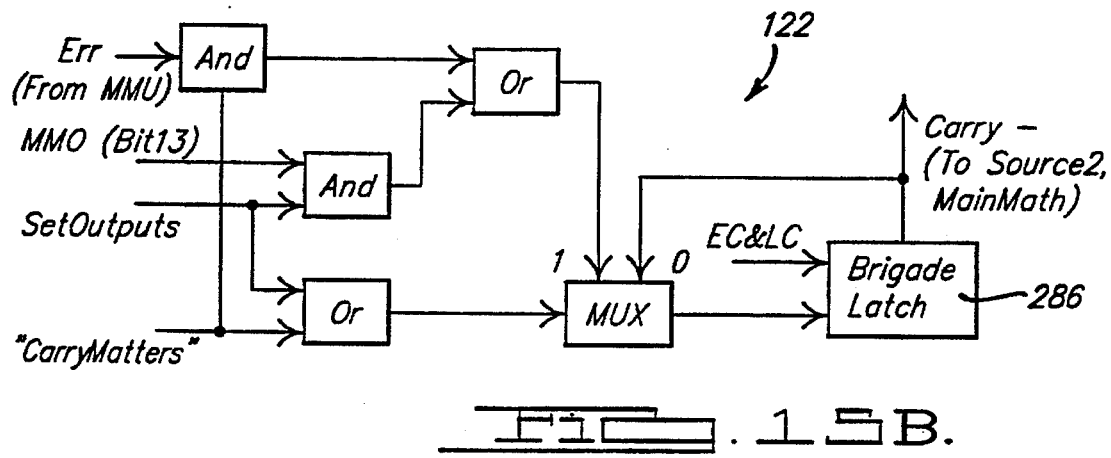
Figure 15:
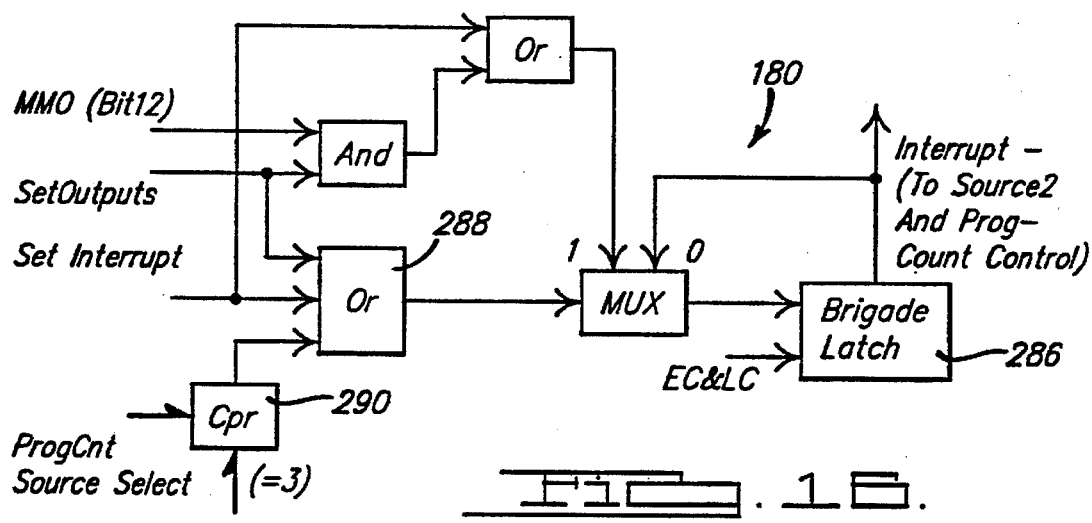

Referring to FIGS. 15A–15B, detailed block diagrams of the output circuit 122 are shown. The output circuit 122 includes an input multiplexer 284 for selecting the data source for the output word. For example, the main math output bus 116 may be selected for setting bits 0 through 10 of a 40-bit output register. As shown by the Brigade latch circuit 286, these bits will be captured by the output circuit 122. Brigade latch circuit 186 is also shown in FIG. 15B, which illustrates the portion of the output circuit 122 that provides an arithmetic "carry" signal from the main math unit 40. The combination of circuits in FIGS. 15A–15B enable the carry to be set, cleared, or read, and the overflow captured as well. When the main math output bus 116 is not selected as the data source, then the output circuit 122 will provide the output signals shown for each of the output register bit location in Table 8 below:

TABLE 8

| Output Register Bit | Signal |
|---|---|
| 0 | Watchdog |
| 1 | Reset sibling enable |
| 2 | Enable error track |
| 3 | Clear error latches |
| 4 | PreSetErrorCnt |
| 5 | Scope strobe 1 |
| 6 | Scope strobe 2 |
| 7 | Flag 1 |
| 8 | Flag 2 |
| 9 | Flag 3 |
| 10 | Flag 4 |
| 11 | Error last |
| 12 | Interrupt |
| 13 | Carry |
| 14 | Lost |
| 15 | DivideDone |
| 16 | DivideErr |
| 17 | Compare Out |
| 18 | Interrupt Input |
| 19 | Interrupt Vector |
| 20 to 27 | Error Count |
| 28 to 34 | Chip Version Number |
| 35 | PowerEnableTestPoint |
| 36 to 39 | Spares (=0) |

Most of these signals are read-only signals, in that they are not "set" by or through the output circuit 122. In other words, these signals have already been latched in other circuits. As indicated above, the output circuit 122 gathers together various signals in the CPU 12 and forms a 40-bit word therefrom. While not shown, these signals may also be buffered to increase their signal strength. Selected bits from this word may be read by other circuits, such as the value of the output value from the comparator 108 (via bit location 17). Similarly, the PowerEnableTestPoint signal may be checked through the logic analyzer 126 for quality control purposes to test the power disable functions of certain circuits, such as the multiplier 168. The DivideDone signal may also be checked, as opposed to counting the number of instructions it should take for a divide operation.

Referring to FIG. 16, a detailed block diagram of the interrupt circuit 180 is shown. In the form of the invention discussed herein, the interrupt circuit 180 is constructed as part of the output circuit 122. Thus, for example, FIG. 16 includes the same Brigade latch circuit 286 as shown in FIGS. 15A–15B. While the interrupt signal input to OR gate 288 will be externally set, it may be cleared either by jumping (via the interrupt vector address) or by direct set/clear of the output register itself. The interrupt circuit 180 includes a comparator circuit 290 which receives the program counter source select signal derived in FIG. 12. The comparator 290 evaluates this signal relative to a value of "3", as this represents the vector input to multiplexer 254 in FIG. 12.

Referring to FIG. 17, a detailed block diagram of the error tracking circuit 182 is shown. The purpose of the error tracking circuit 182 is to count the number of errors and trap the relevant addresses where the last error was encountered. The error tracking circuit 182 is enabled when bit-2 of the output register is set, as shown in Table 8 above. In FIG. 17, the Enable error track signal is shown to be received by AND gate 292. AND gate 292 also receives the Error matters signal from the special decode lines shown in FIG. 12 and the Err signal from the main math unit 40. When these three signals are HIGH, the presence of an error is detected, the address where the error occurred will be stored by capturing the current address from the queue memory control circuit 18 and the current address of the program counter of the program memory control circuit 16 (Brigade latch 262 of FIG. 12). In this regard, Brigade latch circuit 294 is used to capture the queue memory address, while Brigade latch circuit 296 is use to capture the program counter address. The error count value is stored by Brigade latch 298. This value may be cleared or set to "0" by the Clear signal received by the multiplexer 300 from the output circuit 122. If the error count value is not being cleared, it could alternatively be preset to a desired value through the program immediate word, which is received by multiplexer 302. Otherwise, an Addd 304 is used to increase the error count by "1" when an error is detected. The error count value may be read through bit-20 through bit-27 of the output register.

FIG. 17 also shows that the error tracking circuit 182 incorporates a portion of the Brigade latch 286 for setting or clearing the Error Last flag. The Error Last flag will be set TRUE after a main math function results in an error, and it will remain TRUE until another main math function is performed without error. It should also be noted that the Enable error track and Clear error latches will have no effect on the Error Last bit.

Referring to FIG. 18, a detailed block diagram of the stack circuit 121 is shown. The stack circuit 121 features a RAM circuit 306 which includes thirty valid locations, each of which are 24-bits wide. The values which can be stored on the stack RAM 306 are unsigned, whole numbers (bits 15 to 38 of the word format shown in FIG. 4A). The sign bit has no effect on the stored values, or on addresses. The stack's addressing and data-storing abilities are completely independent of each other, which makes the stack bi-directional. The user may chose the base address of the stack circuit 121, as well as which direction the stack grows, to higher or lower addresses. The stack address which appears in the first five bits of the 40-bit word format of FIG. 4A should be an even number. Thus, locations 0, 1 . . . . thru 29 of the stack RAM 306 could correspond to addresses 000000.0000, 000000.0002 . . . . thru 000000.003A(h).

As mentioned above, the stack circuit 121 is designed so that addresses of the stack is completely independent of storing data on it. There are no push or pop operations in the traditional sense, although these operations can be simulated. Accordingly, writing to the stack should more precisely be referred to as storing a value on the stack. The stack circuit 121 includes three possible sources for the values to be stored, namely the PregCountPlus1 signal from the program counter, the output from the adder circuit 106 and the stack's own output value. These input sources are received by multiplexer 308. In contrast, the address for the stack RAM 306 is received from the Brigade latch 310. Nevertheless, there are three possible sources for the stack address, as indicated by multiplexer 312. The stack address value may initially be set from the output of the adder circuit 106. Thereafter, the Add circuit 314 may be used to increase the stack address value by one. Alternatively, the Add circuit 316 may be used to add by a value which will subtract the stack address value by one. The output of the adder 106 could also be used to bypass a number of pop operations. A 1-bit portion of these two Add circuits 314 and 316 are also shown in FIG. 7. Accordingly, it should also be appreciated that the multiplexer 312 is shown in FIG. 7 to be generally comprised of AND gates U5, U6, U13, U15 and U17, and Inverters U14 and U16. It should also be noted that line 317 represents one of the bit lines from the adder circuit 106.

When it is desired to store a value on the stack, the address must be set up first, at least one instruction before the storing operation takes place. If an address change is made along with storing data in the same instruction, this would amount to a post-increment or decrement. In other words, the data will be stored at the current stack address, and the new address will be set up for the next store operation. When reading from the stack, the address should again be set up first. Once the address have been given, the stack value will be valid and usable during the next instruction. Reading is also the default operation, so this data will remain valid until an address change is made.

The issuance of a stack address value increment or decrement outside of the thirty valid locations in RAM circuit 306 will be treated as illegal addresses, such as addresses 000000.003C and 000000.003E. These addresses would result from issuing a StackAddr+1 command at location "29" or issuing a StackAddr-1 command at location "0". Such address changes will be detected by the And gate 318, which in turn generates the Lost signal bit in the output register. When a stack over/under drawn condition is detected, the stack circuit 121 will lock, and no more operations will be permitted until a legal address is loaded from the output of the adder circuit 106. During this condition, if a jump to stack-value is done, the program counter will be set to "2" via multiplexer 320, which will enable an error recovery routine to be executed.

Figure 19:
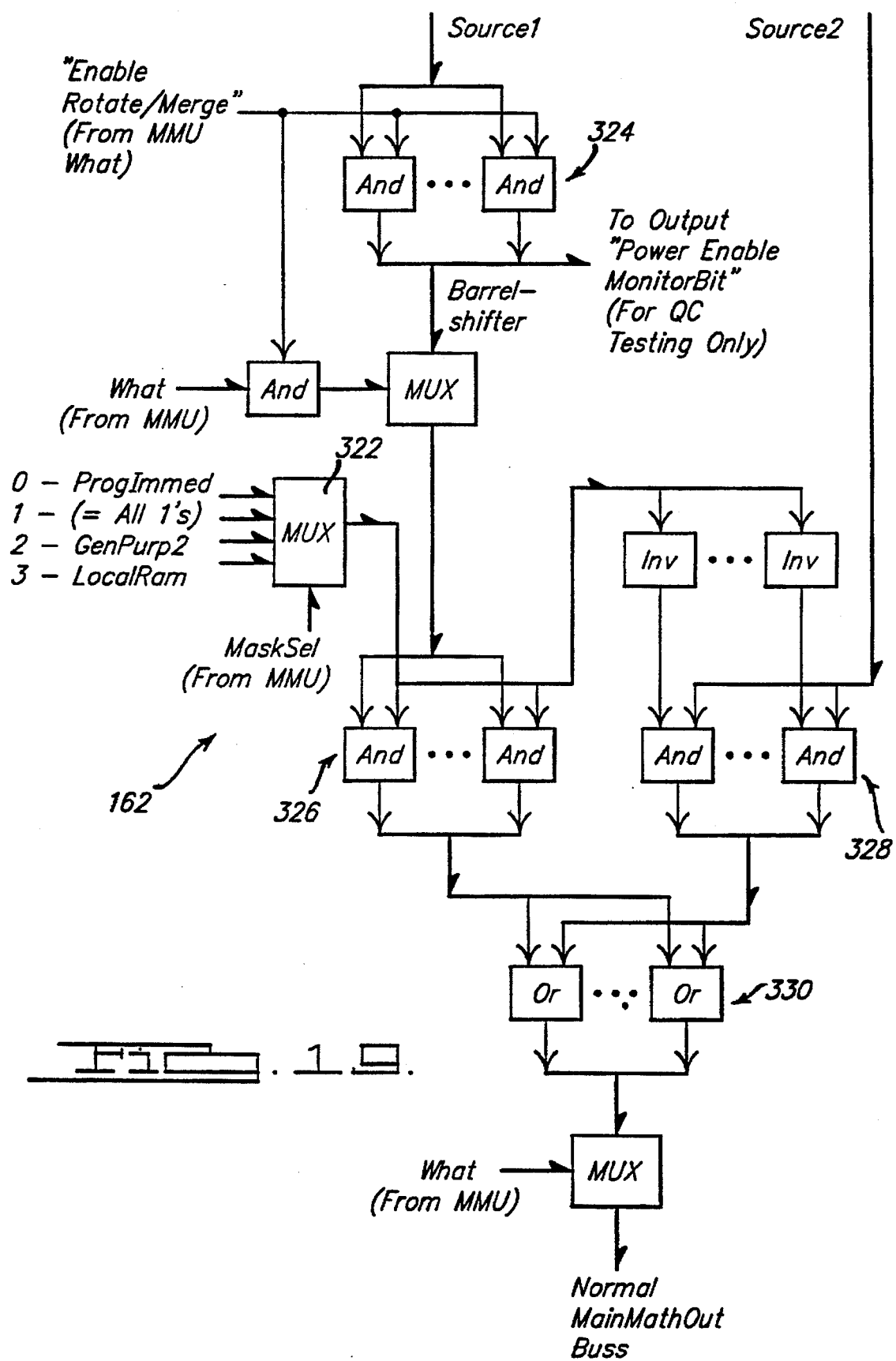
FIG. 19 is a detailed block diagram of the rotate/merge circuit shown in FIG. 3D.

Referring to FIG. 19, a detailed block diagram of the rotate/merge circuit 162 is shown. As mentioned above, the rotate/merge circuit 162 may be used for a variety of single-instruction bit rotates, maskings and multi-word merges. The rotate/merge circuit 162 includes four different input sources, namely the output from the S1 multiplexer 102 (labeled "Source1"), the output from the S2 multiplexer 104 (labeled "Source2"), the number of bits to rotate (the contents of Source 1 to the right) via the first forty opcode bits for the main math unit (Table 4), and the Mask selection multiplexer 322. The Mask selection multiplexer 322 also includes four input sources, as shown in FIG. 19.

The rotate/merge circuit 162 includes a rotate unit which is comprised of a set of forty AND gates 324. The rotate unit 324 causes rotation, as opposed to shifting, as on bit values are lost. An AND Mask unit 326 is included for masking selected bits from Source1 with one of the input signals received by the multiplexer 322. Another AND mask unit 328 is included for masking selected bits from Source2 with one of the input signals received by the multiplexer 322. Finally an OR merge unit 330 is provided for merging the Source1 and Source2 signals. For example, if it was desired to create a new word that contains bits "39" to "25" of Source1 and bits "24" to "0" of Source2, the following method would be used:

(1) Select the beginning word for Source1

(2) Select the beginning word for Source2

(3) Select Rot-Mrg Mask: a word with bits "39" to "25" set and bits "24" to "0" cleared (such as the ProgImmed value)

(4) Select a rotate amount of "0" (nothing rotated)

(5) Direct the result from the main math unit to the desired store (such as one of the general purpose registers 100, or the Local RAM 124)

Referring to FIG. 20, a detailed block diagram of the bit calculator 166 is shown. In this regard, it should be appreciated that the design of the bit calculator 166 is similar to that of the rotate/merge circuit 162. The bit calculator 166 has the ability to change one or more (up to forty) random bits in a 40-bit word to some common value. The output from the selection multiplexer 170 will either contain all ones (Set) or all zeros (Clear). When Set, the contents of Source1 fall through to the Merge unit 332. Similarly, when Clear, the contents of Source1 are blocked from the Merge unit 332. The other two input signals to multiplexer 170 can each be used to generate appropriate mask values at run time. For example, Flag 1 can be set by storing +000000.0100 in the output register. The value of Source1 also provides a mask to the Source 2 value through Inverter unit 334. After masking, the values for Source1 and Source2 are merged into a single 40-bit word. In order to illustrate the operation of the bit calculator 166, another example will be provided. Specifically, consider the situation where it is desired to clear all of the bits in a word, except for bits "19" to "15", which should remain unchanged. In this case, the following method would be employed:

(1) Select the word to be modified (Source2)

(2) Select bit calculator logic: Clear (3) Select a Mask, such as the Program Immediate value input for Source1 (a word with all one's except for bits "19" through "15", which would be zeros)

(4) Direct the result from the main math unit to the desired store (such as one of the general purpose registers 100, or the Local RAM 124)

Figure 21A:
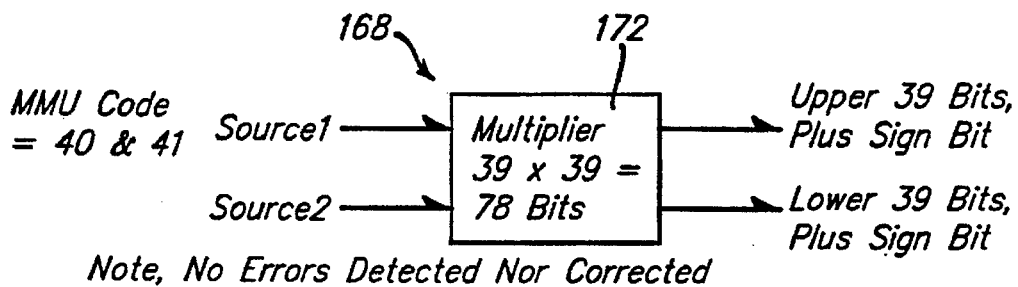
FIGS. 21A-21C provide detailed block diagrams of the multiplier shown in FIG. 3D.
Figure 21B:
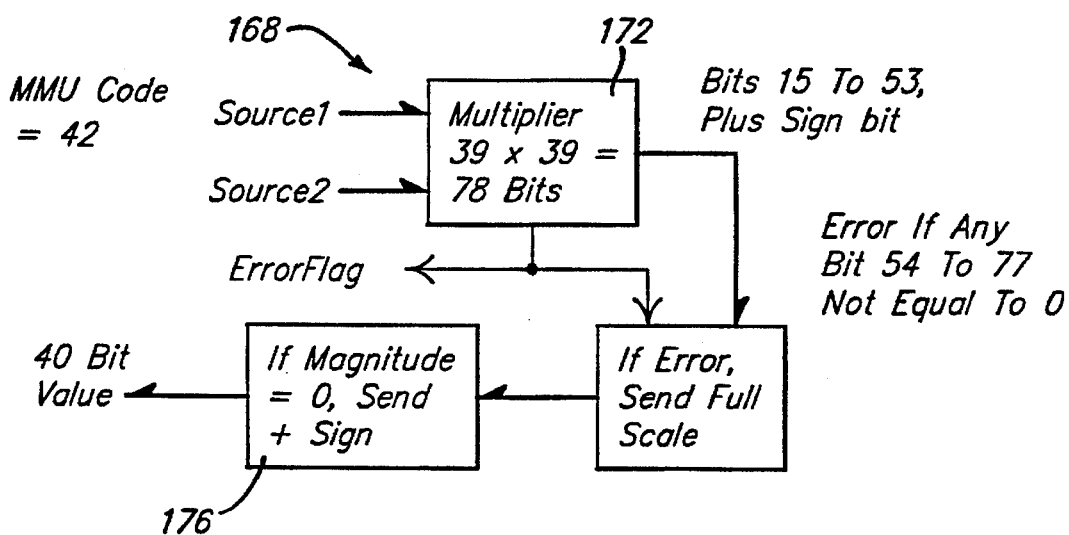
Figure 21C:
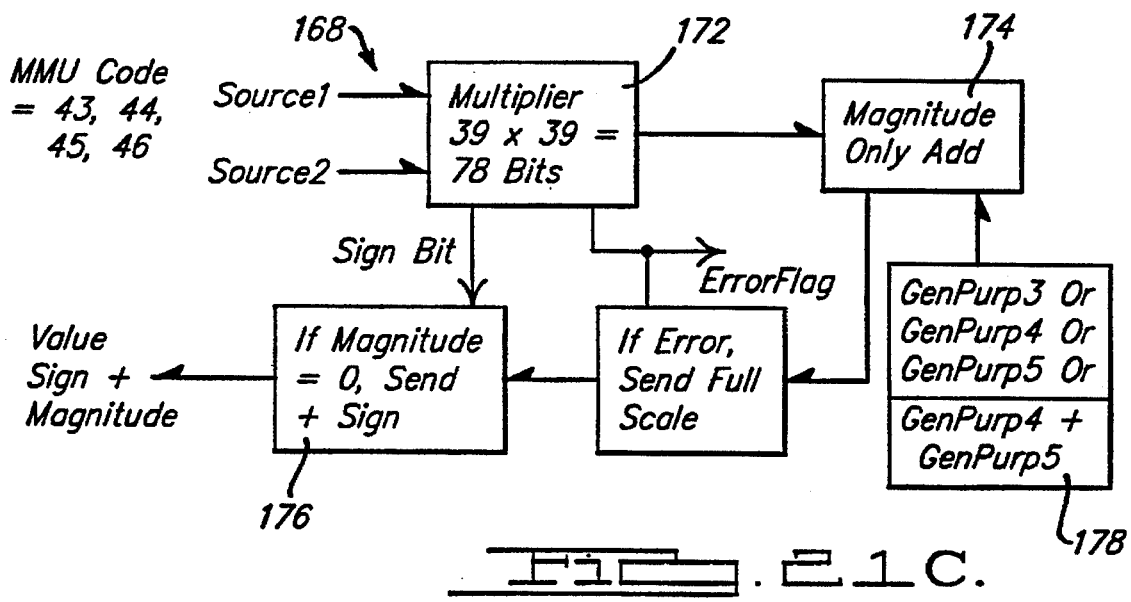

Referring to FIGS. 21A–21C, detailed block diagrams of the multiplier 168 are shown. More specifically, FIGS. 21A–21C represent the multiplier 168 during different multiply operations. In FIG. 21A, the multiplier 168 will respond to main math unit codes "40" and "41" by providing full multiplication precision. In this case, either the upper or lower 40-bits may be selected through the main math unit output multiplexer 114. In FIG. 21B, the multiplier 168 will output the middle 40-bits, namely bits "15" to "53" plus the sign bit. In such a case, it should be understood that very large or very small numbers will lose digits. However, an overflow error will be detected when a bit shifts into the sign position (bit "53" of the "79" bit product). The resulting error signal will be sent to the error tracking circuit 182 for further processing. Additionally, if the magnitude of the product is zero, then the correction circuit 176 will set the sign to be positive. FIG. 21C represents the operation where the product will be added to the contents of one or more of the noted general purpose registers 100. It should be noted that all inputs should be positive values, as no mixed sign math is corrected or checked in this particular embodiment.

Figure 22:
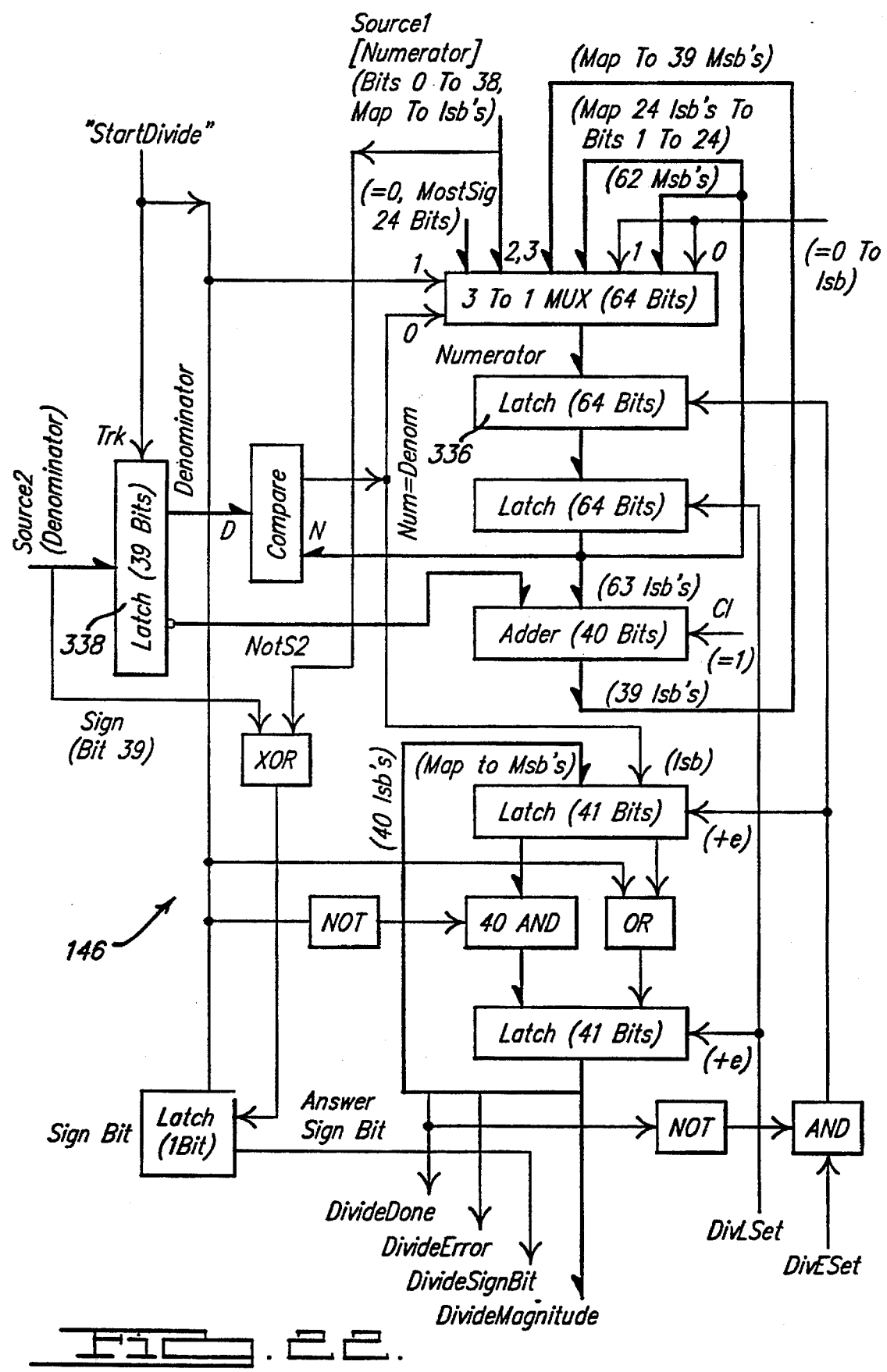
FIG. 22 is a detailed block diagram of the divider circuit shown in FIG. 3C.

Referring to FIG. 22, a detailed block diagram of the divider circuit 146 is shown. As indicated above, division is performed as a background process in the CPU 12. The numerator is presented to the Source1 input, and the denominator is presented to the Source2 input. The result of a divide operation will be available on the 21th instruction following the StartDivide instruction. This result value is accessed by selecting the Div Out value as the main math unit Source2 input signal. The DivideError bit and the DivideDone bits will be transmitted to the output circuit 122. In this regard, bit-15 of the output word (DivideDone) will be cleared (LOW) by the StartDivide instruction, and will return HIGH after "21" instructions. Similarly, bit-16 of the output word (DivideError) will be cleared (LOW) by the StartDivide instruction, and will go HIGH after "21" instructions, if an error occurred.

The divider circuit 146 employs a conventional "shift and subtract if possible" algorithm which has its own clocking scheme. The DivLSet and DivESet clock signals occur at twice the frequency of the EC and LC clock signals. The StartDivide instruction signal initializes the numerator and denominator in their respective latches 336 and 338, after which the divider circuit 146 is a stand alone co-processor. While the divider circuit 146 could be made faster, a large number of gates would be required for a relatively marginal improvement in speed. Additionally, a divide operation could be avoided by multiplying by 1/x rather than dividing by x.

Referring to FIGS. 23A–C, a detailed block diagram of the binary to BCD converter 148 is shown. As indicated above, the binary to BCD converter 148 is used to convert a 6-digit Hexadecimal number to a 8-digit binary coded decimal number. For example, the decimal number "10" will be represented as "A" in Hexadecimal and "1010" in binary. However, once converted, the BCD equivalent number would be represented as "0001 0000", as the decimal digits are treated independently in BCD format. FIG. 23A illustrates an overall block diagram of the binary to BCD converter 148. The binary to BCD converter 148 is shown to comprise a BinBCD module 340 and an ASCII sign value module 342. The 6-digit input word is taken from the integer portion of the word in the format of FIG. 4A. When converted, the 8-digit result need only occupy bit positions "0" through "28" of the main math unit output. Only "29" bits are needed for the result, because the most significant digit can only be a zero or a one. Positive and negative numbers are designated by bits "32" through "39" of the result. The ASCII code equivalent for a + or a − is placed here, based on the sign bit (bit-39) of the Source1 input word. For positive numbers, 2B(h) is used for the sign, while 2D(h) is used for negative numbers.

FIGS. 23B–23C illustrate a more detailed block diagram of the binary to BCD converter 148. In FIG. 23B, the Source1 line is labeled "S1", as it represents the output from the S1 multiplexer 102. FIG. 23B also shows that the binary to BCD converter 148 receives the Enable_BCD signal from latch 352 of FIG. 12. The Enable_BCD signal is buffered by inverting amplifiers 344–346. Bits "15" through "38" of the S1 signal are directed to a set of AND gates 348, while bit "39" is directed to NAND gate 250. The buffered Enable_BCD signal provides the other input to these two gates. The Enable_BCD signal will enable the S1 signal to pass through the AND gates 348, and thereby activate the binary to BCD converter 148. As appreciably more electrical power is consumed when electronic components undergo signal transitions, the use of a LOW Enable_BCD signal has the effect of substantially reducing power consumption in the binary to BCD converter 148 when its use is not required. The enablement of the binary to BCD converter 148 may be checked through the BinBCDActive signal, which is generated by activity detection logic gates 352.

The binary to BCD converter 148 includes a Term_Gather module 354, which is simply an electrical connector that routes appropriate ones of the 24-bits passed through AND gates 348 to specific bit lines in each of the seven converter stages 356–368. Each of these seven converter stages 356–368 is shown in FIG. 23C. As illustrated, each of the converter stages 356–364 contribute to build the 29-bit BCD result, which is labeled BinBCDOut. The converter stages may be constructed from a series of full adders (such as LSI Logic full adder cell FA1A). FIG. 23C also shows that ASCII sign value module 342 is simply comprised of an inverting amplifier 370 and bit line 372.

Figure 24:
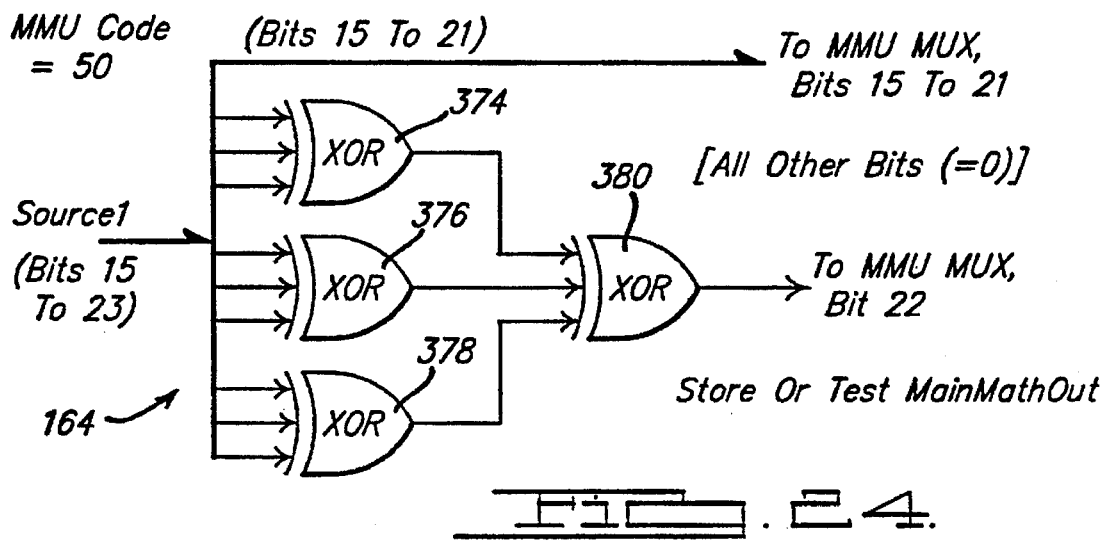
FIG. 24 is a detailed block diagram of the parity checker shown in FIG. 3D.

Referring to FIG. 24, a detailed block diagram of the parity checker 164 is shown. The parity checker is used to test a received byte for parity, or to create a byte with parity (for communication protocol purposes). The parity checker 164 is shown to be comprised of a set of ExOR gates 374–380. The parity checker 164 receives bits "15" to "23" of the Source1 signal (output from the S1 multiplexer 102). Bit "15" is the least significant bit in the integer portion of the 40-bit word format of FIG. 4A. The ExOR gates are used to detect whether or not the input number is even or odd. If the input number is odd, then bit-22 will bet set via the output of ExOR gate 380. Bits "15" to "21" will also be passed through to the main math unit output multiplexer 114, so that a 7-bit data word with odd parity may be created.

Figure 25B:
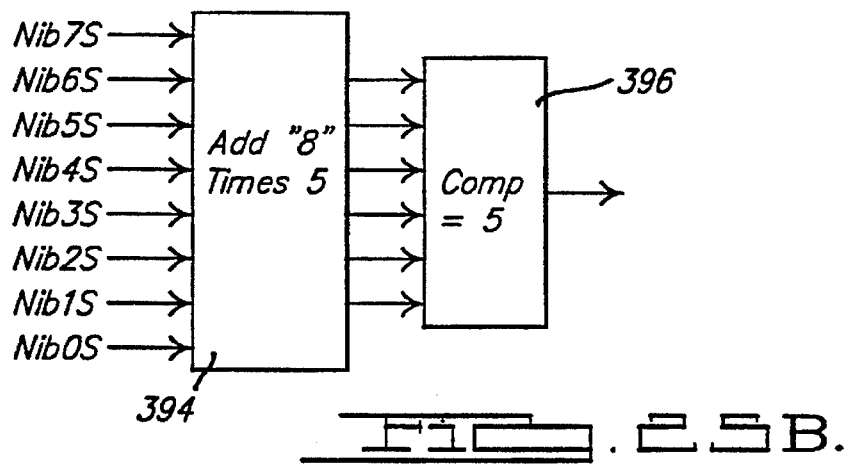
FIGS. 25A-25C provide a detailed block diagram of the compression circuit shown in FIG. 3D.
Figure 25C:
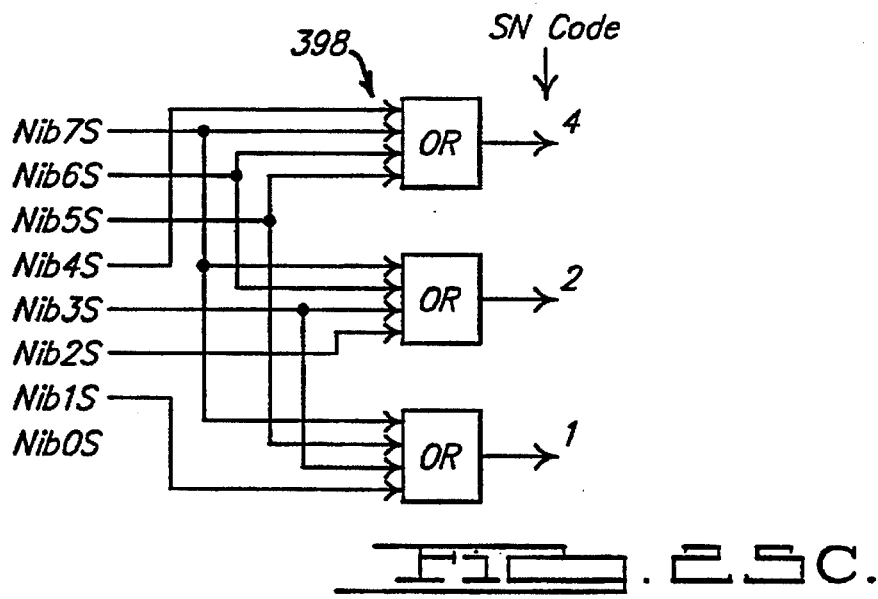
Figure 25A:
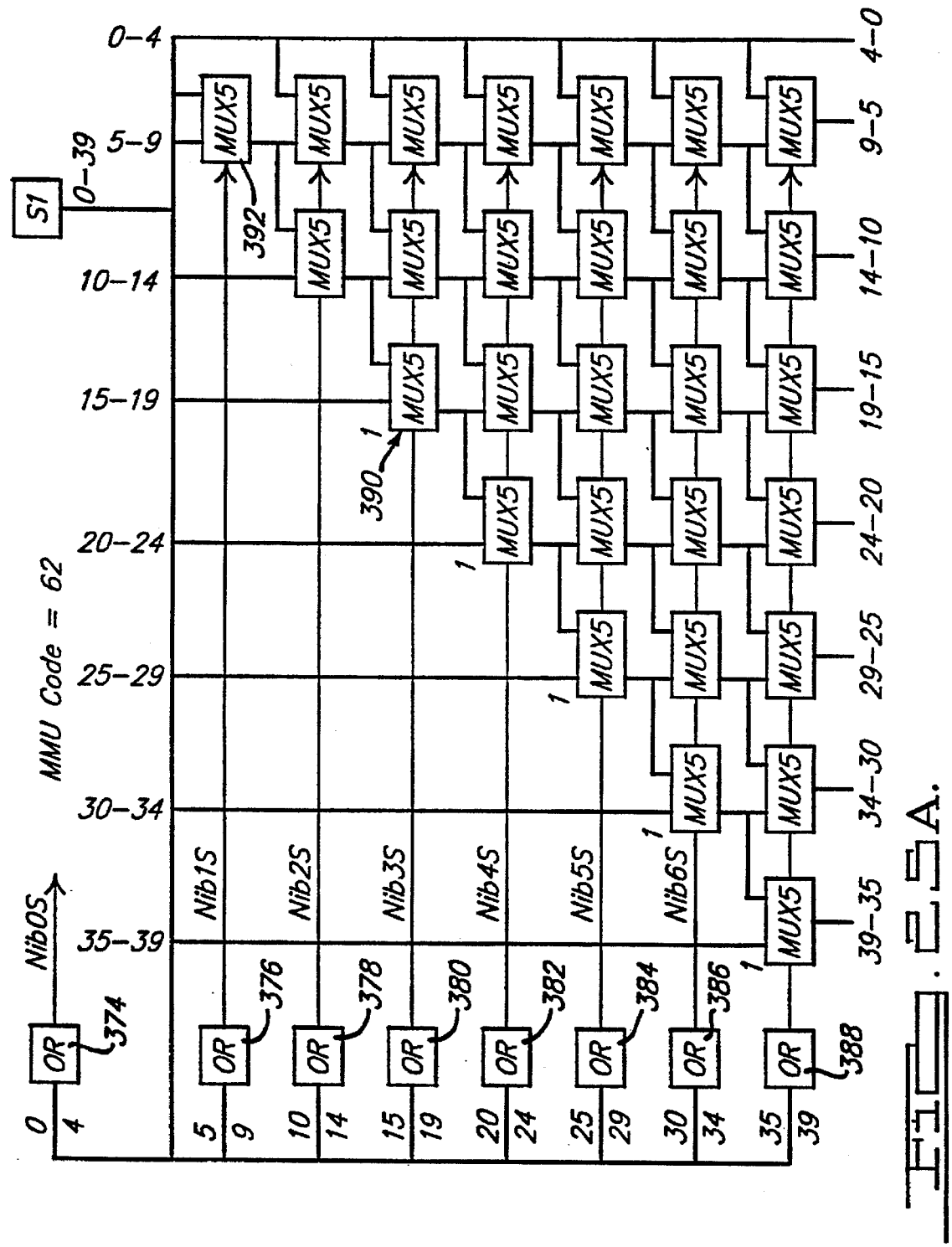

Referring to FIGS. 25A–25C, a detailed block diagram of the compression circuit 160 is shown. More specifically, FIG. 25A illustrates the portion of the compression circuit 160 which is devoted to the "compress data" function (main math unit opcode "62"), while FIGS. 25B–25C illustrate the portion of the compression circuit which is devoted to the "compress code" function (main math unit opcode "61"). In the compress data function, the compression circuit 160 evaluates a 40-bit data word as eight 5-bit nibbles. The zero value nibbles are removed, and the non-zero nibbles are left justified. For example, if the data word submitted is:

00000-00111-00000-00000-00110-00000-00000-10000 then the left justified ReadResidueValue ("RRV") will be:

00111-00110-10000-xxxxx-xxxxx-xxxxx-xxxxx-xxxxx where xxxxx means "don't care". As shown in FIG. 25A, the data word to be compressed is received from the S1 multiplexer 102. Each 5-bit nibble of the data word is processed through an OR gate to determine if any of the bits are set (that is, having a HIGH or non-zero value). Each of these OR gates 374–388 produce a single bit signal which indicates whether its nibble was non-zero. Thus, for example, OR gate 374 produces a signal labeled "Nib0S", which will be HIGH if any of the bits "0" through "4" of the S1 data word were non-zero. The combination of these eight "Nib_ S" signals identify the position of the non-zero nibbles in the S1 data word, and this combination is referred to as the "MN" code. Accordingly, an MN code of "01000000" would indicate that only the Nib6S nibble was non-zero. These MN code bits control the operation of an array of multiplexers 390. The multiplexers are connected together and controlled by the MN code to shift delete any zero nibbles and shift the remaining nibbles to the left. For example, signal Nib1S is zero, then multiplexer 392 will select bits "0" through "4", rather than bits "5" through "9".

FIG. 25B and 25C illustrate distinct aspects of the compress code function. In this regard, the compress code function is used to create a four field code for the number received from the S1 multiplexer 102. The first field in this code is the size of the RRV number. The size value is equal to five times the number of non-zero nibbles in the S1 data word. Accordingly, the compression circuit 160 includes an adder/multiplier circuit 394 which adds all of the Nib_S signals and times this value by five. The result is a 6-bit signal which also provides the input to a comparator circuit 396. The comparator circuit 396 checks to see if the result from the adder/multiplier circuit 394 is equal to five. If the result is equal to five, then this means that only one of the eight nibbles was non-zero. This "only one" indicator provides the second field in the four field code. The third field is already provided by the MN code. The fourth and final field is determined by the OR gate logic circuit 398 of FIG. 25C. As shown, the OR gate logic circuit 398 is arranged to generate a 3-bit "SN" code. The SN code represents an integer value which identifies the singular non-zero nibble in the S1 data word (from Most to Least significant).

FIG. 26 illustrates the reverse operation to the compress data function. During inflation, the left justified RRV number is supplied to the inflation circuit 161 via the S1 multiplexer 102. However, in order to decompress, information from the MN code needs to be supplied. In this particular embodiment, the MN code is supplied to the inflation circuit 161 via the S2 multiplexer 104. As is the case of the compression circuit 160, the Nib_S signals of the MN code control an array of multiplexers 400. The Nib_S signals also enable a set of AND gates 402 to pass through those nibbles with non-zero values. As with the compression circuit 161, the output of the inflation circuit 161 is directed to the output multiplexer 114 in the main math unit 40.

Figure 27A:
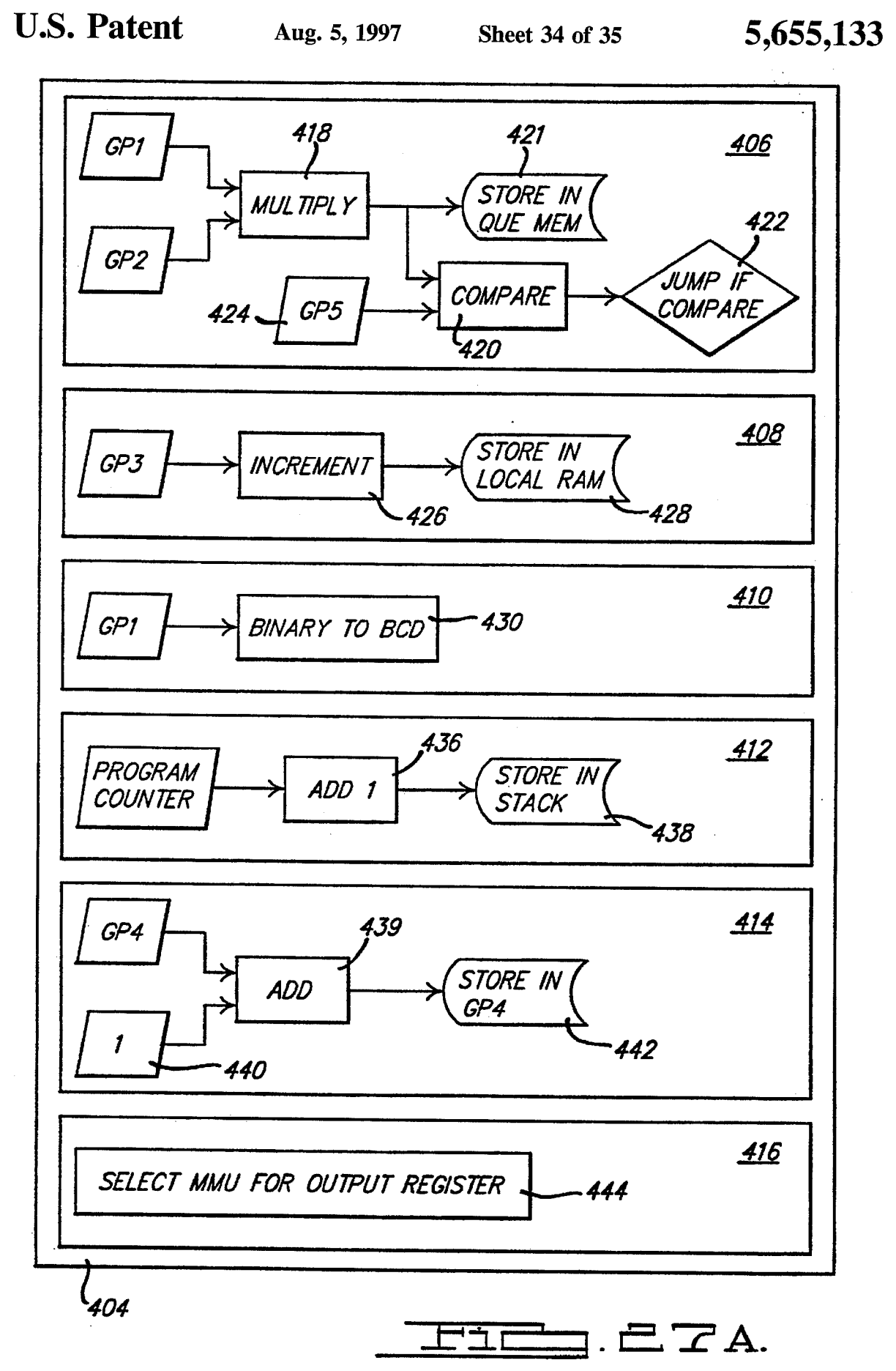
Figure 27B:
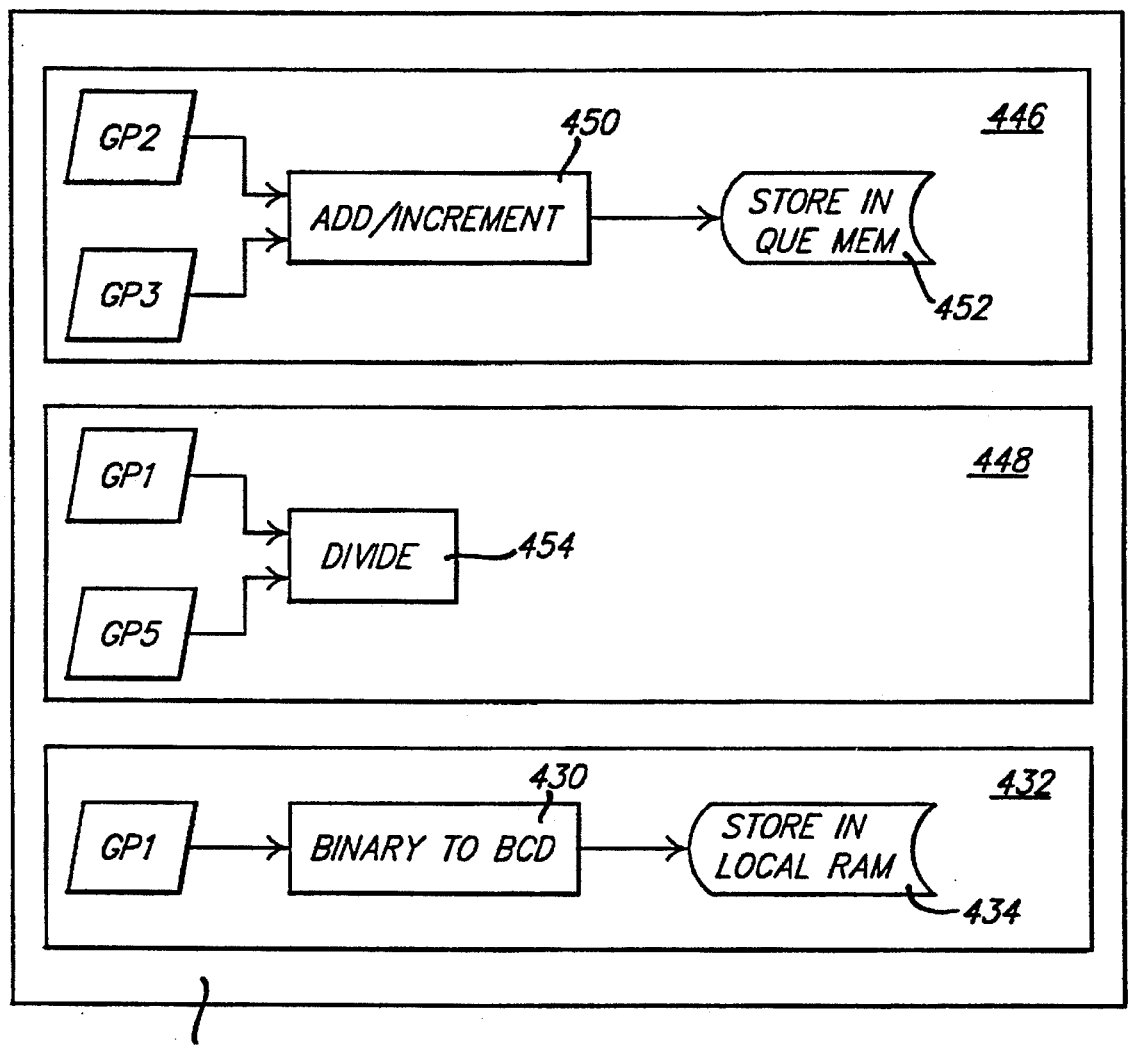

Referring to FIGS. 27A–27B, exemplary single instructions are diagrammatically illustrated. In this regard, FIGS. 27A–27B illustrate the compound superscalar capability of CPU 12 according to the present invention. More specifically, FIG. 27A shows a block 404 which represents a single instruction. In other words, all of the operations contained in block 404 may be coded within a single 120-bit wide instruction (80-bits comprising the opcode portion of the instruction). Block 404 includes a set of instruction blocks 406–416 which contain one or more instruction operations, some or which are compound instruction operations. For example, block 406 includes a multiply operation 418, a compare operation 420, a store operation 421 and a "jump if compare" operation 422. The multiply operation 418 takes place in the multiplier 168 shown in FIG. 3D. The muliplier 168 receives the contents of general purpose register GP1 from the S1 multiplexer 102 and the contents of general purpose register GP2 from the S2 multiplexer 104. While not specfically illustrated in this figure, FIG. 3D shows that the multiplier result could also be added to either general purpose register GP3, GP4 or GP5 as well.. The output multiplexer 114 of the main math unit 40 is coded to pass through the result from the multiplier 168, and the input multiplexer 140 of the comparator 108 has been coded to receive the result from the main math unit. As illustrated by data block 424, the input multiplexer 142 of the comparator 108 has been coded to receive the contents of general purpose register GP5. The comparator 108 will then generate a 1-bit output signal which will indicate whether or not the value from general purpose register GP5 was the same as the multiplication result. If these values are the same, the multiplexer 260 in the program memory control circuit 16 will be set to cause a jump in the program counter value to one of the selected input signals to multiplexer 254. As illustrated by store operation 421, the result from the multiplier 168 will also be stored in the que memory system 24.

Instruction block 408 includes an increment operation 426 and a storage operation 428. In this regard, the incrementer 107 is employed to add one to the value received from general purpose register GP3. This incremented value, such as an address value, is then stored in the Local RAM 124. Block 410 initiates a binary to BCD operation 430 using general purpose register GP1 as its input number. While many binary to BCD operations may be fully completed in a single clock cycle, FIG. 27B shows that the output from the binary to BCD converter 148 may be utilized in the subsequent instruction. In this regard, FIG. 27B show an instruction block which includes a store operation. More specifically, FIG. 27B indicates that the conversion result is stored in Local RAM 124.

The single instruction block 404 of FIG. 27A also includes an instruction block 412, which features an "add 1" operation 436. This add operation utilizes the adder 264 in the program memory control circuit 16 to add one to the program count, and then this ProgCountPlus1 value is stored in the stack 121, as represented by storage operation 438. Block 414 shows another addition operation (operation block 439). However, in this case the adder 106 is employed to add the contents of general purpose register GP4 to some other value, such as the constant one (shown by data block 440). The result of this add operation is then stored in general purpose register GP4 (shown by storage block 442). Accordingly, it should be appreciated that this particular compound instruction operation makes dual use of general purpose register GP4 in the same clock cycle. Instruction block 416 is also included to illustrate that the output circuit 122 may be controlled by the selection operation 444. In this case, the output from the main math unit 40 will be stored in the output register.

FIG. 27B shows two additional instruction blocks 446–448 which are contained in single instruction block 449. Instruction block 446 shows that general purpose registers GP2 and GP3 will be added together in the incrementer 107 (operation block 450). Then, the result will be stored in the que memory system 24 (shown by storage block 452). Block 448 simply shows a divide operation 454, which is initiated but not completely in this clock cycle that this instruction executes. Nevertheless, it should be noted that the contents of GP1 and GP5 may be used by the divider through the S1 and S2 multiplexers 102–104, respectively, during the same instruction as block 446, as the incrementer 107 does not depend upon the S1 and S2 multiplexers for its input values.

The present invention has been described in an illustrative manner. In this regard, it is evident that those skilled in the art once given the benefit of the foregoing disclosure, may now make modifications to the specific embodiments described herein without departing from the spirit of the present invention. Such modifications are to be considered within the scope of the present invention which is limited solely by the scope and spirit of the appended claims.

What is claimed is:

1. In a harvard architecture computer having separate master control buses, a data manipulation and program control architecture comprising:

a data manipulation architecture having:

at least one processor having a plurality of execution units, including a first execution unit and a second execution unit, each of said plurality of execution units being coupled to said master data bus;

said execution units each being configured to fully perform a dedicated computational function within said single clock cycle, said execution units being coupled in parallel go said master data bus such that data flowing on said master data bus is simultaneously available to each of execution units:

said execution units being configured such that each performs its dedicated computational function within said single clock cycle:

a plurality of local data buses, including a first data bus coupled to said first execution unit and a second data bus coupled to said second execution unit, said local data buses being coupled to a programmably selectable multiplex circuit;

at least one register having a plurality of programmably selectable ports, including a master port for coupling to said master data bus, a first port for coupling to said first data bus and a second port for coupling to said second data bus;

a program control architecture having:

a memory coupled to said master control bus for storing at least one very long instruction word control instruction;

an interface for coupling each of said plurality of execution units and said register to said master control bus;

said interface defining very long instruction word (VLIW) structure that maps predetermined fields of said VLIW control instruction to predetermined ones of said execution units and said register;

said memory and said interface being operable in a single operation cycle to deliver control instructions to said execution units and said register, each execution unit and register receiving said control instructions that correspond to the predetermined fields mapped to that execution unit or register;

said multiplex circuit being responsive to said control instructions to selectively couple one of said first and second data buses for selective access by said register;

said register being responsive to said control instructions to open communication with a selected one of said first data bus and second data bus and to store a copy of the data extant on said selected bus;

whereby said data manipulation and said program control architectures cooperate to simultaneously perform plural data processing operations in a single operation cycle by programmatically routing data among said separate execution units and said register based on said very long instruction word (VLIW) control instruction.

2. The apparatus of claim 1 wherein said one processor comprises a main math unit for performing numerical calculations and wherein said apparatus further includes a second processor for performing Boolean logic calculations.

3. The apparatus of claim 1 wherein at least some of said plurality of execution units are selected from the group consisting of:

incrementers, adders, comparators, multipliers, dividers, binary to BCD converters, Boolean logic executors, bit manipulators, and general purpose mathematical calculators.

4. The apparatus of claim 1 wherein said first and second execution units perform different data processing functions.

5. The apparatus of claim 1 wherein said plurality of execution units each has a dedicated data bus separate from said master data bus and separate from the dedicated data buses of the other execution units.

6. The apparatus of claim 5 wherein said register has a programmably selectible port for coupling to each of the dedicated data buses of said plurality of execution units.

7. A central processing unit capable of performing more than one operation in a single clock cycle, said central processing unit having a data memory bus and a separate program memory bus, said central processing unit comprising:

a plurality of independent computational processors;

at least one of said independent computational processors having a processor output port and a programmably controllable multiplexed processor input port coupled to a plurality of different data sources;

each of said independent computational processors having a plurality of individual execution units that each fully performs a dedicated computational function within said single clock cycle, said execution units being coupled in parallel to said multiplexed processor input port such that data flowing through said processor input port is simultaneously available to all execution units of the computational processor, and said execution units being coupled in parallel through a programmably controlled multiplexed output port coupled to said processor output port;

a plurality of registers;

each of said registers having a programmably controllable multiplexed register input port connected to each said processor output port; and each of said registers having a register output port connected to said processor input port of at least one of said computational processors;

a data memory control means linked to each said register output port for receiving and transmitting data words on said data memory bus, said data memory control means having a data memory output port connected to said processor input port of at least one of said computational processors; and a program control means for receiving an instruction word from said program memory bus wherein said instruction word includes portions defining a series of assigned bit locations to represent selection codes for programmably controlling each said processor input port, each said multiplexed output port, and each said multiplexed register input port, said program control means for further directly transmitting said selection codes to each said processor input port, each said multiplexed output port, and each said multiplexed register input port to programmably control each said processor input port and each said register input port such that the following occurs within the same single clock cycle:

(a) input data are applied to said processor input port from one of said plurality of different data sources selected based on a first portion of said instruction word:

(b) each of said execution units concurrently performs its computational function upon said input data:

(c) said multiplexed output port couples the computational output of one of said execution units to said processor output port based on a second portion of said instruction word;

(d) the register input port of each of said registers couples to one of said processor output ports based on a third portion of said instruction word.

8. The invention according to claim 7 wherein said central processing unit includes an execution sequence data bus, a separate execution sequence address bus and an execution sequence memory control means for receiving data words on said execution sequence data bus which represent pointers to a beginning address associated with a routine of instructions stored in a program memory, and for generating an address word on said execution sequence address bus.

9. The invention according to claim 8 wherein said execution sequence memory control means also includes a plurality of execution sequence memory control input ports which are individually connected to each processor output port.

10. The invention according to claim 8 wherein said central processing unit further includes a stack circuit, said stack circuit having a stack input port connected to said processor output port from one of said computational processors which is dedicated to providing an incrementer function, and a stack output port which is connected to said program memory control means.

11. The invention according to claim 7 wherein one of said computational processors includes a plurality of independent computation circuits and source means for selecting outputs from at least one of said registers for simultaneous input to each of said computation circuits in said one of said computational processors.

12. The invention according to claim 11 wherein said source means includes a pair of multiplexer circuits and each of said pair of multiplexer circuits has a multiplexer circuit input port which is also connected to said data memory output port.

13. The invention according to claim 7 wherein said central processing unit includes a logic analyzer multiplexer having a plurality of logic analyzer input ports wherein each said logic analyzer input ports is connected to each said computational processor output port and each said register output port.

14. The invention according to claim 7 wherein said central processing unit includes a comparator circuit having a plurality of comparator input ports wherein each of said comparator input ports is individually connected to a plurality of said register output ports and at least one said processor output port.

15. The invention according to claim 7 wherein said central processing unit includes error track means for tracking errors in at least one of said computational processors.

16. In a computer having a data memory, a program memory and separate data memory and program memory data buses, a central processing unit which is capable of performing more than one operation in a single clock cycle, comprising:

a plurality of independent computational processors;

each of said independent computational processors having a programmably controlled processor output port and a programmably controllable multiplexed processor input port coupled to a plurality of different data sources;

each of said independent computational processors having separate processing circuit dedicated to at least one unique mathematical function, and;

at least one of said independent computational processors having separate processing circuit dedicated to at least one logical function;

a plurality of registers;

each of said registers having a programmably controllable multiplexed register input port connected to each said processor output port, and;

each of said registers having a register output port connected to said processor input port of at least one of said computational processors;

a data memory control means linked to each said register output port for receiving and transmitting data words on said data memory bus, said data memory control means having a data memory output port connected to said processor input port of at least one of said computational processors;

a program control means for receiving an instruction word from said program memory bus wherein said instruction word includes a series of assigned bit locations to represent selection codes for programmably controlling each said processor input port and each said register input port, said program control means for further directly transmitting said selection codes to each said processor input port and each said register input port to programmably control each said processor input port and each said register input port to programmably control each said processor input port and each said register input port, said program control means, said processor input port and said register input ports being cooperative such that the following occurs within the same single clock cycle;

(a) input data are applied to said processor input port from a one of said plurality of different data sources selected based on a first portion of said instruction word:

(b) each of said processing circuits concurrently performs its computational function upon said input data;

(c) said processor output port selects the computational output of one of said execution units based on a second portion of said instruction word;

(d) the register input port of each of said registers couples to one of said processor output ports based on a third portion of said instruction word;

an execution sequence data bus and a separate execution sequence address bus; and an execution sequence memory control means for receiving data words on said execution sequence data bus which represent pointers to the beginning address of a routine of instructions stored in said program memory and for generating an address word on said execution sequence address bus.

17. The invention according to claim 16 wherein one of said computational processors includes a plurality of independent computation circuits and source means for selecting the output from at least one said register output port for simultaneous input to each of said computation circuits in said computational processor.

18. The invention according to claim 17 wherein source means includes a pair of multiplexer circuits and each of said multiplexer circuits has an input port which is also connected to said data memory output port.

19. The invention according to claim 17 wherein said one computational processor further includes an output multiplexer for selecting the output value from one of said independent computation circuits.

20. The invention according to claim 19 wherein said independent computation circuits includes both mathematical and logical processing circuits.

21. The invention according to claim 20 wherein said mathematical processing circuits include a multiplier and a binary to BCD converter and said logical processing circuits includes an AND circuit, an OR circuit and an ExOR circuit.

* * * * *